United States Patent
Shimoshikiryoh

(10) Patent No.: US 10,209,841 B2
(45) Date of Patent: Feb. 19, 2019

(54) POSITION INPUTTING DEVICE AND DISPLAY DEVICE WITH POSITION INPUTTING FUNCTION

(71) Applicant: Sharp Kabushiki Kaisha, Sakai, Osaka (JP)

(72) Inventor: Fumikazu Shimoshikiryoh, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/509,652

(22) PCT Filed: Mar. 9, 2015

(86) PCT No.: PCT/JP2015/075028
§ 371 (c)(1),
(2) Date: Mar. 8, 2017

(87) PCT Pub. No.: WO2016/039244
PCT Pub. Date: Mar. 17, 2016

(65) Prior Publication Data
US 2017/0255299 A1   Sep. 7, 2017

(30) Foreign Application Priority Data

Sep. 10, 2014   (JP) .................................. 2014-184334

(51) Int. Cl.
*G06F 3/044* (2006.01)
*G02F 1/1333* (2006.01)
(Continued)

(52) U.S. Cl.
CPC .......... *G06F 3/044* (2013.01); *G02F 1/13338* (2013.01); *G02F 1/13439* (2013.01);
(Continued)

(58) Field of Classification Search
CPC ........... G02F 1/133345; G02F 1/13338; G02F 1/133512; G02F 1/133514;
(Continued)

(56) References Cited

U.S. PATENT DOCUMENTS 9,746,964 B2 * 8/2017 Rosenberg ............ G06F 3/0418
2010/0060608 A1   3/2010 Yousefpor
(Continued)

FOREIGN PATENT DOCUMENTS

| JP | 20120502397 A | 1/2012 |
| JP | 20130515302 A | 5/2013 |
| JP | 20130534343 A | 9/2013 |

*Primary Examiner* — Michael J Eurice
(74) *Attorney, Agent, or Firm* — ScienBiziP, P.C.

(57) ABSTRACT

A touchscreen 12 includes first touch electrode lines 31, first touch electrode groups 33, first traces 29, second touch electrode lines 32, second touch electrode groups 34, and second traces 30. The first touch electrode lines 31 include first touch electrodes 27 arranged along a first direction. Each first touch electrode group 33 includes multiple first touch electrodes 27. Each first trace 29 is connected to multiple first touch electrodes 27 in each first touch electrode group 33. The second touch electrode lines 32 include second touch electrodes 28 arranged along a second direction. Each second touch electrode group 34 includes multiple second touch electrodes 28. Each second trace 30 is connected to multiple second touch electrodes 28 in each second electrode touch group 34.

22 Claims, 31 Drawing Sheets

(51) Int. Cl.
   *G02F 1/1335*   (2006.01)
   *G02F 1/1343*   (2006.01)
   *G02F 1/1362*   (2006.01)
   *G06F 3/041*    (2006.01)

(52) U.S. Cl.
   CPC .. G02F 1/133345 (2013.01); G02F 1/133512 (2013.01); G02F 1/133514 (2013.01); G02F 1/134309 (2013.01); G02F 1/136286 (2013.01); G06F 3/0416 (2013.01); *G02F 2201/121* (2013.01); *G02F 2201/123* (2013.01); *G06F 2203/04103* (2013.01); *G06F 2203/04112* (2013.01)

(58) Field of Classification Search
   CPC .......... G02F 1/134309; G02F 1/13439; G02F 1/136286; G02F 2201/121; G02F 2201/123; G06F 1/169; G06F 3/044; G06F 3/0416; G06F 3/0418; G06F 3/047; G06F 2203/04103; G06F 2203/04111; G06F 2203/04112
   See application file for complete search history.

(56) References Cited

U.S. PATENT DOCUMENTS

| | | |
|---|---|---|
| 2011/0175835 A1 | 7/2011 | Wang |
| 2012/0038584 A1 | 2/2012 | Liu |
| 2012/0262419 A1* | 10/2012 | Hershman ............... G06F 3/044 345/174 |
| 2013/0300707 A1* | 11/2013 | Hershman ............... G06F 3/044 345/174 |
| 2013/0321296 A1* | 12/2013 | Lee .......................... G06F 3/041 345/173 |
| 2014/0132526 A1* | 5/2014 | Lee ......................... G06F 3/0412 345/173 |
| 2014/0240279 A1* | 8/2014 | Hwang ................. G06F 3/0412 345/174 |
| 2014/0362028 A1* | 12/2014 | Mo ......................... G06F 3/044 345/174 |
| 2014/0368750 A1* | 12/2014 | Liao ........................ G06F 3/044 349/12 |
| 2015/0091858 A1* | 4/2015 | Rosenberg ............ G06F 3/0414 345/174 |
| 2015/0091859 A1* | 4/2015 | Rosenberg .............. G06F 3/044 345/174 |
| 2015/0220204 A1* | 8/2015 | Noguchi ............... G06F 3/0412 345/174 |
| 2015/0317010 A1* | 11/2015 | Yashiro ................... G06F 3/044 345/174 |
| 2015/0324038 A1 | 11/2015 | Liu |
| 2016/0041666 A1* | 2/2016 | Lee ..................... G02F 1/13338 345/174 |
| 2016/0188040 A1* | 6/2016 | Shin ........................ G06F 3/047 345/174 |
| 2016/0363305 A1* | 12/2016 | Omata .................... G06F 3/044 |
| 2017/0102797 A1* | 4/2017 | Cok ....................... G06F 3/0412 |
| 2017/0123541 A1* | 5/2017 | Omata ................. G09G 3/3208 |
| 2017/0242534 A1* | 8/2017 | Gray ....................... G06F 3/044 |
| 2017/0322674 A1* | 11/2017 | Rosenberg .......... G06F 3/03545 |

\* cited by examiner

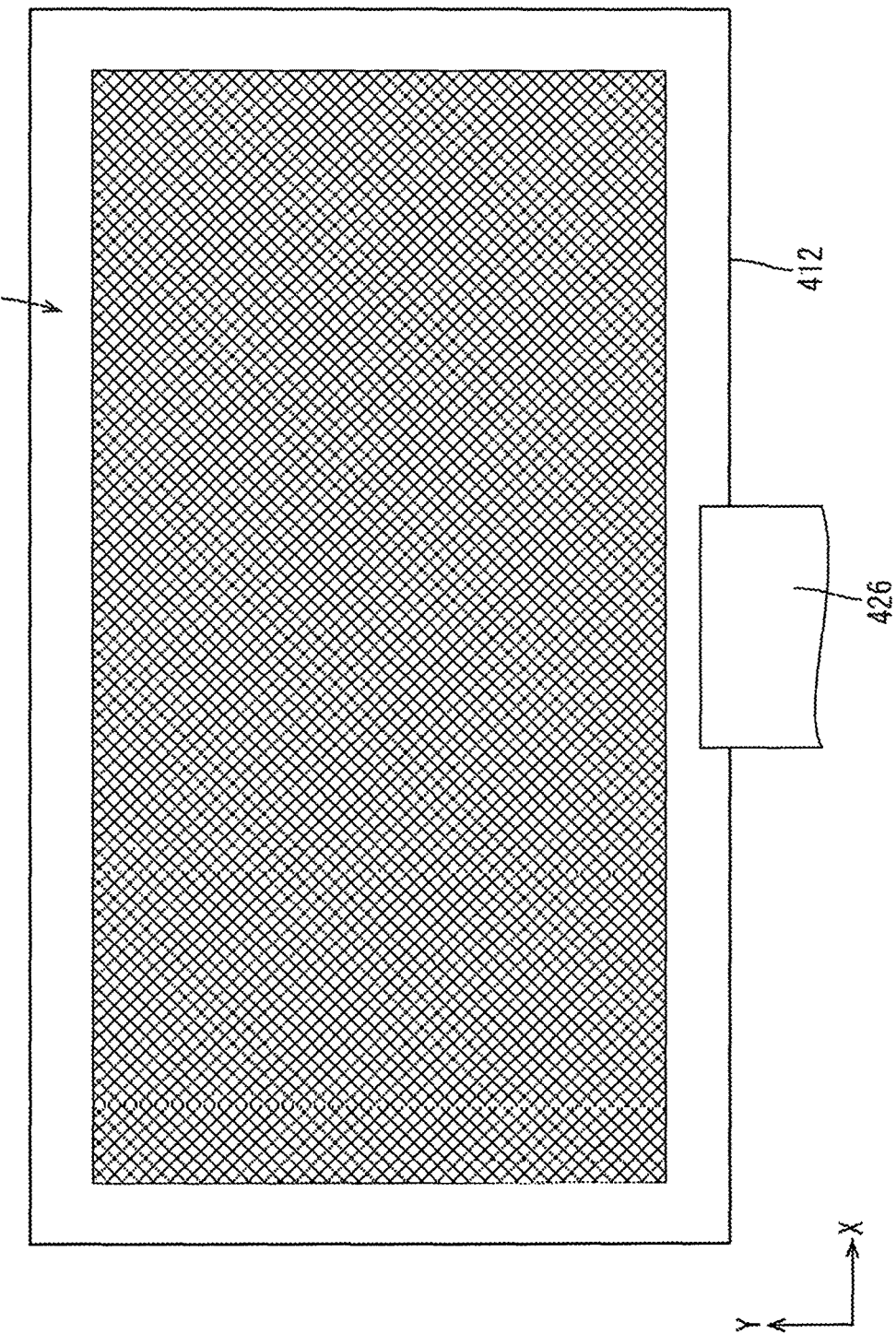

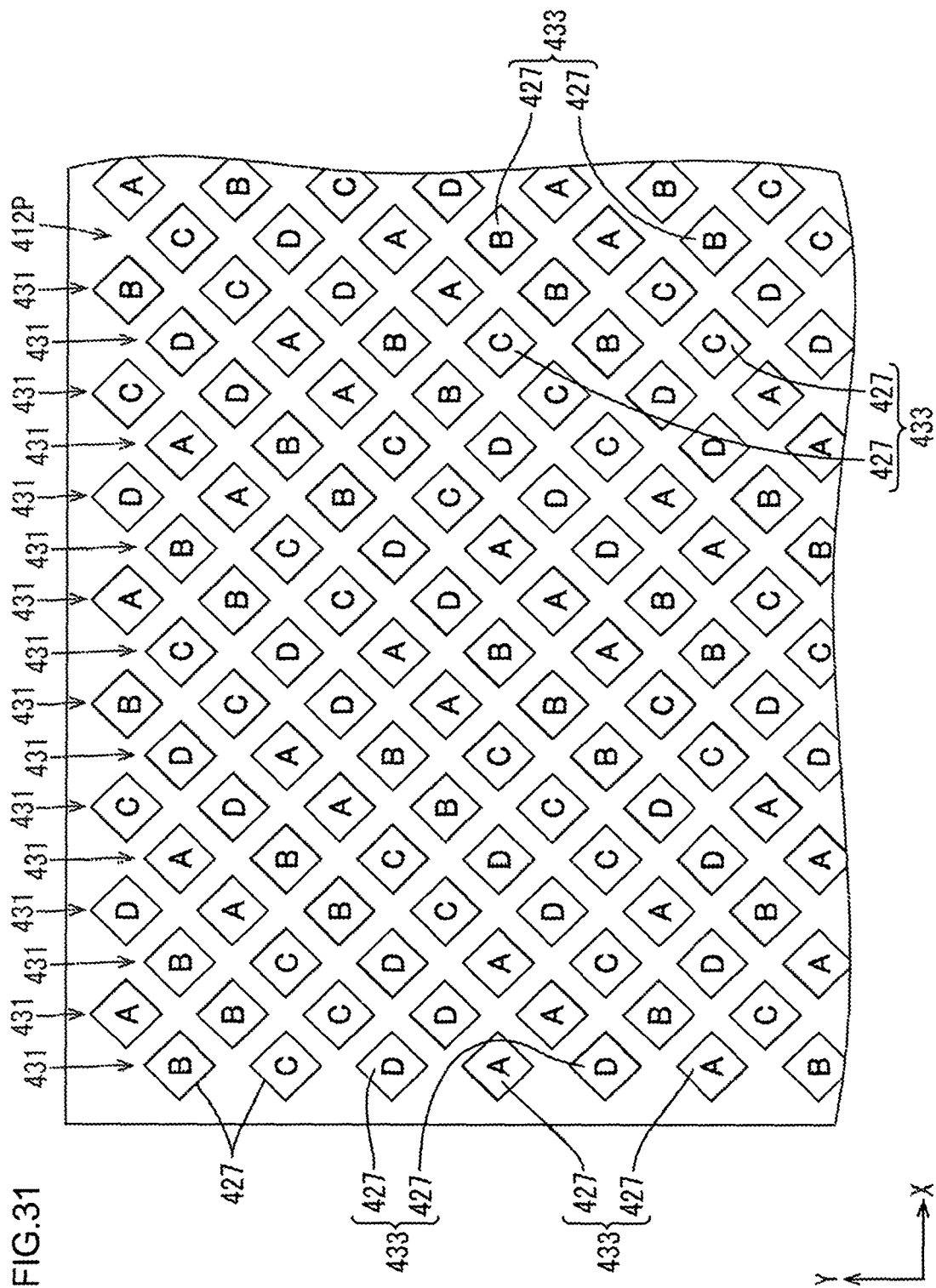

POSITION INPUTTING DEVICE AND DISPLAY DEVICE WITH POSITION INPUTTING FUNCTION

TECHNICAL FIELD

The present invention relates to a position inputting device and a display device with a position inputting function.

BACKGROUND ART

In recent years, more and more electronic devices such as tablet personal computers and portable digital assistants include touchscreens to improve operability and usability. When a user touch a display surface of a liquid crystal panel with a finger or a stylus, position information in a display surface of the liquid crystal panel is entered. This provides the user with intuitive operation, that is, direct feeling as if he or she touches an image displayed on the liquid crystal panel. Examples of such touchscreens include touchscreens disclosed in Patent Document 1 and Patent Document 2.

Patent Document 1 discloses a self-capacitance touchscreen including a sensing path layer and an eliminating path layer. The sensing path layer includes multiple first paths and multiple second paths. The eliminating path layer includes multiple third paths. According to the configuration, real coordinates of multiple touched points can be determined. Patent Document 2 discloses compensations of pixels included in a touch sensor panel that generate erroneous readings (so-called "negative pixels") due to a poor grounding condition of the object that touches the touch sensor panel in a mutual-capacitance touchscreen. Patent Document 3 discloses a method using a combination of a self-capacitance method and a mutual-capacitance method. A mutual-capacitance touchscreen is configured to scan first-axis electrodes arranged along a first axis and second-axis electrodes arranged along a second axis by a controller, to obtain the first-axis electrodes and the second-axis electrodes whose self-capacitances have changed, to determine a mutual-capacitance at each intersection of the first-axis electrodes and the second-axis electrodes whose self-capacitances have changed, to determine whether the mutual-capacitance has changed, and to determine an area in which the mutual-capacitance has changed as a contact area.

RELATED ART DOCUMENT

Patent Document

Patent Document 1: Japanese Translation of PCT International Application Publication No. 2013-534343
Patent Document 2: Japanese Translation of PCT International Application Publication No. 2012-502397
Patent Document 3: Japanese Translation of PCT International Application Publication No. 2013-515302

PROBLEM TO BE SOLVED BY THE INVENTION

The self-capacitance touchscreen disclosed in Patent Document 1 requires the eliminating path layer in addition to the sensing path layer. Therefore, a production cost of the touchscreen is high. Furthermore, it is very difficult to build the touchscreen inside the display panel, that is, it is very difficult to apply an in-cell technology. On the mutual-capacitance touchscreen disclosed in Patent Document 2, the scan is performed for a specific with time division. Therefore, detection is performed for one line for a shorter period. As a screen size of the display panel increases and a total number of lines of electrodes increases, a detection period becomes shorter and detection sensitivity is more likely to decrease. Therefore, it is difficult to apply the technology disclosed in Patent Document 2 to large screens. According to Patent Document 3, the sensing path layer required in Patent Document 1 is not required. Furthermore, a problem regarding Patent Document 2, which includes the decrease in detection sensitivity, may be expected to be resolved to a certain extent according to Patent Document 3. However, another problem may be raised; for instance, a detection circuit may become significantly complicated. Although the detection sensitivity may be improved to a certain extent, the mutual-capacitance method and the self-capacitance method are both used in Patent Document 3 and thus it is still difficult to apply the technology to the large screens.

Other than the problem described above (a first problem), there is another problem (a second problem). In the in-cell technology for building a touchscreen pattern inside a display panel, a common electrode that is ordinarily included in the display panel may be used as an electrode for the touchscreen pattern. However, the common electrode is usually made of material such as ITO having a resistance higher than that of metal material resulting in high wiring resistance in the touchscreen pattern.

DISCLOSURE OF THE PRESENT INVENTION

The technology disclosed in this description was made in view of the above circumstances. A first object is to detect multiple input positions while maintaining a sufficient detection period. A second object is to reduce a wiring resistance.

Means for Solving the Problem

A first position inputting device according to the present invention includes first electrodes, first electrode lines, first electrode groups, first traces, second electrodes, second electrode lines, second electrode groups, and second traces. The first electrode lines include the plurality of first electrodes arranged along a first direction. The first electrode lines are arranged along a second direction perpendicular to the first direction. Each of the first electrode groups includes the first electrodes included in the first electrode lines. The first traces are for connecting the first electrodes belonging to the first electrode groups per first electrode line. Each of the first traces is connected to the first electrodes belonging to the corresponding first electrode group to apply an electrical potential to the first electrodes per first electrode group. The second electrode lines include second electrodes arranged along the second direction. The second electrode lines are arranged along the first direction. Each of the second electrode groups includes the second electrodes included in the second electrode lines. The second traces are for connecting the second electrodes belonging to the second electrode groups per second electrode line. Each of the second traces is connected to the second electrodes belonging to the corresponding second electrode group to apply an electrical potential to the second electrodes per second electrode group.

According to the configuration, when a user inputs a position, capacitances of the first electrode and the second electrode at the input position vary. By detecting the variations in capacitance, the input position is determined with respect to the first direction and the second direction. If the user inputs multiple positions at the same time, a ghost position that is not an actual input position may be detected with a known self-capacitance method. Because multiple electrodes in the touch electrode lines belong to each of the electrode group as described above and the electrical potential is applied to the electrodes with the trace connected to the electrodes per electrode group, the actual input position can properly detected.

The first electrodes in the first electrode lines are grouped into the first electrode groups. Each first electrode group includes multiple first electrodes. If the capacitance of the first electrode at the actual input position varies, a variation in capacitance of the other first electrode in the same first electrode group in the first electrode line may be detected. In the above situation, the capacitance of the first electrode adjacent to the first electrode at the actual input position with respect to the second direction varies. Therefore, a variation in capacitance of the other first electrode in the same first electrode group in the first electrode line may be detected. Similarly, the second electrodes in the second electrode lines are grouped into the second electrode groups. Each second electrode group includes multiple second electrodes. If the capacitance of the second electrode at the actual input position varies, a variation in capacitance of the other second electrode in the same second electrode group in the second electrode line may be detected. In the above situation, the capacitance of the second electrode adjacent to the second electrode at the actual input position with respect to the first direction varies. Therefore, a variation in capacitance of the other second electrode in the same second electrode group in the second electrode line may be detected.

The first electrodes and the second electrodes at the actual input positions are determined based on relationships between combinations of the first electrode groups with varied capacitances in the first electrode lines adjacent to each other and combinations of the second electrode groups with varied capacitances in the second electrode lines adjacent to each other. Even if the positions are input at the same time, the ghost positions are less likely to be detected and thus the actual input positions are properly detected. Although the known mutual-capacitance method requires scanning of the touch electrodes, the scanning is not required according to the above configuration. Therefore, the detection can be performed for a longer period and thus high detection sensitivity can be achieved.

Preferred embodiments of a first position inputting device according to the present invention may include the following configurations.

(1) The number of the first traces that are electrically independent from one another for connecting the first electrodes included in a single first electrode line may be equal to the number of the first electrode groups. The number of the second traces that are electrically independent from one another for connecting the second electrodes included in a signal second electrode line may be equal to the number of the second electrode groups. The number of the first traces connecting the first electrodes in one first electrode line and electrically independent from one another may be equal to the number of the first electrode groups. Furthermore, the number of the second traces connecting the second electrodes in one second electrode line and electrically independent from one another may be equal to the number of the second electrode groups. According to the configuration, the first traces are assigned to the first electrode groups, respectively, in each first electrode line. The first traces are connected to the first electrodes in the respective first electrode groups, respectively. Furthermore, the second traces are assigned to the second electrode groups, respectively, in each second electrode line. The second traces are connected to the second electrodes in the respective second electrode groups, respectively. In comparison to a configuration in which several first traces are assigned to each first electrode group in each first electrode line and several second traces are assigned to each second electrode group in each second electrode line, a percentage of the capacitance related to the first electrodes in the first electrode group in the capacitance related to the first traces is higher and a percentage of the capacitance related to the second electrodes in the second electrode group in the capacitance related to the second traces is higher. Therefore, further higher detection sensitivity can be achieved.

(2) Each of the first electrode lines may be configured such that the first electrodes adjacent to one another with respect to the first direction belong to the first electrode groups that are different from one another. Each of the second electrode lines may be configured such that the second electrodes adjacent to one another with respect to the second direction belong to the second electrode groups that are different from one another. If the first electrodes adjacent to each other with respect to the first direction belong to the same first electrode group, the capacitances of two first electrodes adjacent to each other with respect to the first direction vary even when the other first electrode in the same first electrode group is at the actual input position. Therefore, a ghost position may be detected. This is the same for the second electrodes. As described above, the first electrode lines are configured such that the first electrodes adjacent to each other with respect to the first direction belong to the different first electrode groups. Furthermore, the second electrode lines are configured such that the second electrodes adjacent to each other with respect to the second direction belong to the different second electrode groups. Therefore, the capacitances of two first electrodes adjacent to each other with respect to the first direction are less likely to vary. Furthermore, the capacitances of two second electrodes adjacent to each other with respect to the second direction are less likely to vary. Therefore, ghost positions are less likely to be detected.

(3) The first electrode lines may be configured that combinations of the first electrode groups to which the first electrodes adjacent to one another with respect to the second direction belong are different from one another within a range of at least 20 cm with respect to the first direction. The second electrode lines may be configured that combinations of the second electrode groups to which the second electrodes adjacent to one another with respect to the first direction belong are different from one another within a range of at least 20 cm with respect to the second direction. When the user inputs the positions, the capacitances of the first electrode at the actual input position and the first electrode adjacent to the first electrode with respect to the second direction vary. Furthermore, the capacitances of the second electrode at the actual input position and the second electrode adjacent to the second electrode with respect to the first direction vary. When the user spreads the fingers of one hand, a range within reach of two fingers of the user is about 20 cm or smaller. Therefore, the capacitances vary only in one combination of the first electrode groups in the first touch electrode lines adjacent to each other and the capacitances vary in one combination of the second electrode groups in the second electrode lines as long as the user input the positions with the fingers of one hand. Therefore, the actual input positions are properly detected while further properly excluding ghost positions.

(4) The first electrode lines may be configured that combinations of the first electrode groups to which the first electrodes adjacent to one another with respect to the second direction belong are all different from one another. The second electrode lines may be configured that combination of the second electrode groups to which the second electrodes adjacent to one another with respect to the first direction belong are all different from one another. When the user inputs the positions, the capacitances of the first electrodes at the actual input position and the first electrode adjacent to the first electrode with respect to the second direction vary and the capacitances of the second electrodes at the actual input position and the second electrode adjacent to the second electrode with respect to the second direction vary. The capacitances vary only in one combination of the first electrode groups in the first electrode lines adjacent to one another and the capacitances vary in one combination of the second electrode groups in the second electrode lines. Therefore, the actual input positions are properly detected while further properly excluding ghost positions. For different combinations of the electrode groups, the number of the first electrode groups may be set equal to or larger than the square root (or power root) of the lines of the first electrodes arranged along the first direction and the number of the second electrode groups may be set equal to or larger than the square root (or power root) of the lines of the second electrodes arranged along the second direction.

(5) The first electrode lines may be configured that combinations of the first electrode groups are different from one another within a range of at least 20 cm with respect to the first direction. Each of the combinations may include at least three first electrodes adjacent to one another with respect to the second direction. The second electrode lines may be configured that combinations of the second electrode groups are different from one another within a range of at least 20 cm with respect to the second direction. Each of the combinations may include at least three second electrodes adjacent to one another with respect to the first direction. When the user inputs the positions, the capacitances of the first electrode at the actual input position and the adjacent first electrodes sandwiching the first electrode with respect to the second direction vary. Furthermore, the capacitances of the second touch electrode at the actual input position and the adjacent second touch electrodes sandwiching the second electrode with respect to the first direction vary. When the user spreads the fingers of one hand, a range within reach of two fingers of the user is about 20 cm or smaller. According to the above configuration, as long as the user input positions with the fingers of one hand, variations in capacitance are detected only in the following two combinations: a combination of the first electrode groups in at least three first electrode lines adjacent to one another; and a combination of the second electrode groups in at least three second electrode lines adjacent to one another. Therefore, the ghost positions are further properly excluded and thus the actual input positions are properly detected.

(6) The first electrode lines may be configured that combinations of the first electrode groups are all different from one another. Each of the combinations may include at least three first electrodes adjacent to one another with respect to the second direction. The second electrode lines may be configured that combinations of the second electrode groups are all different from one another. Each of the combinations may include at least three second electrodes adjacent to one another with respect to the first direction. When the user inputs the positions, the capacitances of the first electrodes at the actual input position and at least two adjacent first touch electrodes 227 sandwiching the first electrode with respect to the second direction vary. Furthermore, the capacitances of the second electrodes at the actual input position and at least two adjacent second electrodes sandwiching the second electrode with respect to the first direction vary. Variations in capacitance are detected only in the following two combinations: a combination of the first electrode groups in at least three first electrode lines adjacent to one another; and a combination of the second electrode groups in at least three second touch electrode lines adjacent to one another. Therefore, the ghost positions are further properly excluded and thus the actually touched positions are properly detected. To make all the combinations of the touch electrode groups different, the number of the first electrode groups may be set equal to or larger than the cubic root of the lines of the first electrodes arranged along the first direction and the number of the second electrode groups may be set equal to or larger than the cubic root of the lines of the second electrodes arranged along the second direction. It is suitable for reducing the number of the electrode groups and the number of the traces.

A second position inputting device according to the present invention includes electrode, electrode lines, electrode groups, and traces. The electrode lines include the electrodes arranged along a first direction. The electrode lines are arranged along the second direction perpendicular to the first direction. Each of the electrode groups includes the electrodes included in the electrode lines. The traces are for connecting the electrodes belonging to the electrode groups per electrode line. Each of the traces is connected to the electrodes belonging to the corresponding electrode group to apply an electrical potential to the electrodes per electrode group.

According to the configuration, when the user inputs a position, a capacitance of the electrode at the input position varies. By detecting the variation in the capacitance, the input position with respect to the first direction and the second direction is determined. The electrodes in each electrode line are grouped into the electrode groups each including multiple electrodes. If the capacitance of the electrode at the actual input position varies, variations in capacitances of other electrodes in the electrode group to which the electrode having the varied capacitance belongs in the electrode line including the electrode having the varied capacitance are detected. The capacitance of the electrode adjacent to the electrode at the actual input position with respect to the second direction varies. Variations in capacitance of other electrodes belonging to the same electrode group in the electrode line including the electrode adjacent to the electrode at the actual input position with respect to the second direction are detected. Therefore, the electrode at the actual input position is properly detected based on a combination of the electrode groups having the varied capacitances in the adjacent electrode lines.

If the user inputs multiple positions at the same time, a ghost position that is not an actual input position may be detected with a known self-capacitance method. As described above, the electrodes in each electrode line are grouped into the electrode groups. Furthermore, the electrical potentials are applied to the respective groups via the traces connected to the electrodes. According to the configuration, the actual input position is properly detected. It is not necessary to scan the electrodes, which is required in the know mutual-capacitance method. Therefore, the detection can be performed for a longer period and thus high detection sensitivity is achieved.

Preferred embodiments of a second position inputting device according to the present invention may include the following configurations.

(1) The number of the traces that are electrically independent from one another for connecting the electrodes included in a single electrode line may be equal to the number of the electrode groups. According to the configuration, the traces are assigned to the electrode groups, respectively, in each electrode line. The traces are connected to the electrodes in the respective electrode groups, respectively. In comparison to a configuration in which several traces are assigned to each electrode group in each electrode line, a percentage of the capacitance related to the electrodes in the electrode group in the capacitance related to the traces is higher. Therefore, further higher detection sensitivity can be achieved.

A first display device with a position inputting function according to the present invention includes at least the position inputting device described above and a display panel including the position inputting device.

With the display panel and the position inputting device, interactions between the input operation of the user and the display panel can be smoothly performed. This configuration is suitable for improving usability.

Preferred embodiments of a display device with a first position inputting device according to the present invention may include the following configurations.

(1) The display panel may include a display electrode, the first electrodes and the second electrodes or the electrodes, the first traces and the second traces or the traces, and an insulating film. The first electrodes and the second electrodes or the electrodes may be formed from a transparent electrode film. The first traces and the second traces or the traces may be formed from a metal film. The insulating film may be disposed between the first electrodes and the second electrodes or the electrodes and the first traces and the second traces or the traces. The insulating film may include contact holes formed at positions overlapping the first electrodes and the second electrodes or the electrodes and the first traces and the second traces or the traces. Although the first electrodes and the second electrodes are formed from the transparent electrode film, the traces formed from the metal film are connected to the first electrodes and the second electrodes or the electrodes via the contact holes in the insulating film. The insulating film is provided between the transparent electrode film and the metal film. According to the configuration, the wiring resistances in the path for applying the electrical potentials to the first electrodes and the second electrodes can be maintained low. Because the insulating film is provided between the transparent electrode film and the traces formed from the metal film, high flexibility is achieved in routing of the traces. Furthermore, first traces and the second traces or the traces are properly connected to the corresponding first electrodes and the corresponding second electrodes or the corresponding electrodes.

A second display device with a position inputting function includes a display electrode, a position inputting electrode, traces, and an insulating film. The position inputting electrode is formed from a transparent electrode film for detecting an input position. The traces are formed from a metal film and connected to the position inputting electrode for applying an electrical potential to the position inputting electrode. The traces include a first trace extending along a first direction and a second trace extending along a second direction perpendicular to the first direction. The insulating film is disposed between the position inputting electrodes and the traces. The insulating film includes a contact hole formed at a position overlapping at least the position inputting electrode or the first trace and the second trace.

Although the position inputting electrode is formed from a transparent electrode film, at least one of the first traces 129 and the second traces 130 included in the traces formed from the metal film are connected to the position inputting electrode via the contact holes in the insulating film. The insulating film is provided between the transparent electrode film and the metal film. According to the configuration, the wiring resistances in the path for applying the electrical potential to the position inputting electrode can be maintained low. Because the insulating film is provided between the transparent electrode film and the traces formed from the metal film, high flexibility is achieved in routing of the first traces and the second traces included in the traces. Furthermore, at least one of the first traces and the second traces are properly connected to the position inputting electrode.

Preferred embodiments of a display device with a second position inputting device according to the present invention may include the following configurations.

(1) The position inputting electrode may include a first position inputting electrode connected to the first trace and a second position inputting electrode connected to the second trace. The contact hole may include a first contact hole formed at a position overlapping the first position inputting electrode and the first traces and a second contact hole formed at a position overlapping the second position inputting electrode and the second trace. Because the first trace and the second trace that are perpendicular to each other are connected to the first position inputting electrode and the second position inputting electrode via the first contact hole and the second contact hole, high flexibility is achieved in routing the first trace and the second trace. Furthermore, the first trace and the second trace are properly connected to the first position inputting electrode and the second position inputting electrode.

(2) The second trace may include segment second traces sandwiching the first trace with respect to the second direction. The position inputting electrode may include a trace-crossing portion that crosses the first trace with respect to the second direction. A portion of the trace-crossing portion may be arranged to overlap the segment second traces sandwiching the first trace. The insulating film may include the contact hole formed at a position overlapping the segment second traces and the trace-crossing portion. The second trace may include the segment second traces sandwiching the first trace with respect to the second direction. The segment second traces are connected to the trace-crossing portion included in the position inputting electrode and crossing the first trace with respect to the second direction via the contact hole in the insulating film. According to the configuration, the wiring resistance in the path for applying the electrical potential to the position inputting electrode through the first trace and the second trace formed from the metal film is maintained further lower. Furthermore, this configuration is suitable for increasing the flexibility in arrangement of the traces and for the position inputting electrode that is complicatedly arranged.

(3) The display electrode includes pixel electrodes and a common electrode formed from a transparent electrode film and provided with respect to the pixel electrodes. The position inputting electrode is formed from the transparent electrode film that forms the common electrode. Because the position inputting electrode for detecting the input position is formed from the same transparent electrode film as the common electrode, the configuration of the display device with the position inputting function is simplified and high flexibility in shape and size of the position inputting electrode is achieved.

(4) The position inputting electrode may include segment position inputting electrodes and a link for connecting portions of the segment position inputting electrodes. The traces may be arranged to pass through between the adjacent segment position inputting electrodes. Because the position inputting electrode includes the segment position inputting electrodes and the link for connecting portions of the segment position inputting electrodes and the traces are arranged to pass through between the adjacent segment position inputting electrodes, a parasitic capacitance between the traces and the position inputting electrode can be reduced. Therefore, rounding is less likely to occur in electrical potentials (signals) transmitted to the traces.

(5) A light blocking portion may be provided between the pixel electrodes. A separating point of the segment position inputting electrodes of the position inputting electrode may be located between the adjacent pixel electrodes. The traces are arranged to overlap the light blocking portion. Because the separating point of the segment position inputting electrodes is located between the adjacent pixel electrodes and the first traces passed through between the segment position inputting electrodes are arranged to overlap the light blocking portion, light rays passing through the pixel electrodes are less likely to be blocked by the traces. Therefore, an aperture ratio improves. Because the traces are arranged to overlap the light blocking portion, ambient light is less likely to be directly applied to the traces and less likely to be irregularly reflected. Therefore, the traces are less likely to be directly viewed by the user and thus contrast is less likely to decrease under the ambient light and moire is less likely to occur. Therefore, visibility of a displayed image improves.

(6) A separating portion of the segment position inputting electrodes of the position inputting electrode may be located between the adjacent pixel electrodes. The insulating film may be disposed such that the contact hole overlaps the link. In comparison to a configuration in which the contact hole is arranged to overlap the segment position inputting electrodes, it is not required to arrange portions of the traces to overlap the segment position inputting electrodes. Because the separating point of the segment position inputting electrodes is located between the adjacent pixel electrodes, the light rays passing through the pixel electrodes are less likely to reach the connections between the traces and the position inputting electrode. Therefore, the display unevenness is less likely to occur.

(7) A color filter including color portions arranged to overlap the pixel electrodes and exhibiting different colors may be provides. The insulating film may be disposed such that the contact hole is between adjacent color portions exhibiting a specific color. Because the color portions are arranged to overlap the pixel electrodes, the light blocking portion is arranged between the adjacent color portions and to overlap the contact hole. Although most of light rays passing through the contact hole are blocked by the light blocking portion, some of the light rays leak to a color portion side. This may cause color unevenness. Because the contact hole is located between the adjacent color portions in combinations of the specific color, even if the light rays leak, the light rays are less likely to be viewed as color unevenness. Furthermore, the contact hole is regularly arranged and thus high workability is achieved in a display inspection.

(8) A color filter including color portions arranged to overlap the pixel electrode and exhibiting at least blue, green, and red, respectively, may be provided. The insulating film may be disposed such that the contact hole is between the adjacent color portions exhibiting blue and red, respectively.

Because the color portions are arranged to overlap the pixel electrodes, the light blocking portion is arranged between the adjacent color portions and to overlap the contact hole. Although most of light rays passing through the contact hole are blocked by the light blocking portion, some of the light rays leak to the color portion side. To reduce such a leak, the area in which the light blocking portion is formed may be increased to block the larger number of light rays passing through the contact hole. However, the amount of light passing through the color portions may decrease and thus the brightness may decrease. With the contact hole located between the blue color portion and the red color portion, the amount of light passing through the green color portion and most contributing to the brightness is less likely to decrease. Therefore, a decrease in brightness related to the contact hole is less likely to occur.

(9) The traces may be formed in a mesh pattern to pass through between the adjacent segment position inputting electrodes. Because the traces are formed in the mesh pattern, the wiring resistances can be reduced.

(10) The display device may include a color filter, unit pixels, and a display pixel. The color filter may include color portions arranged to overlap the pixel electrode and exhibiting colors different from one another. The unit pixels may include pixel electrodes and the color portions. The display pixel may include the unit pixels adjacent to one another and exhibiting colors different from one another. The segment position inputting electrodes may have a size to cover the pixel electrodes included in the display unit pixels of the display pixel. Each of the segment position inputting electrodes has an area that covers the pixel electrodes included in the unit pixels of the display pixel. With the segment position inputting electrodes each having the areas that cover the pixel electrodes included in the unit pixels of the display pixel, the capacitance across the pixel electrodes and the common electrode remain stable. Therefore, the display unevenness is less likely to occur.

(11) The display electrode may include pixel electrodes and a common electrode formed from a transparent electrode film and provided with respect to the pixel electrodes. The position inputting electrode may be formed from the transparent electrode film that forms the common electrode and include position inputting electrodes formed by dividing the transparent electrode film into segments at positions between the adjacent pixel electrodes. Because the position inputting electrode is formed from the transparent electrode film that forms the common electrode, high flexibility in shape and size of the position inputting electrode is achieved. Because the position inputting electrode is formed by dividing the transparent electrode film that forms the common electrode at the positions between the adjacent pixel electrodes, the overlapping areas between the pixel electrodes and the common electrode are equalized, that is, the capacitances between the electrodes that overlap each other are equalized. Therefore, the display unevenness is less likely to occur.

Advantageous Effect of the Invention

A first effect according to the present invention is that multiple input positions are detectable while maintaining a sufficient detection period. A second effect is that a wiring resistance can be reduced.

BRIEF DESCRIPTION OF THE DRAWINGS

FIG. 23 is a table illustrating first touch electrode groups that include first touch electrodes in first touch electrode lines in a touchscreen pattern with a matrix according to a third embodiment of the present invention.

FIG. 24 is a table illustrating second touch electrode groups that include second touch electrodes in second touch electrode lines in the touchscreen pattern with a matrix.

FIG. 25 is a table illustrating a condition that variations in capacitance of three first touch electrodes adjacent to one another in the X-axis direction in response to a touching operation performed by a user are detected.

FIG. 27 is a table created by combining FIGS. 25 and 26.

FIG. 30 is a plan view of a touchscreen according a fifth embodiment of the present invention.

FIG. 31 is a plan view schematically illustrating an arrangement of first touch electrodes in a touchscreen pattern included in the touchscreen.

MODE FOR CARRYING OUT THE INVENTION

<First Embodiment>

Figure 1:
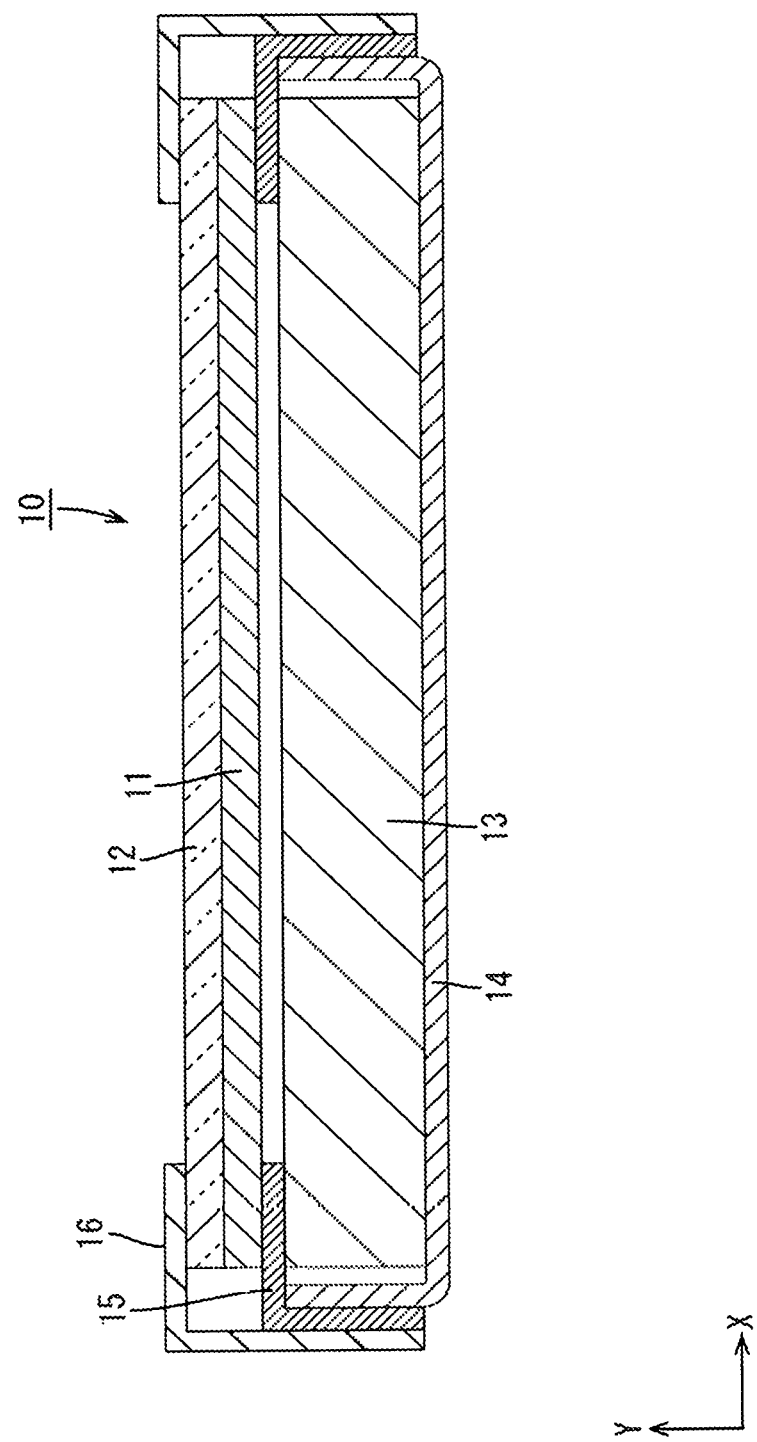
FIG. 1 is an exploded perspective view illustrating a general configuration of a liquid crystal display device according to a first embodiment of the present invention.

A first embodiment of the present invention will be described with reference to FIGS. 1 to 16. In this section, a liquid crystal display device 10 (a display device with a position inputting function) including a touchscreen 12 (a position inputting device) will be described. X-axes, Y-axes, and Z-axes may be present in the drawings. The axes in each drawing correspond to the respective axes in other drawings.

A configuration of the liquid crystal display device 10 will be described. As illustrated in FIG. 1, the liquid crystal display device 10 includes a liquid crystal panel 11 (a display panel), a touchscreen 12, and a backlight unit 13 (a lighting unit). The liquid crystal panel 11 is for displaying images. The touchscreen is arranged to face an outer side (a front side) of the liquid crystal panel 11. The backlight unit 13 is an external light source for illuminating the liquid crystal panel 11 and the touchscreen 12. The liquid crystal panel 11 and the touchscreen 12 are arranged in layers and opposed to each other. The liquid crystal panel 11 and the touchscreen 12 are fixed to each other with a substantially transparent adhesive (not illustrated) and integrated with each other. The liquid crystal display device 10 further includes a chassis 14, a frame 15, and a bezel 16. The chassis 14 holds the backlight unit 13 therein. The backlight unit 13 is held between the chassis 14 and the frame 15. The liquid crystal panel 11 and the touchscreen 12 are held between the frame 15 and the bezel 16.

The liquid crystal display device 10 according to this embodiment is targeted for various electronic devices (not illustrated) including notebook personal computers (including tablet personal computers) and desktop personal computers. Therefore, a screen size of the liquid crystal panel 11 in the liquid crystal display device 10 may be 10 plus some inches to 30 plus some inches, which is usually categorized as a small-to-medium size or a medium size.

Figure 2:
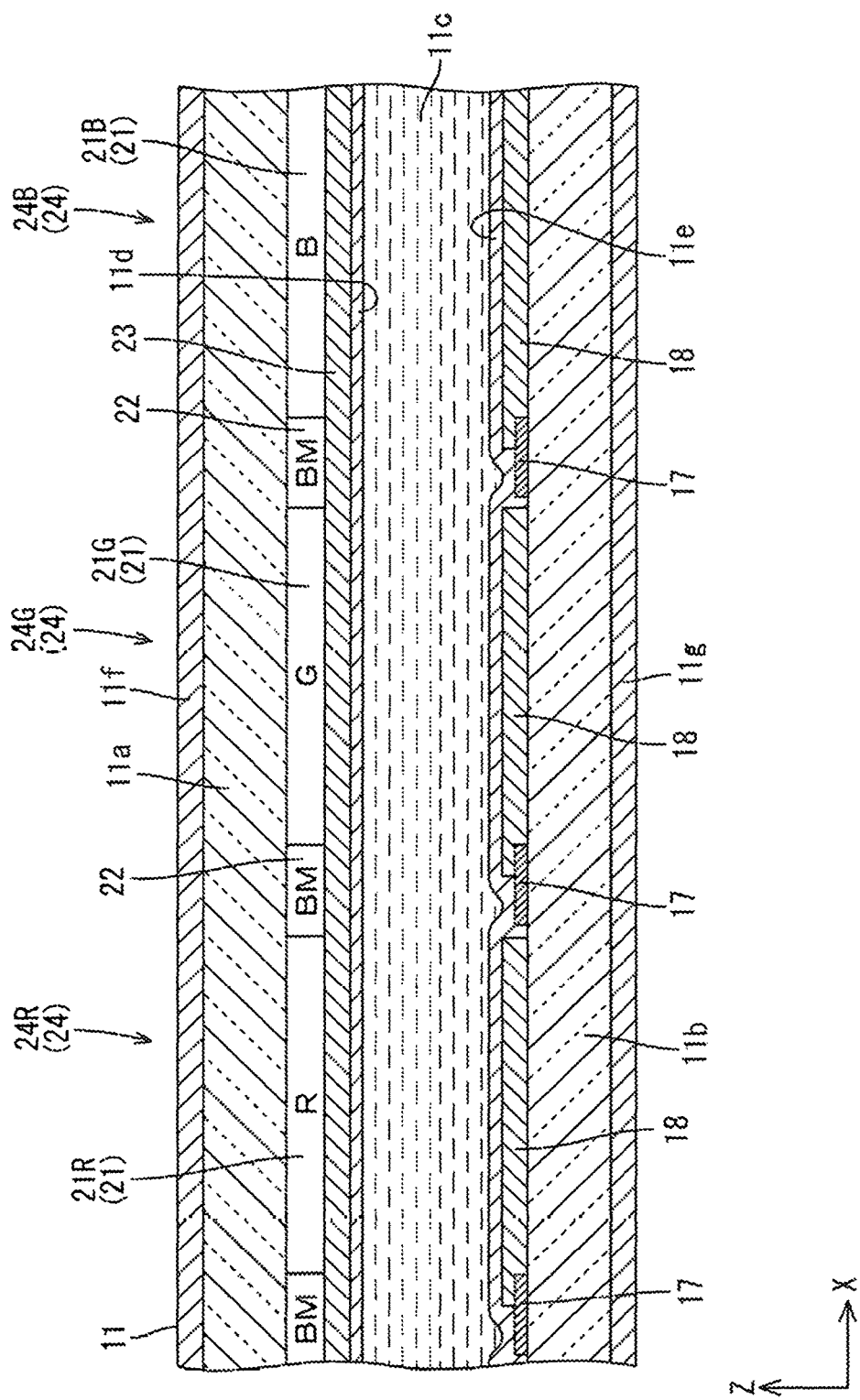
FIG. 2 is a schematic cross-sectional view illustrating a cross-sectional configuration of a liquid crystal panel.

As illustrated in FIG. 2, the liquid crystal panel 11 includes a pair of transparent boards 11a and 11b (having high light transmissivity) and a liquid crystal layer 11c between the boards 11a and 11b. The liquid crystal layer 11c includes liquid crystal molecules that are substances having optical properties that vary according to application of an electrical field. The boards 11a and 11b are bonded together with a sealing agent, which is not illustrated, with a cell gap corresponding to a thickness of the liquid crystal layer 11c. The boards 11a and 11b include substantially transparent glass substrates, respectively. Multiple films are formed in layers on each glass substrate by a known method such as a photolithography method. One of the boards 11a and 11b on the front side is a CF board 11a (a counter board) and the other one on the rear side (back side) is an array board 11b (a component board, an active matrix board). Alignment films 11d and 11e for aligning the liquid crystal molecules in the liquid crystal layer 11c are formed on inner surfaces of the board 11a and 11b, respectively. Polarizing plates 11f and 11g are bonded to outer surfaces of the boards 11a and 11b, respectively.

Figure 3:
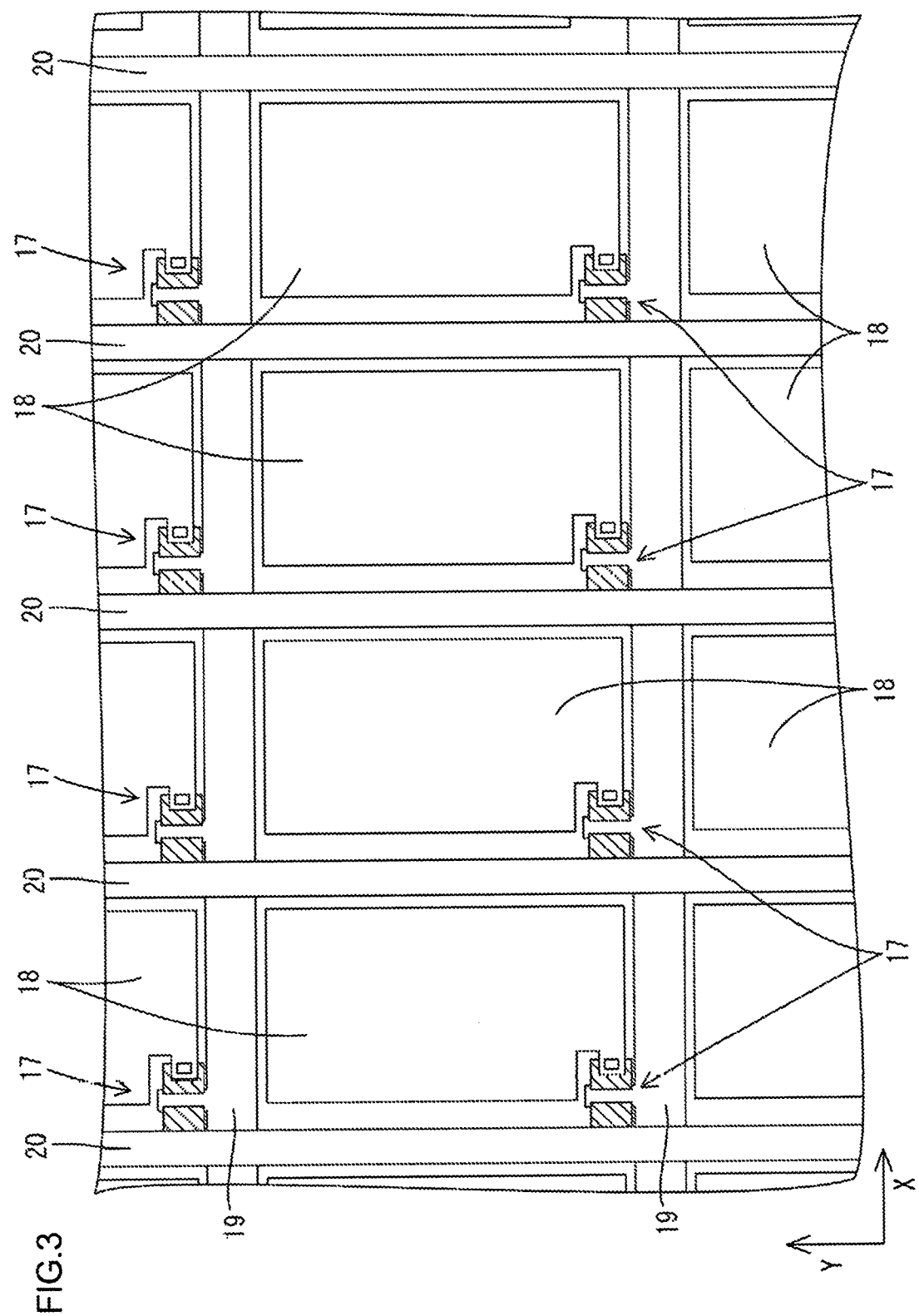
FIG. 3 is a magnified plan view illustrating a planar configuration of a display area of an array board included in the liquid crystal panel.

As illustrated in FIGS. 2 and 3, a large number of thin film transistors (TFTs) 17 and a large number of pixel electrodes 18 (display electrodes) are arranged in a matrix on the inner surface of the array board 11b (on the liquid crystal layer 11c side, on the surface opposed to the CF board 11a). The TFTs 17 are switching components. Gate traces 19 and source traces 20 are arranged to form a lattice pattern such that the TFTs 17 and the pixel electrodes 18 are surrounded by the gate traces 19 and the source traces 20. Namely, the TFTs 17 and the pixel electrodes 18 are arranged in a matrix at intersections of the gate traces 19 and the source traces 20 that form the lattice pattern. The gate traces 19 are connected to gate electrodes of the TFTs 17 and the source traces 20 are connected to source electrodes of the TFTs 17. The pixel electrodes 18 are connected to drain electrodes of the TFTs 17. Each pixel electrode 18 has a vertically-long quadrilateral shape (a rectangular shape) in a plan view. The pixel electrodes 18 are made from a light transmitting conductive film made of transparent electrode material having high light transmissivity and high conductivity such as indium tin oxide (ITO) and zinc oxide (ZnO). Capacitance traces (not illustrated) may be formed on the array board 11b to extend parallel to the gate traces 19 and across the pixel electrodes 18. A liquid crystal driver circuit is connected to the array board 11b with a flexible circuit board, which is not illustrated. Driving of each TFT 17 is controlled based on signals supplied by the liquid crystal driver circuit to apply electrical potentials to the pixel electrodes 18.

Figure 4:
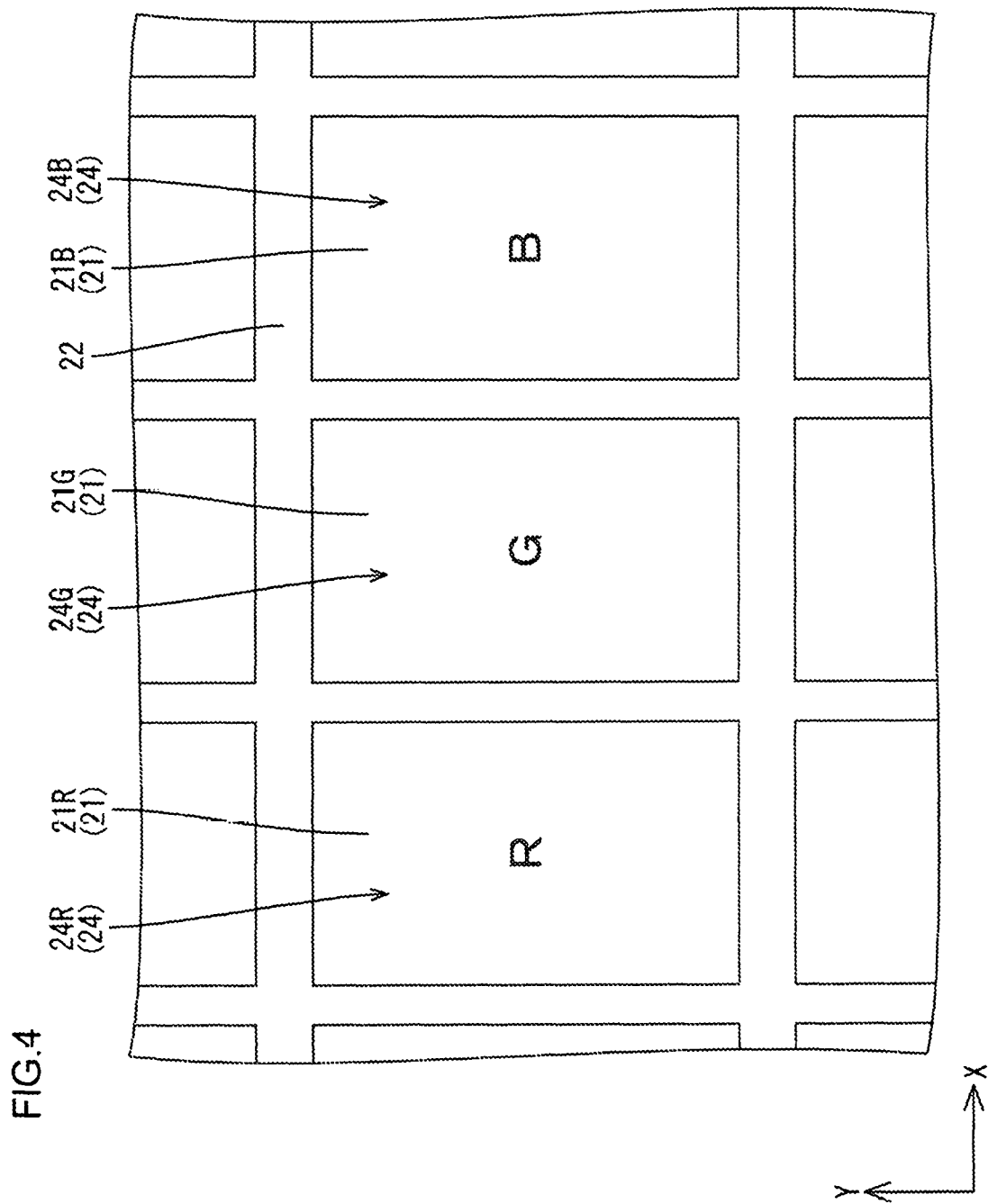
FIG. 4 is a magnified plan view illustrating a planar configuration of a display area of a CF board included in the liquid crystal panel.

As illustrated in FIGS. 2 and 4, a color filter 21 is formed on the CF board 11a. The color filter 21 includes a number of red (R), green (G), and blue (B) color portions 21R, 21G, and 21B arranged in a matrix to overlap the pixel electrodes 18 on the array board 11b in a plan view. A light blocking layer 22 (a black matrix) is formed in a lattice pattern between the color portions 21R, 21G, and 21B of the color filter 21 for reducing color mixture. The light blocking layer 22 is arranged to overlap the gate traces 19 and the source traces 20 in a plan view. A common electrode 23 (a counter electrode, a display electrode) is formed in a solid pattern over surfaces of the color filter 21 and the light blocking layer 22 to face the pixel electrodes 18 on the array board 11b. The common electrode 23 is made from a light transmitting conductive film made of transparent electrode material having high light transmissivity and high conductivity such as indium tin oxide (ITO) and zinc oxide (ZnO), similarly to the pixel electrodes 18. A substantially constant electrical potential (a reference electrical potential) is applied to the common electrode 23 by the liquid crystal driver circuit connected to the array board 11b via a transfer pad, which is not illustrated. A predefined potential difference is generated between the common electrode 23 and the pixel electrode 18 that is charged based on the driving of the TFT 17. The liquid crystal layer 11c is affected by an electrical filed due to the potential difference and the alignment of the liquid crystal molecules is controlled. Furthermore, an amount of light transmitted through the liquid crystal panel 11 is individually controlled for every pixel electrode 18. Therefore, a color image is displayed in the display area of the liquid crystal panel 11 with proper tone.

As illustrated in FIGS. 2 to 4, in the liquid crystal panel 11, a set of three color portions 21R, 21G, and 21B that represent red (R), green (G), and blue (B), respectively, and three pixel electrodes 18 overlapping the color portions 21R, 21G, and 21B forms a display pixel 24 that is a unit of display. The display pixel 24 includes three unit pixels 24R, 24G, and 24B that are a set of the color portion 21R and the pixel electrode 18 overlapping the color portion 21R, a set of the color portion 21G and the pixel electrode 18 overlapping the color portion 21G, and a set of the color portion 21B and the pixel electrode 18 overlapping the color portion 21B. Specifically, the display pixel 24 includes a red unit pixel 24R (a unit pixel), a green unit pixel 24G (a unit pixel), and a blue unit pixel 24B (a unit pixel). The red unit pixel 24R is a set of the R color portion 21R and the pixel electrode 18 overlapping the R color portion 21R. The green unit pixel 24G is a set of the G color portion 21G and the pixel electrode 18 overlapping the G color portion 21G. The blue unit pixel 24B is a set of the B color portion 21B and the pixel electrode 18 overlapping the B color portion 21B. Multiple unit pixels 24R, 24G, and 24B are repeatedly arranged on a plate surface of the liquid crystal panel 11 along a row direction (the X-axis direction). A large number of lines of unit pixels are arranged along a column direction (the Y-axis direction).

Figure 5:
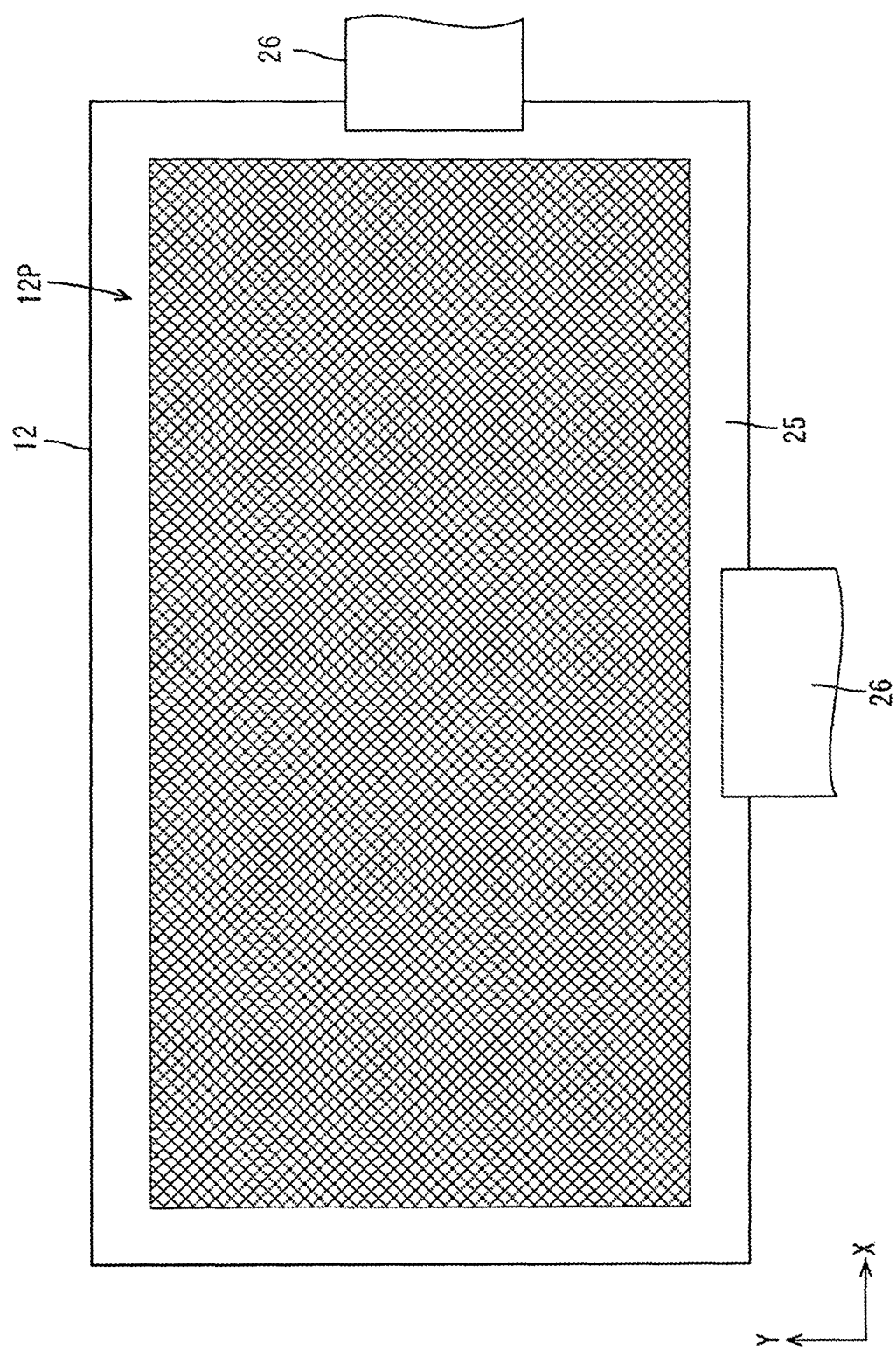
FIG. 5 is a plan view of a touchscreen.

The touchscreen 12 will be described in detail. The touchscreen 12 allows a user of the liquid crystal display device 10 to input position information (or to perform touch operation) in response to a displayed image on the liquid crystal panel 11. As illustrated in FIG. 1, the touchscreen 12 is placed over the front side of the liquid crystal panel 11 (on a side opposite from the backlight unit 13). The touchscreen 12 uses a projected capacitive touch technology and a self-capacitance method for detection. As illustrated in FIG. 5, the touchscreen 12 includes a substantially transparent glass substrate 25 (having high light transmissivity). A substantially transparent light transmissive conductive film is formed on the substrate 25. The light transmissive conductive film is formed in a predefined pattern through patterning. In FIG. 5, touch electrodes 27 and 28 in a touchscreen pattern 12P made from a transparent electrode film are schematically illustrated with a rhombic lattice pattern. The substrate 25 has a horizontally-long rectangular shape in a plan view. A short-side direction corresponds with the Y-axis direction in the drawings and a long-side direction corresponds with the X-axis direction in the drawings. The shape and the size of the substrate 25 in a plan view are substantially equal to the shape and the size of the liquid crystal panel 11. Touchscreen flexible circuit boards 26 are connected to one of end portions of the substrate 25 on a long-edge side and one of end portions of the substrate 25 on a short-edge side, respectively. Through the touchscreen flexible circuit boards 26, signals from the touchscreen control circuit, which is not illustrated, are transmitted. The touchscreen flexible circuit board 26 connected to the long end portion of the substrate 25 transmits signals to a portion of the touchscreen pattern 12P (including first touch electrodes 27 and first traces 29, which will be described later) for detecting positions with respect to the short-side direction (the Y-axis direction). The touchscreen flexible circuit board 26 transmits signals to a portion of the touchscreen pattern 12P (including second touch electrodes 28 and second traces 30, which will be described later) for detecting positions with respect to the long-side direction (the X-axis direction).

Figure 6:
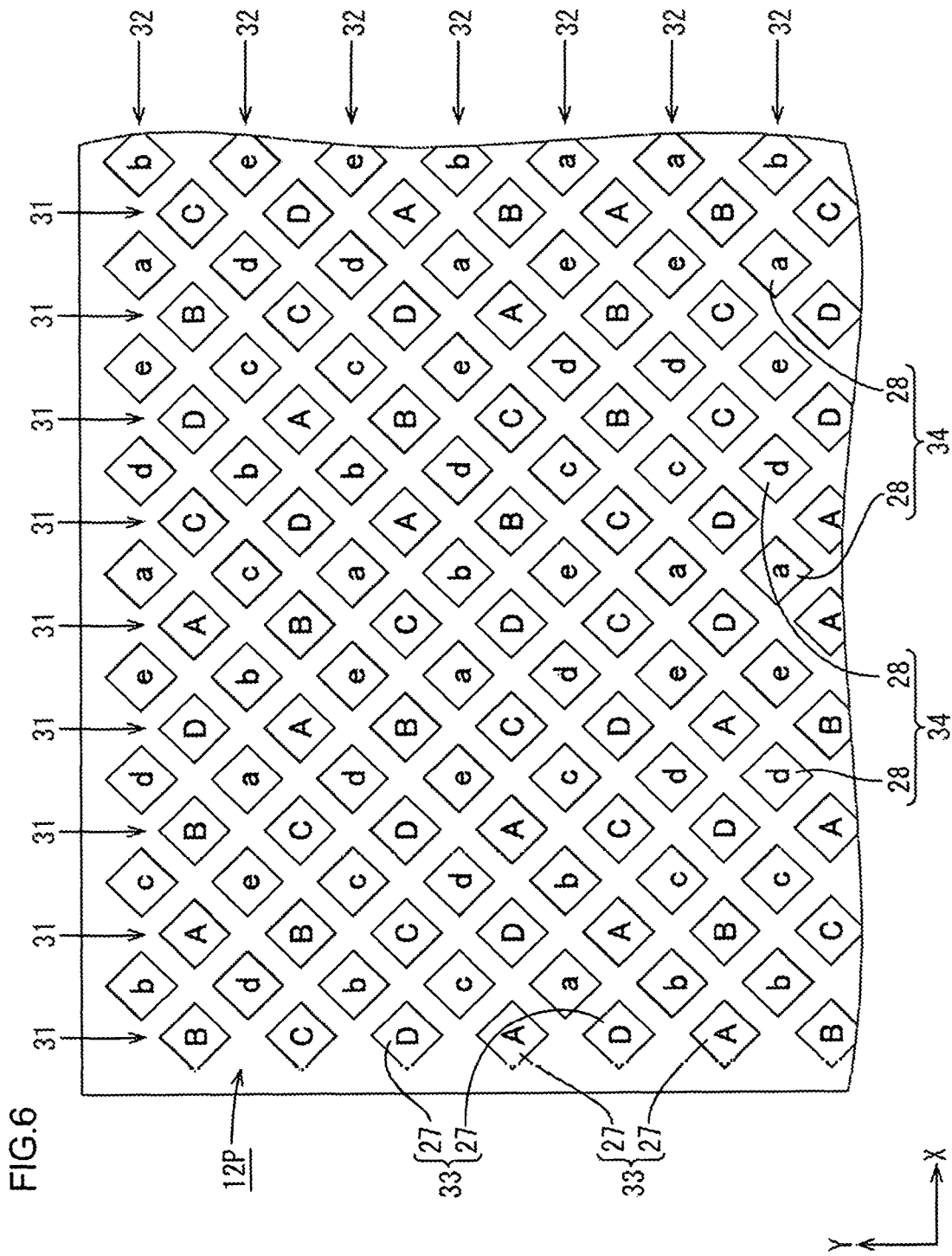
FIG. 6 is a plan view schematically illustrating an arrangement of touch electrodes in the touchscreen pattern included in the touchscreen.
Figure 7:
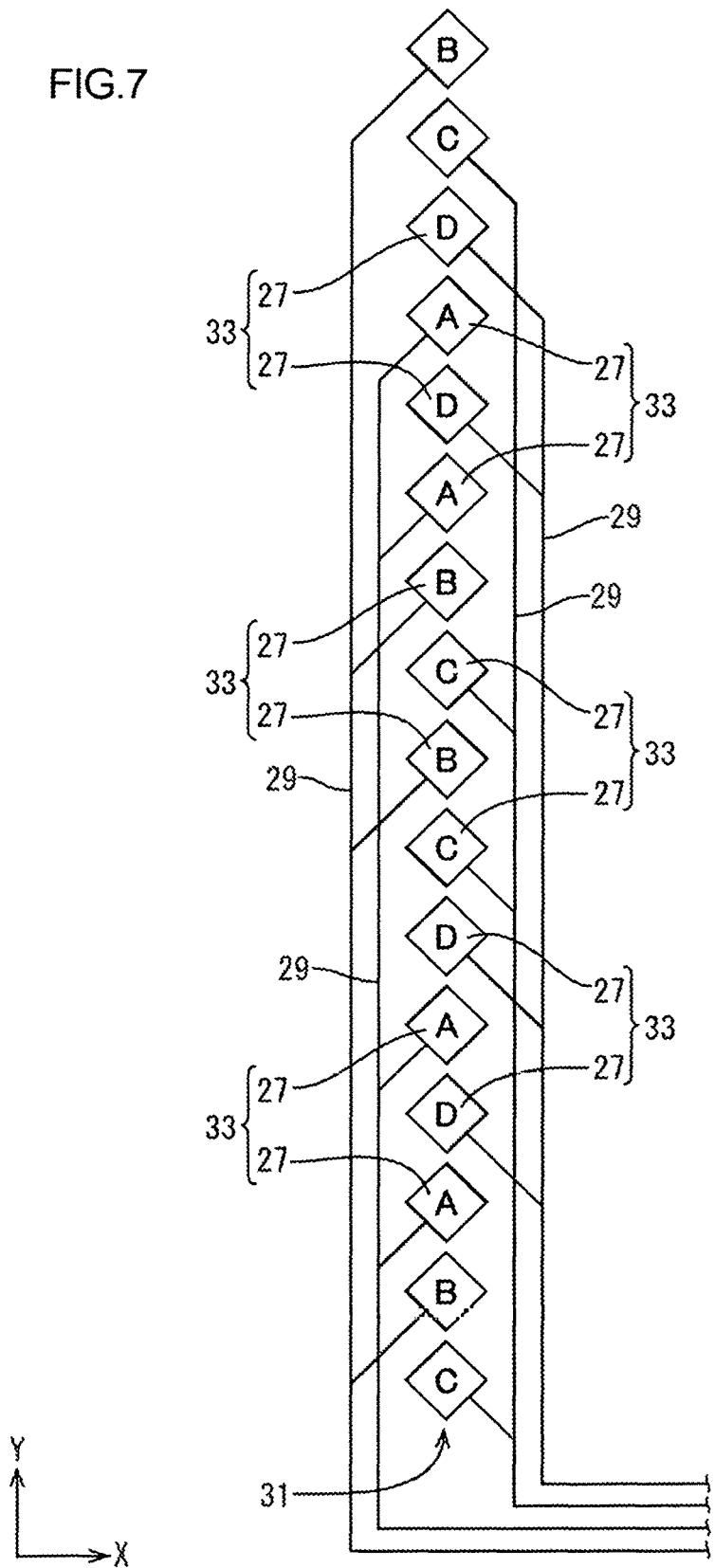
FIG. 7 is a plan view schematically illustrating connection between first touch electrodes included in a first touch electrode line in the touchscreen pattern and first traces.
Figure 8:
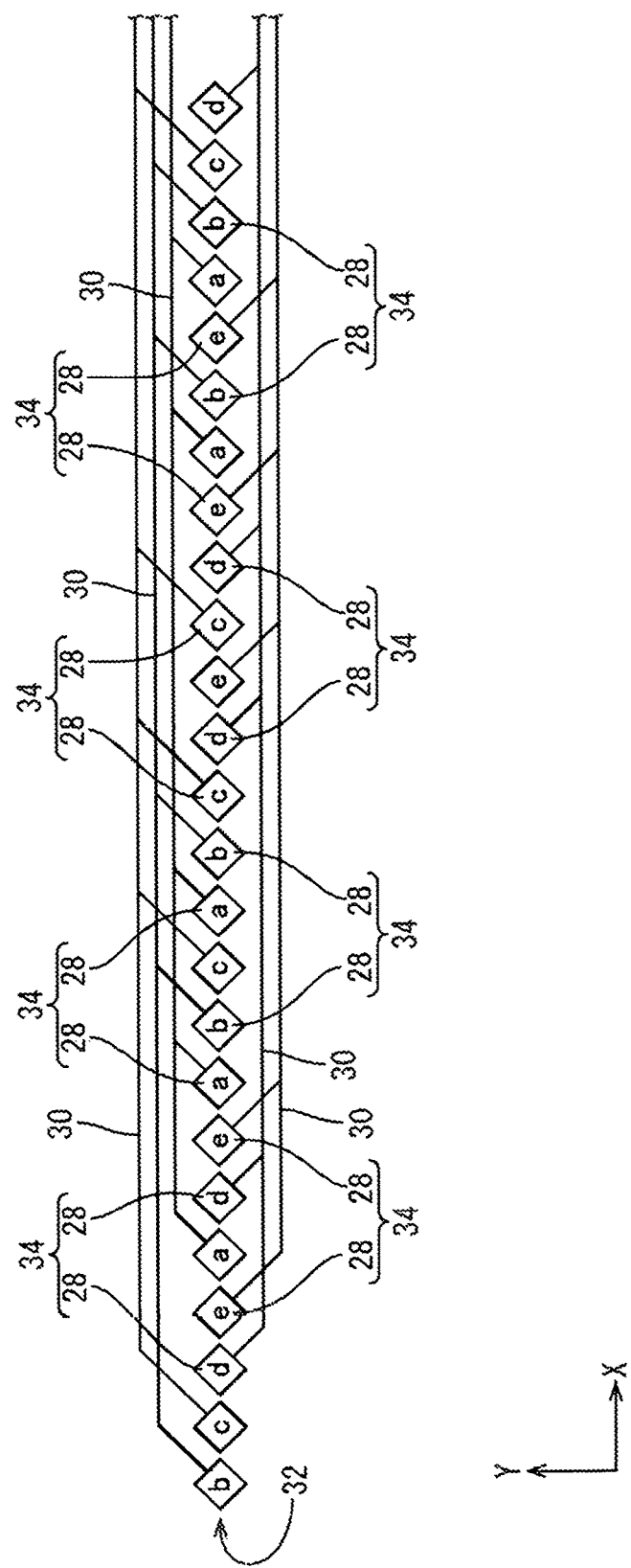
FIG. 8 is a plan view schematically illustrating connection between first touch electrodes included in a second touch electrode line in the touchscreen pattern and second traces.

The touchscreen pattern 12P included in the touchscreen 12 will be described in detail. The light transmissive conductive film of the touchscreen pattern 12P is made of transparent electrode material having high light transmissivity and high conductivity such as indium tin oxide (ITO) and zinc oxide (ZnO), similarly to the pixel electrodes 18 and the common electrode 23 of the liquid crystal panel 11. The touchscreen pattern 12P is formed on the substrate 25 using a vacuum vapor deposition method and then patterned using a photolithography method. The touchscreen pattern 12P includes the touch electrodes 27 and 28 (electrodes, position inputting electrodes) and the traces 29 and 30 illustrated in FIGS. 6 to 8. A large number of the touch electrodes 27 and 28 are two-dimensionally arranged in a matrix along a plate surface of the substrate 25. The traces 29 and 30 are connected to the touch electrodes 27 and 28 to apply electrical potential to the touch electrodes 27 and 28. The touch electrodes 27 and 28 include multiple first touch electrodes 27 (first electrodes) and multiple second touch electrodes 28 (second electrodes). The first touch electrodes 27 and the second touch electrodes 28 having substantially diamond shapes in a plan view and linearly arranged along the Y-axis direction (a first direction) and the X-axis direction (a second direction) to fill the plate surface of the substrate 25. Namely, the first touch electrodes 27 and the second touch electrodes 28 are arranged in zigzag patterns, respectively, such that each second touch electrode 28 is arranged between the first touch electrodes 27 adjacent to each other in a slanted direction with respect to the Y-axis direction and the X-axis direction that correspond with the arrangement directions of the first touch electrodes 27 and the second touch electrodes 28 and such that each first touch electrode 27 is arranged between the second touch electrodes 28 adjacent to each other in the slanted direction. The first touch electrodes 27 are arranged to fill spaces between the second touch electrodes 28. Furthermore, the second touch electrodes 28 are arranged to fill spaces between the first touch electrodes 27. Namely, the first touch electrodes 27 and the second touch electrodes 28 are arranged to fill the plate surface. Each of the first touch electrodes 27 and the second touch electrodes 28 has a diagonal dimension of about 5 mm. In FIG. 6, a portion of the touchscreen pattern 12P including some touch electrodes 27 and 28 is schematically illustrated. In FIGS. 7 and 8, connections of a first touch electrode line 31 and the first traces 29 and connections of a second touch electrode line 32 and the second traces 30 are schematically illustrated, respectively. The first touch electrode line 31 and the second touch electrode line 32 will be described next.

As described above, among a number of the touch electrodes 27 and 28 two-dimensionally arranged in a matrix, multiple first touch electrodes 27 arranged along the Y-axis direction (the first direction) are components of first touch electrode lines 31 (first electrode lines) and the second touch electrodes 28 arranged along the X-axis direction (the second direction) are components of second touch electrode lines 32 (second electrode lines). The first touch electrode lines 31 are arranged at intervals along the X-axis direction (the second direction) perpendicular to the Y-axis direction that corresponds with the arrangement direction of the first touch electrodes 27 in the first touch electrode lines 31. The second touch electrode lines 32 are arranged at intervals along the Y-axis direction (the first direction) perpendicular to the X-axis direction that corresponds with the arrangement direction of the second touch electrodes 28 in the second touch electrode lines 32. The number of the first touch electrodes 27 in each first touch electrode line 31 is equal to the number of the second touch electrode lines 32 in the Y-axis direction. The number of the second touch electrodes 28 in each second touch electrode line 32 is equal to the number of the first touch electrode lines 31 in the X-axis direction. A total number of the first touch electrodes 27 is equal to a value calculated by multiplying the number of the first touch electrodes 27 in each first touch electrode line 31 by the number of the first touch electrode lines 31. A total number of the second touch electrodes 28 is equal to a value calculated by multiplying the number of the second touch electrodes 28 in each second touch electrode line 32 by the number of the second touch electrode lines 32.

In this embodiment, the number of the first touch electrodes 27 in each first touch electrode line 31 and the number of the second touch electrode lines 32 in the Y-axis direction are both "16." The number of the second touch electrodes 28 in each second touch electrode line 32 and the number of the first touch lines 31 in the X-axis direction are both "25". Therefore, a total number of the first touch electrodes 27 and a total number of the second touch electrodes 28 are both "400."

As illustrated in FIGS. 7 and 8, the first touch electrodes 27 in each first touch electrode line 31 are divided into multiple first touch electrode groups 33 (first electrode groups). Similarly, the second touch electrodes 28 in each second touch electrode line 32 are divided into multiple second touch electrode groups 34 (second electrode groups). The number of the first touch electrode groups 33 in each first touch electrode line 31 is equal to the square root of the number of the first touch electrodes 27 in the first touch electrode line 31 (or the number of lines of the first touch electrode 27 arranged along the first direction). Similarly, the number of the second touch electrode groups 34 in each second touch electrode line 32 is equal to the square root of the number of the second touch electrodes 28 in the second touch electrode line 32 (or the number of lines of the second touch electrode 28 arranged along the second direction).

As illustrated in FIGS. 7 and 8, the traces 29 and 30 include multiple first traces 29 connected to the first touch electrodes 27 and multiple second traces 30 connected to the second touch electrodes 28. The first traces 29 extend along the Y-axis direction that corresponds with an extending direction of the first touch electrode lines 31. Each first trace 29 is connected to the first touch electrodes 27 in the corresponding first touch electrode group 33 in the corresponding first touch electrode line 31. Namely, the first traces 29 are assigned to the first touch electrode groups 33 in the first touch electrode lines 31, respectively. The number of the first traces 29 that are electrically independent from one another and provided with respect to each first touch electrode line 31 is equal to the number of the first touch electrode groups 33 in the first touch electrode line 31. The number of the first traces 29 that are electrically independent from one another and provided with respect to each first touch electrode line 31 is equal to the square root of the number of the first touch electrodes 27 in the first touch electrode line 31 (or the number of lines of the first touch electrodes 27 arranged along the first direction). Multiple first touch electrodes 27 connected to one first trace 29 form one first touch electrode group 33. Namely, the first traces 29 divide the first touch electrodes 27 in the first touch electrode lines 31 into groups. Through the first traces 29, a common electrical potential is applied to the first touch electrodes 27 in the first touch electrode groups 33. Therefore, variations in capacitance of any first touch electrodes 27 in the first touch electrode groups 33 can be detected. The number of the first traces 29 is calculated by multiplying the number of the first touch electrode groups 33 in the first touch electrode lines 31 by the number of the first touch electrode lines 31.

The second traces 30 extend along the X-axis direction that corresponds with an extending direction of the second touch electrode lines 32. Each second trace 30 is connected to the second touch electrodes 28 in the corresponding second touch electrode group 34 in the corresponding second touch electrode line 32. Namely, the second traces 30 are assigned to the second touch electrode groups 34 in the second touch electrode lines 32, respectively. The number of the second traces 30 that are electrically independent from one another and provided with respect to each second touch electrode line 32 is equal to the number of the second touch electrode groups 34 in the second touch electrode line 32. The number of the second traces 30 that are electrically independent from one another and provided with respect to each second touch electrode line 32 is equal to the square root of the number of the second touch electrodes 28 in the second touch electrode line 32 (or the number of lines of the second touch electrodes 28 arranged along the second direction). Multiple second touch electrodes 28 connected to one second trace 30 form one second touch electrode group 34. Namely, the second traces 30 divide the second touch electrodes 28 in the second touch electrode lines 32 into groups. Through the second traces 30, a common electrical potential is applied to the second touch electrodes 28 in the second touch electrode groups 34. Therefore, variations in capacitance of any second touch electrodes 28 in the second touch electrode groups 34 can be detected. The number of the second traces 30 is calculated by multiplying the number of the second touch electrode groups 34 in the second touch electrode lines 32 by the number of the second touch electrode lines 32.

Figure 9:
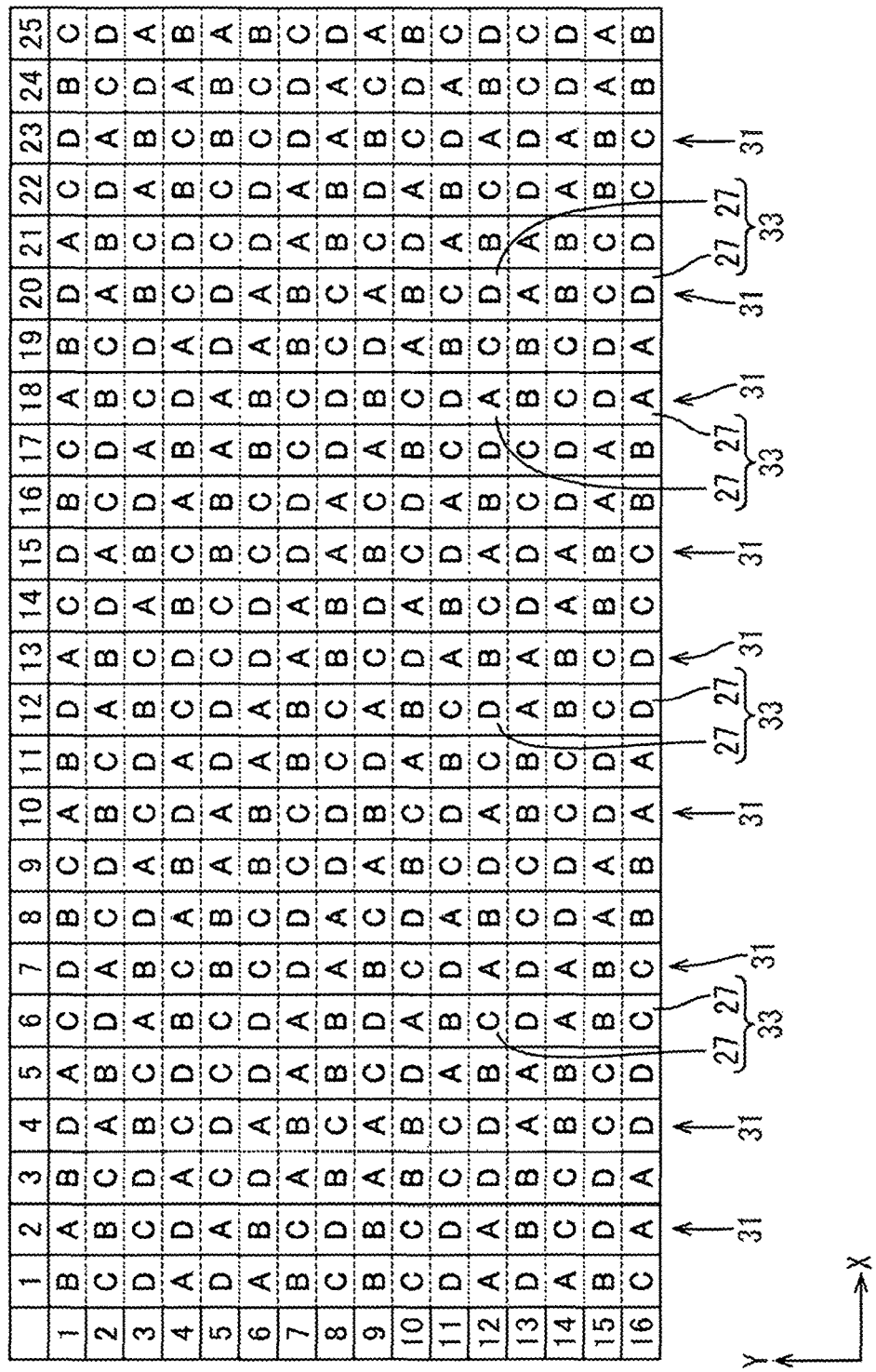
FIG. 9 is a table illustrating first touch electrode groups that include the first touch electrodes in the first touch electrode lines in the touchscreen pattern with a matrix.
Figure 10:
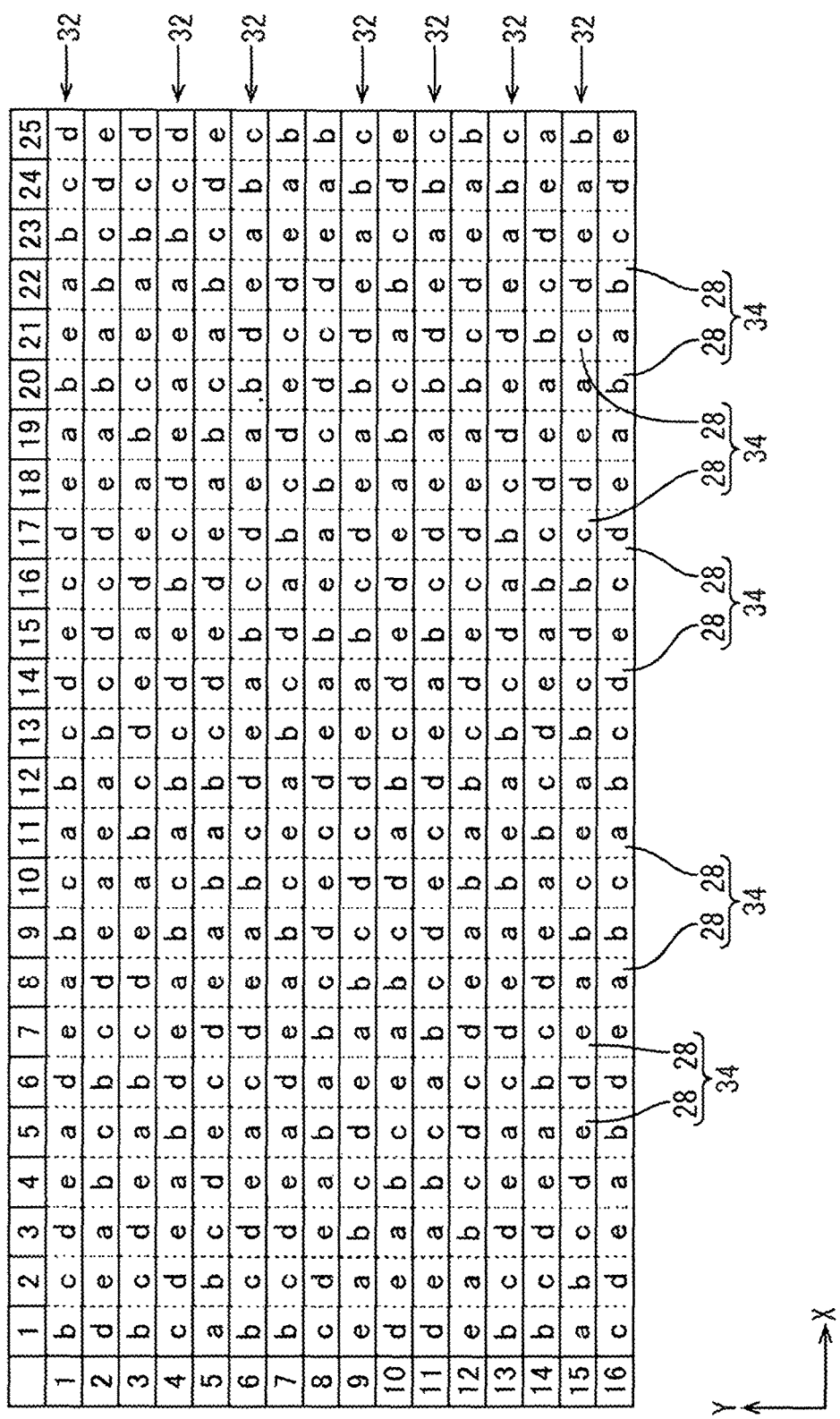
FIG. 10 is a table illustrating second touch electrode groups that include the second touch electrodes in the second touch electrode lines in the touchscreen pattern with a matrix.

Specifically, in this embodiment, the number of the first touch electrode groups 33 is "4," which is the square root of the number of the first touch electrodes 27 in included in the first touch electrode line 31, that is, "16." Four first touch electrode groups 33 are referred to as group A, group B, group C, and group D, respectively. Letters (A to D) after the term group correspond to the letters (A to D) inside the first touch electrodes 27 in FIGS. 6 to 10. The number of the second touch electrode groups 34 is "5," which is the square root of the number of the second touch electrodes 28 in included in the second touch electrode line 32, that is, "25." Five first touch electrode groups 34 are referred to as group a, group b, group c, and group d, and group e, respectively. The letters (a to e) after the term group correspond to the letters (a to e) inside the second touch electrodes 28 in FIGS. 6 to 10. FIGS. 9 and 10 are tables illustrating groups A to D to which the touch electrodes 27 in the touch electrode lines 31 belong with a matrix and groups a to e to which the touch electrodes 28 in the touch electrode lines 32 belong with a matrix. Row numbers in the tables represent positions with respect to the X-axis direction (numbers in sequence starting from the far left in the drawings) and column numbers in the tables represent positions with respect to the Y-axis direction (numbers in sequence starting from the top in the drawings). In the following paragraphs, the locations of the touch electrode lines 31 and 32 in FIGS. 9 and 10 will be referred as follows. For example, the location of the first touch electrode line 31 in row "7" will be referred to as "position X7," and the location of the second touch electrode line 32 in column "11" will be referred to as "position Y11." Similarly, the locations of the touch electrodes 27 and 28 in FIGS. 9 and 10 will referred as follows. For example, the location of the touch electrode 27 or 28 in row 3 and column 5 will be referred to as "position X3Y5." This means that the first touch electrode 27 is located at "position Y5" in the first touch electrode line 31 at "position X3" or the second touch electrode 28 is located at "position X3" in the second touch electrode line 32 at "position Y5." The number of first traces 29 connected to the first touch electrodes 27 in one first touch electrode line 31 is "4" and the total number of the first traces 29 is "100." The number of the second traces 30 connected to the second touch electrodes 28 in one second touch electrode line 32 is "5" and the total number of the second traces 30 is "80."

There is following regularity in arrangements of the first touch electrodes 27 and the second touch electrodes 28 with respect to the X-axis direction and the Y-axis direction and the groups to which the first touch electrodes 27 and the second touch electrodes 28 belong (to what first touch electrode groups 33 and to what the second touch electrode groups 34 they belong). First, the first touch electrodes 27 will be described. As illustrated in FIG. 9, the first touch electrodes 27 in the first touch electrode lines 31 adjacent to one another in the arrangement direction (the Y-axis direction, the first direction) belong to the different first touch electrode groups 33. Namely, the first touch electrodes 27 included in the first touch electrode line 31 and arranged adjacent to one another in the extending direction of the first touch electrode line 31 (the Y-axis direction, the first direction) are connected to the different first traces 29. If one of the first touch electrodes 27 adjacent to each other in the Y-axis direction responds to a touching operation of the user, a capacitance of the first touch electrode 27 may vary. Because the first touch electrode 27 that is adjacent to the first touch electrode 27 that responds to the touching operation of the user in the Y-axis direction and does not respond to the touching operation of the user belongs to the first touch electrode group 33 different from the first touch electrode group 33 to which the first touch electrode 27 that responds to the touching operation of the user, the first touch electrode 27 that does not respond to the touching operation is less likely to be erroneously detected.

As illustrated in FIG. 9, the first touch electrodes 27 included in the first touch electrode lines 31 are arranged such that a combination of the first touch electrode groups 33 to which two first touch electrodes 27 adjacent to each other with respect to the arrangement direction of the first touch electrode lines 31 (the X-axis direction, the second direction) belong, respectively, is different from a combination of the first touch electrode groups 33 to which another two first touch electrodes 27 adjacent to each other with respect to the arrangement direction of the first touch electrode lines 31 belong, respectively. All pairs are configured in the same manner. The number of combinations of the first touch electrode groups 33 to which the first touch electrodes 27 adjacent to one another with respect to the X-axis direction belong, respectively is equal to the square of the number of the first touch electrode groups 33 in each first touch electrode line 31, namely, equal to the number of the first touch electrodes 27 included in the first touch electrode line 31. The combination of the first touch electrode groups 33 to which the first touch electrode 27 in one first touch electrode line 31 and the adjacent first touch electrode 27 with respect to the X-axis direction belong is different from the combination of the first touch electrode groups 33 to which the first touch electrode 27 in another first touch electrode line 31 and the adjacent first touch electrode 27 with respect to the X-axis direction belong, respectively. The same combination does not exist and the combinations are all different. Therefore, if capacitances of two first touch electrodes 27 adjacent to each other with respect to the X-axis direction vary in response to a touching operation of the user, it is assumed that capacitances of other first touch electrodes 27 in two first touch electrode lines 31 including the two first touch electrodes 27 adjacent to each other with respect to the X-axis direction do not vary.

Next, the second touch electrodes 28 will be described. As illustrated in FIG. 10, the second touch electrodes 28 included in the second touch electrode lines 32 adjacent to one another with respect to the arrangement direction (the X-axis direction, the second direction) belong to different second touch electrode groups 34. The second touch electrodes 28 included in one second touch electrode line 32 and adjacent to each other with respect to the extending direction of the second touch electrode line 32 (the X-axis direction, the second direction) are connected to the second traces 30 different from each other. If a capacitance of one of two second touch electrodes 28 adjacent to each other with respect to the X-axis direction has varied in response to a touching operation of the user, the second touch electrode 28 adjacent to the second touch electrode 28 having the capacitance that has varied in response to the touch operation with respect to the X-axis direction and having a capacitance that has not varied in response to the touching operation of the user belongs to the second touch electrode group 34 different from the second touch electrode group 34 to which the second touch electrode 28 having the capacitance that has varied in response to the touch operation. Therefore, the second touch electrode 28 that does not response to the touch operation is less likely to be erroneously detected.

As illustrated in FIG. 10, the second touch electrodes 28 included in the second touch electrode lines 32 are arranged such that a combination of the second touch electrode groups 34 to which two second touch electrodes 28 adjacent to each other with respect to the arrangement direction of the second touch electrode lines 32 (the Y-axis direction, the first direction) belong, respectively is different from a combination of the second touch electrode groups 34 to which another two second touch electrodes 28 adjacent to each other with respect to the arrangement direction of the second touch electrode lines 32 belong, respectively. All pairs are configured in the same manner. The number of the combinations of the second touch electrode groups 34 to which the second touch electrodes 28 adjacent to one another with respect to the Y-axis direction belong, respectively is equal to the square of the number of the second touch electrode groups 34 in each second touch electrode line 32, namely, equal to the number of the second touch electrodes 28 included in the second touch electrode line 32. The combination of the second touch electrode groups 34 to which the second touch electrode 28 in one second touch electrode line 32 and the adjacent second touch electrode 28 with respect to the Y-axis direction belong is different from the combination of the second touch electrode groups 34 to which the second touch electrode 28 in another second touch electrode line 32 and the adjacent second touch electrode 28 with respect to the Y-axis direction belong, respectively. The same combination does not exist and the combinations are all different. Therefore, if capacitances of two second touch electrodes 28 adjacent to each other with respect to the Y-axis direction vary in response to a touching operation of the user, it is assumed that capacitances of other second touch electrodes 28 in two second touch electrode lines 32 including the two second touch electrodes 28 adjacent to each other with respect to the Y-axis direction do not vary.

Functions of this embodiment having the configuration described above will be described. When position information is input by the user of the liquid crystal display device 10 and the touchscreen 12 having the configuration described above based on an image displayed on the liquid crystal panel 11, that is, a touching operation is performed, capacitances of the touch electrodes 27 and 28 the closest to a position of the touch in planes of the liquid crystal panel 11 and the touchscreen 12 vary. Namely, the position of the touch is detected by detecting the touch electrodes 27 and 28 having the capacitances that have varied.

Figure 11:
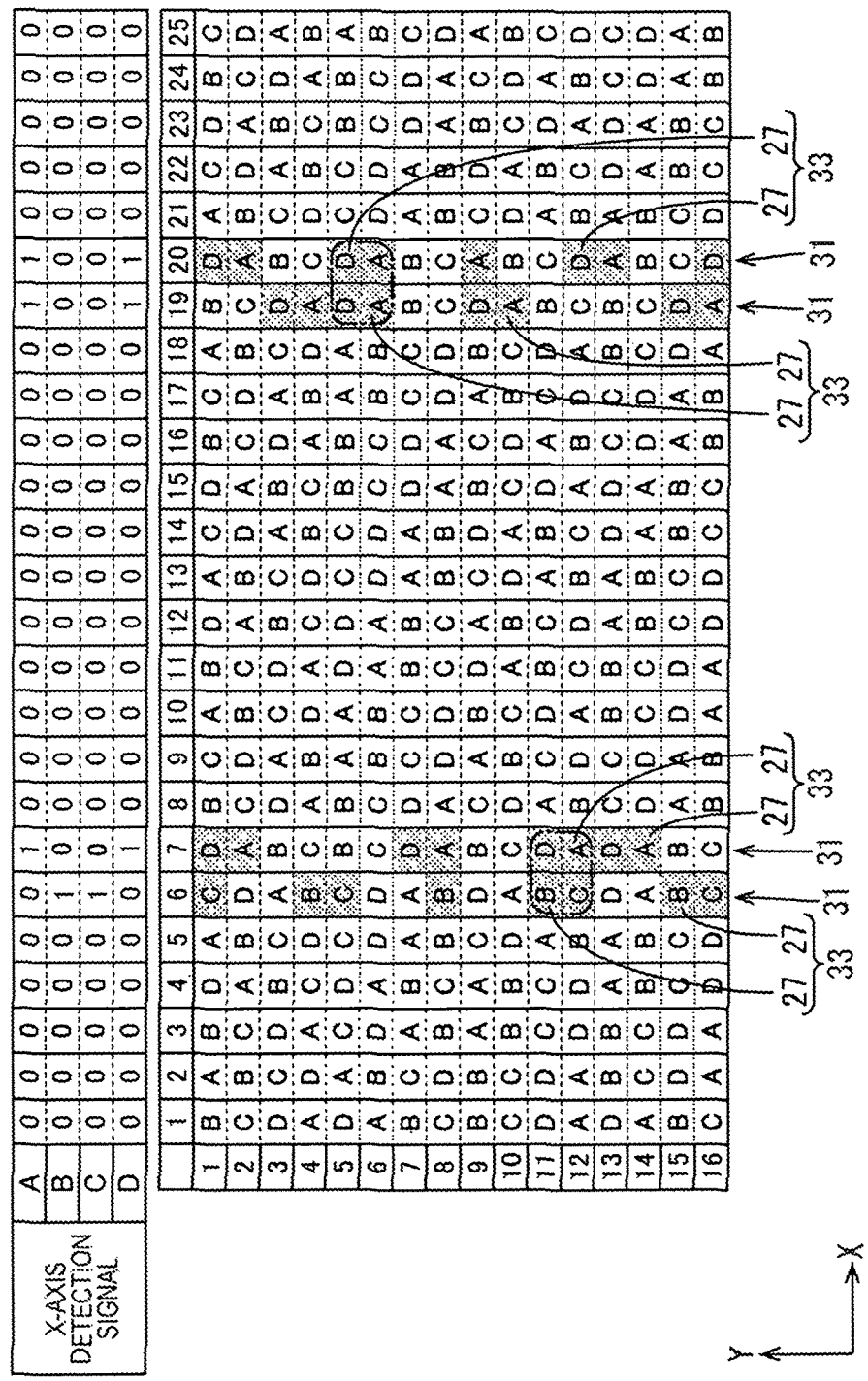
FIG. 11 is a table illustrating a condition that variations in capacitance of the first touch electrodes adjacent to each other in the X-axis direction in response to a touching operation performed by a user are detected.

An area including the touch electrodes 27 and 28, the capacitances of which vary in response to a touching operation of the user, may vary according to touch sensitivity of the touchscreen 12 or environment of use. The case that capacitances of four first touch electrodes 27 and four second touch electrodes 28 adjacent to one another with respect to the X-axis direction and the Y-axis direction vary in response to a touching operation of the user will be described. Assume that the user has touched two points in the planes of the liquid crystal panel 11 and the touchscreen 12 around "position X6Y11" and around "position X19Y5," as illustrated in FIG. 11, the capacitances of the first electrodes 27 at "position X6Y11," at "position X7Y11" adjacent to "position X6Y1" with respect to the X-axis direction, at "position X6Y12" and at "position X7Y12" adjacent to the above two positions with respect to the Y-axis direction vary. Furthermore, the capacitances of the first electrodes 27 at "position X19Y5", at "X20Y5" adjacent to "position X19Y5" with respect to the X-axis direction, at "position X19Y6" and "position X20Y6" adjacent to the above two positions with respect to the Y-axis direction vary.

The first touch electrode 27 at "position X6Y1" in the first touch electrode line 31 at "position X6" belongs to group B of the first touch electrode groups 33. All the capacitances of four first touch electrodes 27 in group B are detected with the first trace 29 to which the four first touch electrodes 27 are connected. The first touch electrode 27 at "position X7Y11" in the first touch electrode line 31 at "position X7" belongs to group D of the first touch electrode groups 33. All the capacitances of four first touch electrodes 27 in group D are detected with the first trace 29 to which the four first touch electrodes 27 are connected. The first touch electrode 27 at "position X6Y12" in the first touch electrode line 31 at "position X6" belongs to group C of the first touch electrode groups 33. All the capacitances of four first touch electrodes 27 in group C are detected with the first trace 29 to which the four first touch electrodes 27 are connected. The first touch electrode 27 at "position X7Y12" in the first touch electrode line 31 at "position X7" belongs to group A of the first touch electrode groups 33. All the capacitances of four first touch electrodes 27 in group A are detected with the first trace 29 to which the four first touch electrodes 27 are connected. Variations in capacitance of the following two pairs of the first touch electrodes 27 among the first touch electrodes 27 in the first touch electrode lines 31 at "position X6" and "position X7" adjacent to each other with respect to the X-axis direction are detected: a pair of the first touch electrode 27 at "position X6Y11" in the first touch electrode line 31 at "position X6" belonging to group B of the first touch electrode groups 33 and the first touch electrode 27 at "position X7Y11" in the first touch electrode line 31 at "position X7" belonging to group D of the first touch electrode groups 33; and a pair of the first touch electrode 27 at "position X6Y12" in the first touch electrode line 31 at "position X6" belonging to group C of the first touch electrode groups 33 and the first touch electrode 27 at "position X7Y12" in the first touch electrode line 31 at "position X7" belonging to group A of the first touch electrode groups 33.

The first touch electrode 27 at "position X19Y5" in the first touch electrode line 31 at "position X19" belongs to group D of the first touch electrode groups 33. All the capacitances of four first touch electrodes 27 in group D are detected with the first trace 29 to which the four first touch electrodes 27 are connected. The first touch electrode 27 at "position X20Y5" in the first touch electrode line 31 at "position X20" belongs to group D of the first touch electrode groups 33. All the capacitances of four first touch electrodes 27 in group D are detected with the first trace 29 to which the four first touch electrodes 27 are connected. The first touch electrode 27 at "position X19Y6" in the first touch electrode line 31 at "position X19" belongs to group A of the first touch electrode groups 33. All the capacitances of four first touch electrodes 27 in group A are detected with the first trace 29 to which the four first touch electrodes 27 are connected. The first touch electrode 27 at "position X20Y6" in the first touch electrode line 31 at "position X20" belongs to group A of the first touch electrode groups 33. All the capacitances of four first touch electrodes 27 in group A are detected with the first trace 29 to which the four first touch electrodes 27 are connected. Variations in capacitance of the following two pairs of the first touch electrodes 27 among the first touch electrodes 27 in the first touch electrode lines 31 at "position X19" and "position X20" adjacent to each other with respect to the X-axis direction are detected: a pair of the first touch electrode 27 at "position X19Y5" in the first touch electrode line 31 at "position X19" belonging to group D of the first touch electrode groups 33 and the first touch electrode 27 at "position X20Y5" in the first touch electrode line 31 at "position X20" belonging to group D of the first touch electrode groups 33; and a pair of the first touch electrode 27 at "position X19Y6" in the first touch electrode line 31 at "position X19" belonging to group A of the first touch electrode groups 33 and the first touch electrode 27 at "position X20Y6" in the first touch electrode line 31 at "position X20" belonging to group A of the first touch electrode groups 33. In FIG. 11, the first touch electrodes 27, the variations in capacitance of which are detected, are shaded. FIG. 11 further illustrates X-axis detection signals transmitted to four first traces 29 associated with four first touch electrode groups 33 in each first touch electrode line 31. "0" represents that the X-axis detection signal is not detected and "1" represents that the X-axis detection signal is detected.

Figure 12:
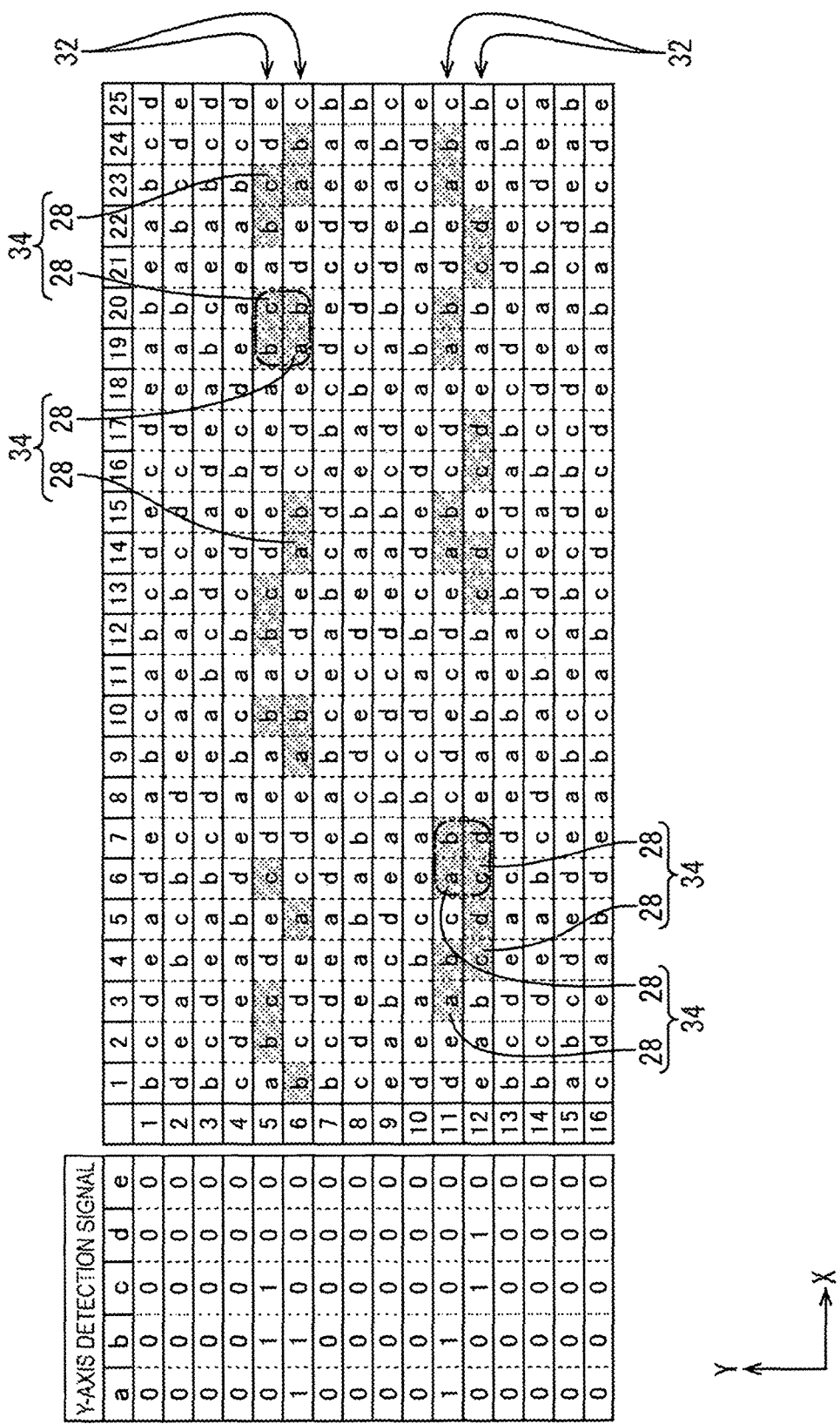
FIG. 12 is a table illustrating a condition that variations in capacitance of the second touch electrodes adjacent to each other in the Y-axis direction in response to a touching operation performed by a user are detected.

Next, the second touch electrodes 28 will be described. As illustrated in FIG. 12, the capacitances of the second electrodes 28 at "position X6Y11," "position X6Y12" adjacent to "position X6Y11" with respect to the Y-axis direction, "position X7Y11" and "position X7Y12" adjacent to the above two positions with respect to the Y-axis direction vary. Furthermore, the capacitances of the second electrodes 28 at "position X19Y5", "X19Y6" adjacent to "position X19Y5" with respect to the Y-axis direction, "position X20Y5," and "position X20Y6" adjacent to the above two positions with respect to the X-axis direction vary.

The second touch electrode 28 at "position X6Y11" in the second touch electrode line 32 at "position Y11" belongs to group a of the second touch electrode groups 34. All the capacitances of the five second touch electrodes 28 in group a are detected with the second trace 30 to which the five second touch electrodes 28 are connected. The second touch electrode 28 at "position X6Y12" in the second touch electrode line 32 at "position Y12" belongs to group c of the second touch electrode groups 34. All the capacitances of the five second touch electrodes 28 in group c are detected with the second trace 30 to which the five second touch electrodes 28 are connected. The second touch electrode 28 at "position X7Y11" in the second touch electrode line 32 at "position Y11" belongs to group b of the second touch electrode groups 34. All the capacitances of the five second touch electrodes 28 in group b are detected with the second trace 30 to which the five second touch electrodes 28 are connected. The second touch electrode 28 at "position X7Y12" in the second touch electrode line 32 at "position Y12" belongs to group d of the second touch electrode groups 34. All the capacitances of the five second touch electrodes 28 in group d are detected with the second trace 30 to which the five second touch electrodes 28 are connected. Variations in capacitance of the following two pairs of the second touch electrodes 28 among the second touch electrodes 28 in the second touch electrode lines 32 at "position Y11" and "position Y12" adjacent to each other with respect to the Y-axis direction are detected: a pair of the second touch electrode 28 at "position X6Y11" in the second touch electrode line 32 at "position Y11" belonging to group a of the second touch electrode groups 34 and the second touch electrode 28 at "position X6Y12" in the second touch electrode line 32 at "position Y12" belonging to group c of the second touch electrode groups 34; and a pair of the second touch electrode 28 at "position X7Y11" in the second touch electrode line 32 at "position Y11" belonging to group b of the second touch electrode groups 34 and the second touch electrode 28 at "position X7Y12" in the second touch electrode line 32 at "position Y12" belonging to group d of the second touch electrode groups 34.

The second touch electrode 28 at "position X19Y5" in the second touch electrode line 32 at "position Y5" belongs to group b of the second touch electrode groups 34. All the capacitances of the five second touch electrodes 28 in group b are detected with the second trace 30 to which the five second touch electrodes 28 are connected. The second touch electrode 28 at "position X19Y6" in the second touch electrode line 32 at "position Y6" belongs to group a of the second touch electrode groups 34. All the capacitances of the five second touch electrodes 28 in group a are detected with the second trace 30 to which the five second touch electrodes 28 are connected. The second touch electrode 28 at "position X20Y5" in the second touch electrode line 32 at "position Y5" belongs to group c of the second touch electrode groups 34. All the capacitances of the five second touch electrodes 28 in group c are detected with the second trace 30 to which the five second touch electrodes 28 are connected. The second touch electrode 28 at "position X20Y6" in the second touch electrode line 32 at "position Y6" belongs to group b of the second touch electrode groups 34. All the capacitances of the five second touch electrodes 28 in group b are detected with the second trace 30 to which the five second touch electrodes 28 are connected. Variations in capacitance of the following two pairs of the second touch electrodes 28 among the second touch electrodes 28 in the second touch electrode lines 32 at "position Y5" and "position Y6" adjacent to each other with respect to the Y-axis direction are detected: a pair of the second touch electrode 28 at "position X19Y5" in the second touch electrode line 32 at "position Y5" belonging to group b of the second touch electrode groups 34 and the second touch electrode 28 at "position X20Y5" in the second touch electrode line 32 at "position Y5" belonging to group c of the second touch electrode groups 34; and a pair of the second touch electrode 28 at "position X20Y5" in the second touch electrode line 32 at "position Y5" belonging to group c of the second touch electrode groups 34 and the second touch electrode 28 at "position X20Y6" in the second touch electrode line 32 at "position Y6" belonging to group b of the second touch electrode groups 34. In FIG. 12, the second touch electrodes 28, the variations in capacitance of which are detected, are shaded. FIG. 12 further illustrates Y-axis detection signals transmitted to five second traces 30 associated with four second touch electrode groups 34 in each first touch electrode line 31. "0" represents that the Y-axis detection signal is not detected and "1" represents that the Y-axis detection signal is detected.

Figure 13:
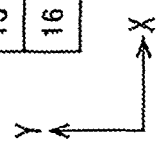
FIG. 13 is a table created by combining FIGS. 11 and 12.

A table created by combining FIGS. 11 and 12 is illustrated in FIG. 13. In FIG. 13, the letters A to D and a to e are placed in the cells in pairs. The first touch electrode 27 and the second touch electrode 28 belonging to the groups represented by the letters in each cell are at the same position (expressed by the same X and Y coordinates). If a variation in capacitance of only one of the first touch electrode 27 and the second touch electrode 28 in the same cell is detected, a triangular area of the cell is shaded. If variations in capacitance of both touch electrodes 27 and 28 are detected, a square area of the cell is shaded. FIG. 13 illustrates that variations in capacitance of both first touch electrodes 27 and the second touch electrode 28 at the same position is detected at a total of nine positions: "position X6Y5;" "position X6Y11;" "position X6Y12;" "position X7Y11;" "position X7Y12;" "position X19Y5;" "position X19Y6;" and "position X20Y5;" "position X20Y6." Eight positions out of the nine positions are actually touched positions and one position is a ghost position. The capacitances of two first touch electrodes 27 adjacent to each other with respect to the X-axis direction vary at actually touched positions. Furthermore, the capacitances of two second touch electrodes 28 adjacent to each other with respect to the Y-axis direction vary at actually touched positions. Whether variations in capacitance of the first touch electrodes 27 adjacent to each other with respect to the X-axis direction and the second touch electrodes 28 adjacent to each other with respect to the Y-axis direction are detected will be examined for the nine positions. At "position X6Y5," the variations in capacitance of the first touch electrodes 27 adjacent with respect to the X-axis direction and the second touch electrodes 28 adjacent with respect to the Y-axis direction were not detected. Therefore, it is determined that this position is the ghost position. "Position X6Y11," "position X6Y12," "position X7Y11," and "position X7Y12" are adjacent to one another with respect to the X-axis direction and the Y-axis direction. Therefore, it is determined that these four positions are the actually touched positions. Similarly, "position X19Y5," "position X19Y6," "position X20Y5," and "position X20Y6" are adjacent to one another with respect to the X-axis direction and the Y-axis direction. Therefore, it is determined that these four positions are the actually touched positions. Through the determinations, the ghost position is excluded and the actually touched positions are properly detected. In FIG. 13, the actually touched positions are indicated with chain lines.

Figure 14:
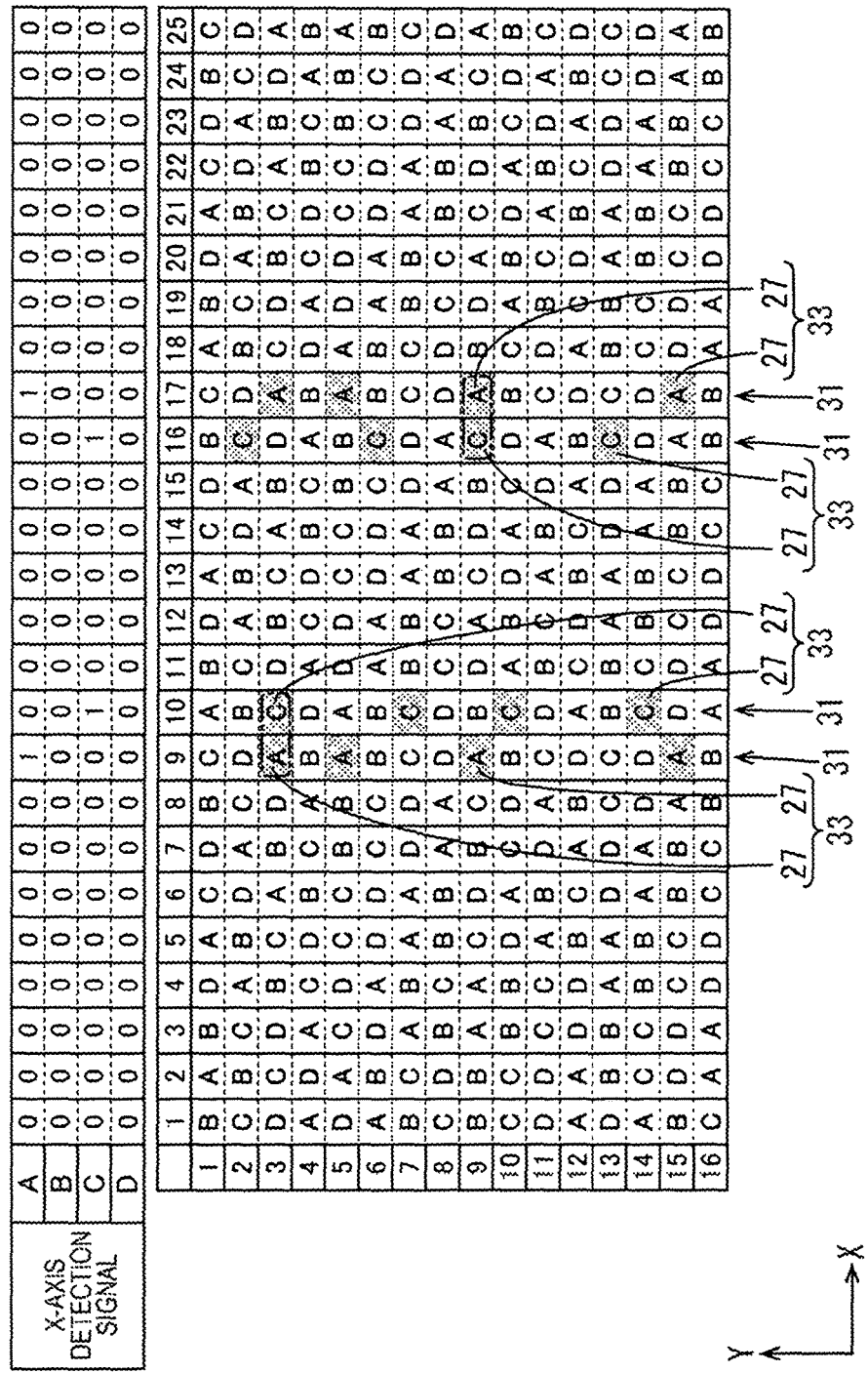
FIG. 14 is a table illustrating a condition that variations in capacitance of the first touch electrodes adjacent to each other in the X-axis direction and the first touch electrodes adjacent to each other in the Y-axis direction in response to a touching operation performed by a user are detected.

Variations in capacitance of two touch electrodes 27 or 28 adjacent to each other and two touch electrodes 27 or 28 adjacent to each other according to a touching operation of the user will be described. When the user touch two points around "position X9Y3" and "position X16Y9" in the planes of the liquid crystal panel 11 and the touchscreen 12 at about the same time, as illustrated in FIG. 14, the capacitances of the first touch electrodes 27 at "position X9Y3" and "position X10Y3" adjacent to "position X9Y3" with respect to the X-axis direction and the capacitances of the first touch electrodes 27 at "position X16Y9" and "position X17Y9" adjacent to "position X16Y9" with respect to the X-axis direction may vary. If the capacitance of the first touch electrode 27 at "position X8Y3" or "position X15Y9" varies, the capacitance of the second touch electrode 28 at "position X9Y2" or "position X16Y8" may vary. In such a case the position can be detected similarly to detections described below.

The first touch electrode 27 at "position X9Y3" in the first touch electrode line 31 at "position X9" belongs to group A of the first touch electrode groups 33. All the capacitances of four first touch electrodes 27 in group A are detected with the first trace 29 to which the four first touch electrodes 27 are connected. The first touch electrode 27 at "position X10Y3" in the first touch electrode line 31 at "position X10" belongs to group C of the first touch electrode groups 33. All the capacitances of four first touch electrodes 27 in group C are detected with the first trace 29 to which the four first touch electrodes 27 are connected. Variations in capacitance of only the following pair of the first touch electrodes 27 among the first touch electrodes 27 in the first touch electrode lines 31 at "position X9" and "position X10" adjacent to each other with respect to the X-axis direction are detected: a pair of the first touch electrode 27 at "position X9Y3" in the first touch electrode line 31 at "position X9" belonging to group A of the first touch electrode groups 33 and the first touch electrode 27 at "position X10Y3" in the first touch electrode line 31 at "position X10" belonging to group C of the first touch electrode groups 33.

The first touch electrode 27 at "position X16Y9" in the first touch electrode line 31 at "position X16" belongs to group C of the first touch electrode groups 33. All the capacitances of four first touch electrodes 27 in group C are detected with the first trace 29 to which the four first touch electrodes 27 are connected. The first touch electrode 27 at "position X17Y9" in the first touch electrode line 31 at "position X17" belongs to group A of the first touch electrode groups 33. All the capacitances of four first touch electrodes 27 in group A are detected with the first trace 29 to which the four first touch electrodes 27 are connected. Variations in capacitance of only the following pair of the first touch electrodes 27 among the first touch electrodes 27 in the first touch electrode lines 31 at "position X16" and "position X17" adjacent to each other with respect to the X-axis direction are detected: a pair of the first touch electrode 27 at "position X16Y9" in the first touch electrode line 31 at "position X16" belonging to group C of the first touch electrode groups 33 and the first touch electrode 27 at "position X17Y9" in the first touch electrode line 31 at "position X17" belonging to group A of the first touch electrode groups 33. In FIG. 14, the first touch electrodes 27, the variations in capacitance of which are detected, are shaded. FIG. 14 further illustrates X-axis detection signals transmitted to four first traces 29 associated with four first touch electrode groups 33 in each first touch electrode line 31. "0" represents that the X-axis detection signal is not detected and "1" represents that the X-axis detection signal is detected.

Figure 15:
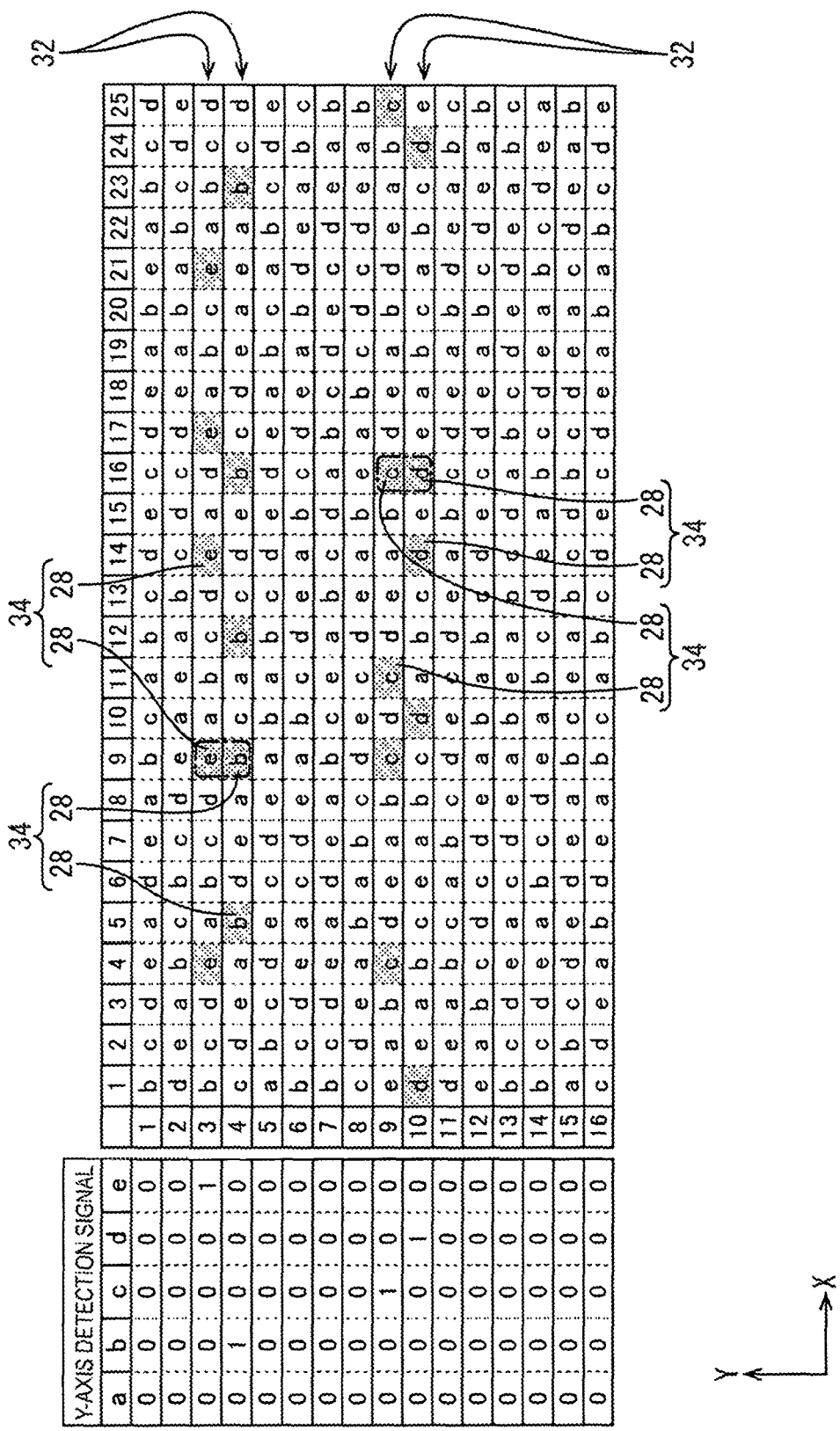
FIG. 15 is a table illustrating a condition that variations in capacitance of the second touch electrodes adjacent to each other in the X-axis direction and the second touch electrodes adjacent to each other in the Y-axis direction in response to a touching operation performed by a user are detected.

Next, the second touch electrodes 28 will be described. As illustrated in FIG. 15, the capacitance of the second touch electrodes 28 at "position X9Y3" and at "position X9Y4" adjacent to each other with respect to the Y-axis direction and the capacitance of the second electrodes at "position X16Y9" and at "position X16Y10" adjacent to "position X16Y9" vary. The second touch electrode 28 at "position X9Y3" in the second touch electrode line 32 at "position Y3" belongs to group e of the second touch electrode groups 34. All the capacitances of the five second touch electrodes 28 in group e are detected with the second trace 30 to which the five second touch electrodes 27 are connected. The second touch electrode 28 at "position X9Y4" in the second touch electrode line 32 at "position Y4" belongs to group b of the second touch electrode groups 34. All the capacitances of the five second touch electrodes 28 in group b are detected with the second trace 30 to which the five second touch electrodes 27 are connected. Variations in capacitance of only the following pair of the second touch electrodes 28 among the second touch electrodes 28 in the second touch electrode lines 32 at "position Y3" and "position Y4" adjacent to each other with respect to the Y-axis direction are detected: a pair of the second touch electrode 28 at "position X9Y3" in the second touch electrode line 32 at "position Y3" belonging to group e of the second touch electrode groups 34 and the second touch electrode 28 at "position X9Y4" in the second touch electrode line 32 at "position Y4" belonging to group b of the second touch electrode groups 34.

The second touch electrode 28 at "position X16Y9" in the second touch electrode line 32 at "position Y9" belongs to group c of the second touch electrode groups 34. All the capacitances of the five second touch electrodes 28 in group c are detected with the second trace 30 to which the five second touch electrodes 27 are connected. The second touch electrode 28 at "position X16Y10" in the second touch electrode line 32 at "position Y10" belongs to group d of the second touch electrode groups 34. All the capacitances of the five second touch electrodes 28 in group d are detected with the second trace 30 to which the five second touch electrodes 27 are connected. Variations in capacitance of only the following pair of the second touch electrodes 28 among the second touch electrodes 28 in the second touch electrode lines 32 at "position Y9" and "position Y10" adjacent to each other with respect to the Y-axis direction are detected: a pair of the second touch electrode 28 at "position X16Y9" in the second touch electrode line 32 at "position Y9" belonging to group c of the second touch electrode groups 34 and the second touch electrode 28 at "position X16Y10" in the second touch electrode line 32 at "position Y 10" belonging to group d of the second touch electrode groups 34. In FIG. 15, the second touch electrodes 28, the variations in capacitance of which are detected, are shaded. FIG. 15 further illustrates Y-axis detection signals transmitted to five second traces 30 associated with four second touch electrode groups 34 in each second touch electrode line 32. "0" represents that the Y-axis detection signal is not detected and "1" represents that the Y-axis detection signal is detected.

Figure 16:
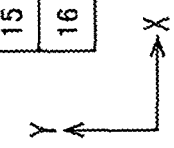
FIG. 16 is a table created by combining FIGS. 14 and 15.

A table created by combining FIGS. 14 and 15 is illustrated in FIG. 16. In FIG. 16, the letters A to D and a to e are placed in the cells in pairs. The first touch electrode 27 and the second touch electrode 28 belonging to the groups represented by the letters in each cell are at the same position (expressed by the same X and Y coordinates). If a variation in capacitance of only one of the first touch electrode 27 and the second touch electrode 28 in the same cell is detected, a triangular area of the cell is shaded. If variations in capacitance of both touch electrodes 27 and 28 are detected, a square are of the cell is shaded. FIG. 13 illustrates that variations in capacitance of both first touch electrodes 27 and the second touch electrode 28 at the same position is detected at a total of five positions: "position X9Y3;" "position X9Y9;" "position X10Y10;" "position X16Y9;" and "position X17Y3." Two positions out of the five positions are actually touched positions and three positions are ghost positions. The capacitances of two first touch electrodes 27 adjacent to each other with respect to the X-axis direction vary at actually touched positions. Furthermore, the capacitances of two second touch electrodes 28 adjacent to each other with respect to the Y-axis direction vary at actually touched positions. Whether variations in capacitance of the first touch electrodes 27 adjacent to each other with respect to the X-axis direction and the second touch electrodes 28 adjacent to each other with respect to the Y-axis direction are detected will be examined for the five positions. At "position X9Y9," "position X10Y10," and "position X17Y3," the variations in capacitance of both first touch electrodes 27 adjacent to each other with respect to the X-axis direction and second touch electrodes 28 adjacent to each other with respect to the Y-axis direction were not detected. Therefore, it is determined that these positions are the ghost positions. At "Position X9Y3" and "position X16Y9," the variations in capacitance of both first touch electrode 27 adjacent to each other with respect to the X-axis direction and second touch electrodes 28 with respect to the Y-axis direction were detected. Therefore, it is determined that these two positions are the actually touched positions. Through the determinations, the ghost positions are excluded and the actually touched positions are properly detected. In FIG. 16, the actually touched positions are indicated with chain lines.

As described earlier, the touchscreen 12 (the position inputting device) 12 according to this embodiment includes the first touch electrodes 27 (the first electrodes), the first touch electrode lines 31, the first touch electrode groups 33 (the first electrode groups), the first traces 29, the second touch electrodes 28 (the second electrodes), the second touch electrode lines 32, the second touch electrode groups 34 (the second electrode groups), and the second traces 30. The first touch electrode lines 31 include the first touch electrodes 27 arranged along the first direction. The first touch electrode lines 31 are arranged along the second direction that is perpendicular to the first direction. The first touch electrodes 27 in the first touch electrode lines 31 belong to the first touch electrode groups 33. The first traces 29 connect the first touch electrodes 27 in the respective first touch electrode groups 33 in the respective first touch electrode lines 31. Each first trace 29 is connected to the first touch electrodes 27 in the corresponding first touch electrode group 33. The first traces 29 are for applying electrical potentials to the first touch electrodes 27 per first touch electrode group 33. The second touch electrode lines 32 include the second touch electrodes 28 arranged along the second direction. The second touch electrode lines 32 are arranged along the first direction. The second touch electrode groups 34 include the second touch electrodes 28 in the second touch electrode lines 32. The second traces 30 connect the second touch electrodes 28 in the respective second touch electrode groups 34 in the respective second touch electrode lines 32. Each second trace 30 is connected to the second touch electrodes 28 in the corresponding second touch electrode group 34. The second traces 30 are for applying electrical potentials to the second touch electrodes 27 per second touch electrode group 34.

According to the configurations, the capacitances of the first touch electrodes 27 and the second touch electrodes 28 at positions at which the user enter position information. Through the detection of the variations in capacitance, the input positions with respect to the first direction and the second direction are determined. If the user enters multiple positions at the same time, ghost positions that are not actual input positions may be detected with a known self-capacitance method. According to the configuration described above, the touch electrodes 27 and 28 in the touch electrode lines 31 and 32 are grouped into the touch electrode groups 33 and 34 and electrical potentials are applied to the touch electrodes 27 and 28 via the traces 29 and 30 connected to the touch electrodes 27 and 28 per touch electrode group 33 or 34. Therefore, the actual input positions are properly detected.

The first touch electrodes 27 in the first touch electrode lines 31 are grouped into the first touch electrode groups 33. Each first touch electrode group 33 includes multiple first touch electrodes 27. If the capacitance of the first touch electrode 27 at the actual input position varies, a variation in capacitance of the other first touch electrode 27 in the same first touch electrode group 33 in the first touch electrode line 31 may be detected. In the above situation, the capacitance of the first touch electrode 27 adjacent to the first touch electrode 27 at the actual input position with respect to the second direction varies. Therefore, a variation in capacitance of the other first touch electrode 27 in the same first touch electrode group 33 in the first touch electrode line 31 may be detected. Similarly, the second touch electrodes 28 in the second touch electrode lines 32 are grouped into the second touch electrode groups 34. Each second touch electrode group 34 includes multiple second touch electrodes 28. If the capacitance of the second touch electrode 28 at the actual input position varies, a variation in capacitance of the other second touch electrode 28 in the same second touch electrode group 34 in the second touch electrode line 32 may be detected. In the above situation, the capacitance of the second touch electrode 28 adjacent to the second touch electrode 28 at the actual input position with respect to the first direction varies. Therefore, a variation in capacitance of the other second touch electrode 28 in the same second touch electrode group 34 in the second touch electrode line 32 may be detected.

The first touch electrodes 27 and the second touch electrodes 28 at the actual input positions are determined based on relationships between combinations of the first touch electrode groups 33 with varied capacitances in the first touch electrode lines 31 adjacent to each other and combinations of the second touch electrode groups 34 with varied capacitances in the second touch electrode lines 32 adjacent to each other. Even if the multiple positions are input at the same time, the ghost positions are less likely to be detected and thus the actual input positions are properly detected. It is not required to scan the touch electrodes, which is required in the known mutual-capacitance method. Therefore, the detection can be performed for a longer period and thus high detection sensitivity can be achieved.

The number of the first traces 29 connecting the first touch electrodes 27 in one first touch electrode line 31 and electrically independent from one another is equal to the number of the first touch electrode groups 33. Furthermore, the number of the second traces 30 connecting the second touch electrodes 28 in one second touch electrode line 32 and electrically independent from one another is equal to the number of the second touch electrode groups 34. According to the configuration, the first traces 29 are assigned to the first touch electrode groups 33, respectively, in each first touch electrode line 31. The first traces 29 are connected to the first touch electrodes 27 in the respective first touch electrode groups 33, respectively. Furthermore, the second traces 30 are assigned to the second touch electrode groups 34, respectively, in each second touch electrode line 32. The second traces 30 are connected to the second touch electrodes 28 in the respective second touch electrode groups 34, respectively. In comparison to a configuration in which several first traces are assigned to each first touch electrode group 33 in each first touch electrode line 31 and several second traces are assigned to each second touch electrode group 34 in each second touch electrode line 32, a percentage of the capacitance related to the first touch electrodes 27 in the first touch electrode group 33 in the capacitance related to the first traces 29 is higher and a percentage of the capacitance related to the second touch electrodes 28 in the second touch electrode group 34 in the capacitance related to the second traces 30 is higher. Therefore, further higher detection sensitivity can be achieved.

The first touch electrode lines 31 are configured such that the first touch electrodes 27 adjacent to each other with respect to the first direction belong to different first touch electrode groups 33. Furthermore, the second touch electrode lines 32 are configured such that the second touch electrodes 28 adjacent to each other with respect to the second direction belong to different second touch electrode groups 34. If the first touch electrodes adjacent to each other with respect to the first direction belong to the same first touch electrode group, the capacitances of two first touch electrodes adjacent to each other with respect to the first direction vary even when the other first touch electrode in the same first touch electrode group is at the actual input position. Therefore, a ghost position may be detected. This is the same for the second touch electrodes. As described above, the first touch electrode lines 31 are configured such that the first touch electrodes 27 adjacent to each other with respect to the first direction belong to the different first touch electrode groups 33. Furthermore, the second touch electrode lines 32 are configured such that the second touch electrodes 28 adjacent to each other with respect to the second direction belong to the different second touch electrode groups 34. Therefore, the capacitances of two first touch electrodes 27 adjacent to each other with respect to the first direction are less likely to vary. Furthermore, the capacitances of two second touch electrodes 28 adjacent to each other with respect to the second direction are less likely to vary. Therefore, ghost positions are less likely to be detected.

Among pairs of the first touch electrodes 27 that are adjacent to each other with respect to the second direction in the first touch electrode lines 31, the combination of the first touch electrode groups 33 to which the first touch electrodes 27 belong is different from the combination of the first touch electrode groups 33 to which the other first touch electrodes 27 belong within an area of at least 20 cm with respect to the first direction. Among pairs of the second touch electrodes 28 that are adjacent to each other with respect to the first direction in the second touch electrode lines 32, the combination of the second touch electrode groups 34 to which the second touch electrodes 28 belong is different from the combination of the second touch electrode groups 34 to which the other second touch electrodes 28 belong within an area of at least 20 cm with respect to the second direction. When the user inputs the positions, the capacitances of the first touch electrode 27 at the actual input position and the first touch electrode 27 adjacent to the first touch electrode 27 with respect to the second direction vary. Furthermore, the capacitances of the second touch electrode 28 at the actual input position and the second touch electrode 28 adjacent to the second touch electrode 28 with respect to the first direction vary. When the user spreads the fingers of one hand, a range within reach of two fingers of the user is about 20 cm or smaller. Therefore, as long as the user input the positions with the fingers of one hand, variations in capacitance are detected in one combination of the first touch electrode groups 33 in the first touch electrode lines 31 adjacent to each other and in one combination of the second touch electrode groups 34 in the second touch electrode lines 32. Therefore, the ghost positions are further properly excluded and thus the actual input positions are properly detected.

The first touch electrodes 27 that are adjacent to one another with respect to the second direction in the first touch electrode lines 31 belong to different first touch electrode groups 33. Combinations of the different first touch electrode groups 33 in the first touch electrode lines 31 are all different from one another. The second touch electrodes 28 that are adjacent to one another with respect to the first direction in the second touch electrode lines 32 belong to different second touch electrode groups 34. Combinations of the second touch electrode groups 34 in the second touch electrode lines 32 are all different from one another. When the user inputs the positions, the capacitances of the first touch electrodes 27 at the actual input position and the first touch electrode 27 adjacent to the first touch electrode 27 with respect to the second direction vary and the capacitances of the second touch electrodes 28 at the actual input position and the second touch electrode 28 adjacent to the second touch electrode 28 with respect to the second direction vary. The capacitances vary only in one combination of the first touch electrode groups 33 in the first touch electrode lines 31 adjacent to each other and the capacitances vary in one combination of the second touch electrode groups 34 in the second touch electrode lines 32. Therefore, the ghost positions are further properly excluded and thus the actual input positions are properly detected. For different combinations of the touch electrode groups 33 and 34, the number of the first touch electrode groups 33 may be set equal to or larger than the square root (or power root) of the lines of the first touch electrodes 27 arranged along the first direction and the number of the second touch electrode groups 34 may be set equal to or larger than the square root (or power root) of the lines of the second touch electrodes 28 arranged along the second direction.

The liquid crystal display device 10 (the display device including the position inputting function) according to this embodiment includes at least the touchscreen 12 and the liquid crystal panel 11 (the display panel) including the touchscreen 12.

With the liquid crystal panel 11 an the touchscreen 12, interactions between the input operation of the user and liquid crystal panel 11 can be smoothly performed. This configuration is suitable for improving usability.

<Second Embodiment>

A second embodiment of the present invention will be described with reference to FIGS. 17 to 22. The second embodiment includes touchscreen pattern 112P that is integrally formed with a liquid crystal panel 111. Configurations, functions, and effects similar to those of the first embodiment will not be described.

The touchscreen pattern 112P according to this embodiment is formed inside the liquid crystal panel 111 (a display panel), that is, formed using the in-cell technology. Specifically, the touchscreen pattern 112P includes first touch electrodes 127 (position inputting electrodes) and second touch electrodes 128 (position inputting electrodes) formed from a transparent electrode film of a common electrode 123 (a display electrode) on a CF board 111a. Although the common electrode in the first embodiment is the solid pattern, the common electrode 123 in this embodiment is patterned using a photolithography method to include the first touch electrodes 127 and the second touch electrodes 128 two-dimensionally arranged in a matrix.

Figure 18:
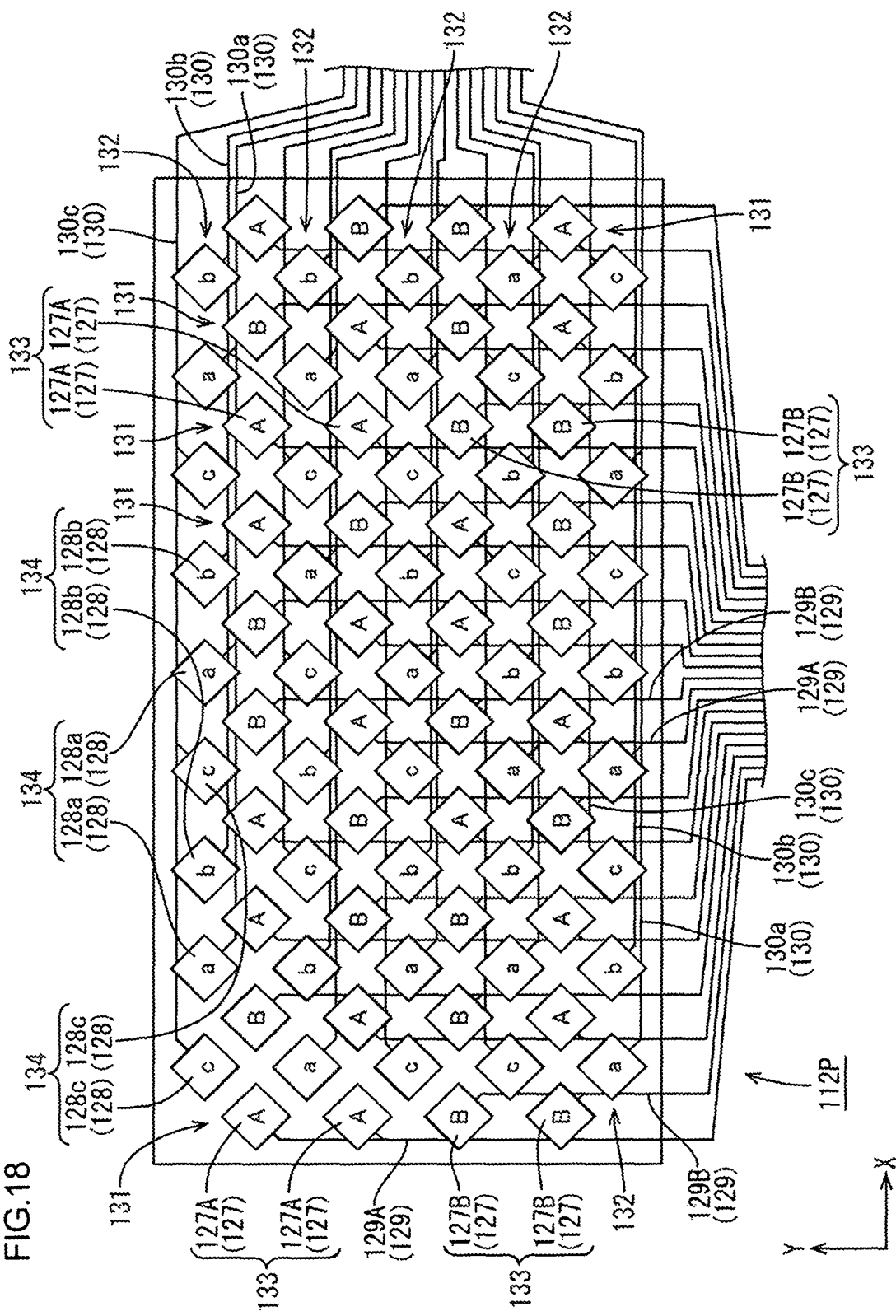
FIG. 18 is a plan view schematically illustrating arrangements of touch electrodes in a touchscreen pattern and traces.

As illustrated in FIG. 18, each of the first touch electrodes 127 and the second touch electrodes 128 in this embodiment has a diamond shape in a plan view. The first touch electrodes 127 are arranged along the Y-axis direction (the first direction) to form first touch electrode lines 131 each including four first touch electrodes 127. Nine first touch electrode lines 131 are arranged along the X-axis direction (the second direction). Four first touch electrodes 127 included in each first touch electrode line 131 are grouped into two first touch electrode groups 133. Namely, the number of the first touch electrode groups 133 is equal to the square root of the first touch electrodes 127 in the first touch electrode line 131. Two first touch electrode groups 133 are referred to as group A and group B, respectively. The letters (A and B) following the term group correspond to letters in the first touch electrodes 127 in FIGS. 18 and 19. Outer edges of the touchscreen pattern 12P in FIG. 18 define a touching area of the CF board 111a in which the touch electrodes 127 and 128 are formed.

As illustrated in FIG. 18, five second touch electrode lines 132 each including nine second touch electrodes 128 arranged along the X-axis direction (the second direction) are arranged along the Y-axis direction (the first direction). Nine second touch electrodes 128 in each second touch electrode line 132 are grouped into three second touch electrode groups 134. Namely, the number of the second touch electrode groups 134 is equal to the square root of the second touch electrodes 128 in the second touch electrode line 132. Three second touch electrode groups 134 are referred to as group a, group b, and group c. The letters (a to c) following the term group correspond to letters in the second touch electrodes 128 in FIGS. 18 and 19.

As illustrated in FIG. 18, the first touch electrode lines 131 adjacent to one another include the first touch electrodes 127 that are adjacent to one another with respect to the arrangement direction of the first touch electrode lines 131 (the X-axis direction, the second direction) and belong to different first touch electrode groups 133. Combinations of the first touch electrode groups 133 in the first touch electrode lines 131 are different from one another. The same combination does not exist and the combinations are all different for the first touch electrode lines 131. The second touch electrode lines 131 adjacent to one another include the second touch electrodes 128 that are adjacent to one another with respect to the arrangement direction of the second touch electrode lines 132 (the Y-axis direction, the first direction) and belong to different second touch electrode groups 134. Combinations of the second touch electrode groups 134 in the second touch electrode lines 132 are different from one another. The same combination does not exist and the combinations are all different for the second touch electrode lines 132. The regularity in arrangements of the first touch electrodes 127 and the second touch electrodes 128 with respect to the X-axis direction and the Y-axis direction and the groups to which the first touch electrodes 127 and the second touch electrodes 128 belong (to what first touch electrode groups 133 and to what the second touch electrode groups 134 they belong) is similar to the first embodiment.

Figure 17:
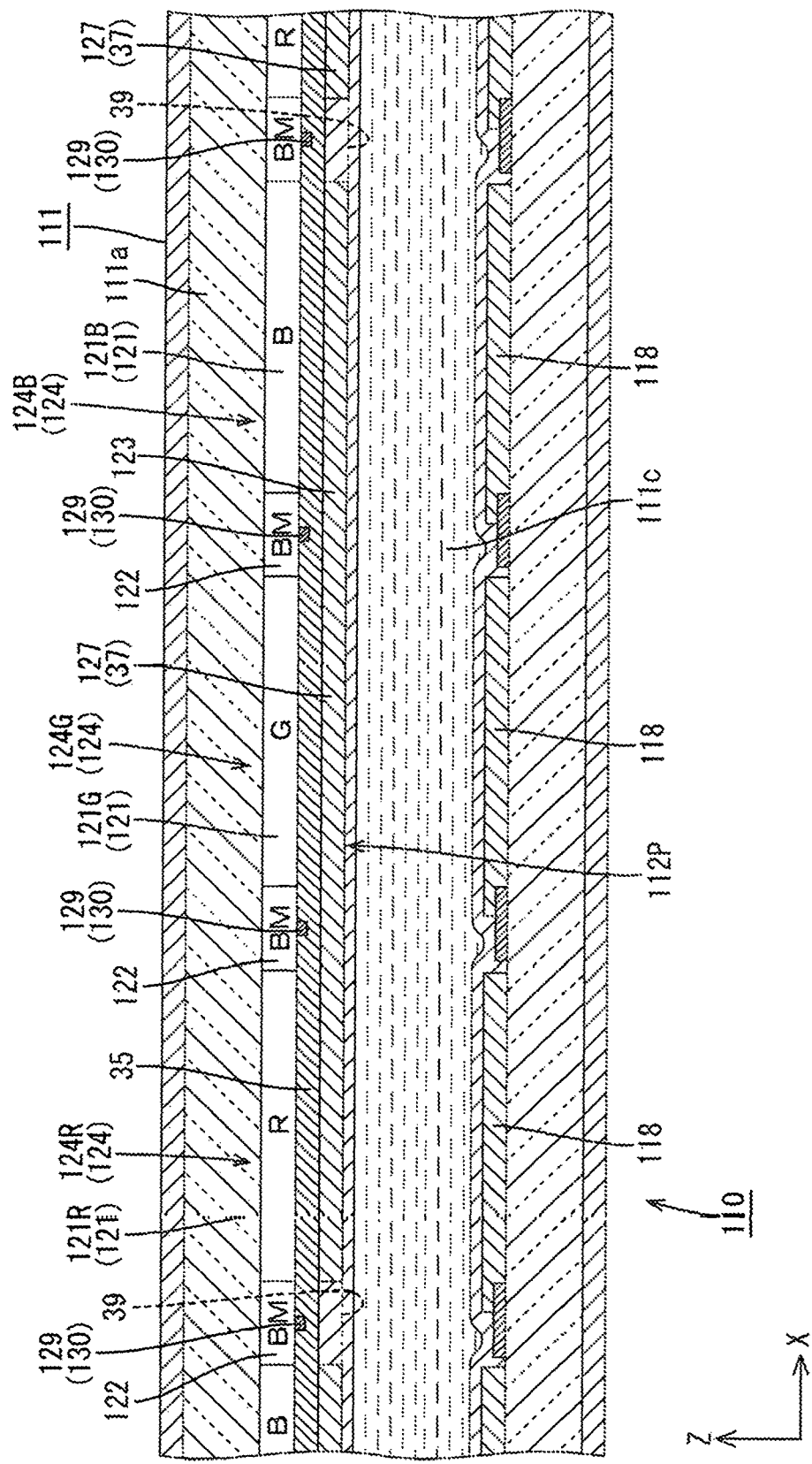
FIG. 17 is a schematic cross-sectional view illustrating a cross-sectional configuration of a liquid crystal panel according to a second embodiment of the present invention.
Figure 19:
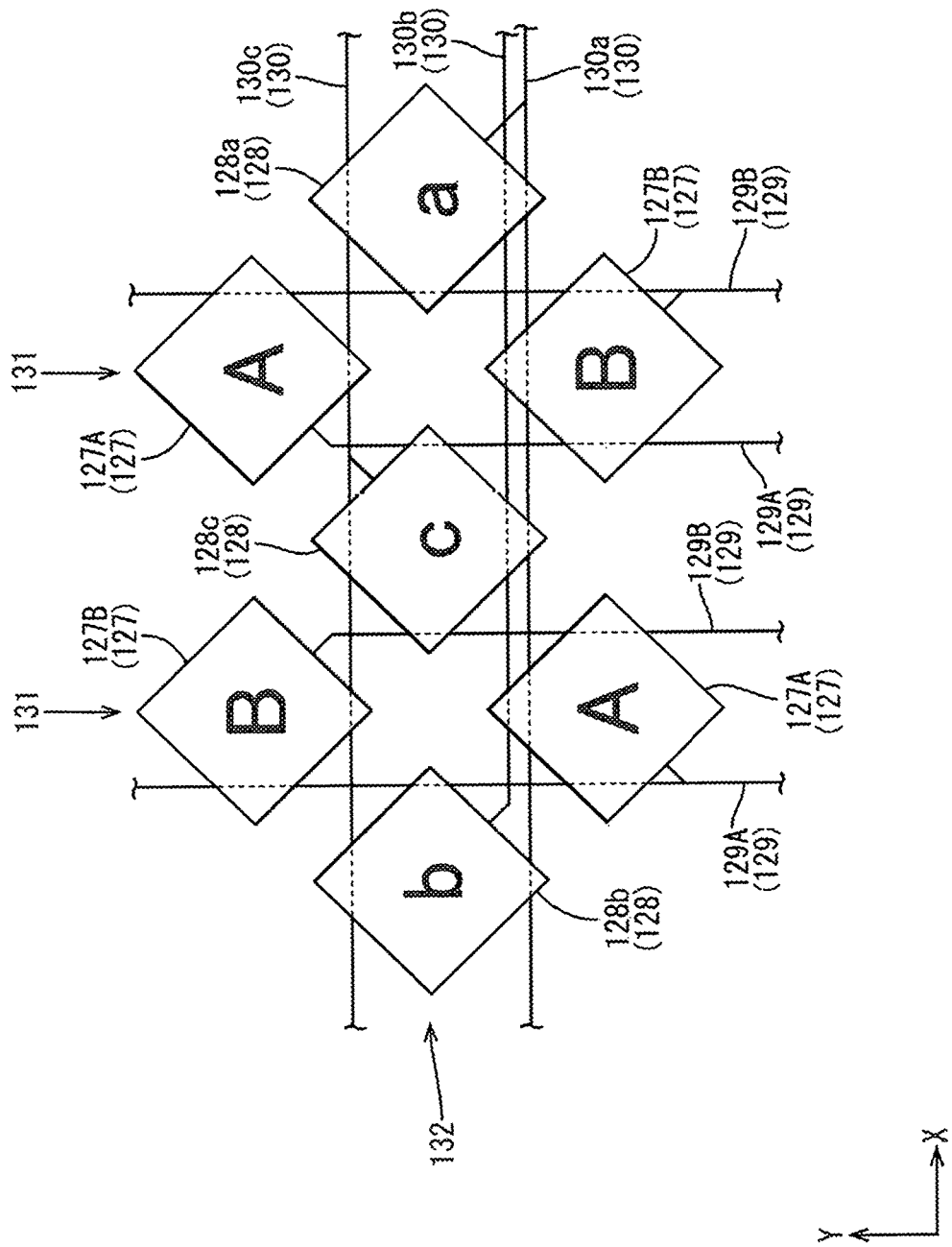
FIG. 19 is a magnified plan view of a portion of the touchscreen pattern in FIG. 18.

As illustrated in FIG. 17, first traces 129 (traces) and second traces 130 (traces) connected to the first touch electrodes 127 and the second touch electrodes 128 are made from a metal film on the CF board 111a. The meta film of the first traces 129 and the second traces 130 is formed over a light blocking layer 122 (on a liquid crystal layer 111c side) and patterned using the photolithography method. As illustrated in FIGS. 18 and 19, the first traces 129 extend along the Y-axis direction (the first direction). A portion of each first trace 129 overlaps the first touch electrodes 127 to which that first trace 129 is connected. Other portions of each first trace 129 overlap the first touch electrodes 127 to which that first trace 129 is not connected and the second touch electrodes 128. The second traces 130 extend along the X-axis direction (the second direction). A portion of each second trace 130 overlaps the second touch electrodes 128 to which that second trace 130 is connected. Other portions of each second trace 130 overlap the first touch electrodes 127 to which that second trace 130 is not connected and the second touch electrodes 128. The traces 129 and 130 arranged over the light blocking layer 122 in a plan view. Therefore, light rays passing through the pixel electrodes 118 are less likely to be blocked by the traces 129 and 130 and thus an aperture ratio and light use efficiency increase.

As illustrated in FIG. 17, an insulating film 35 is formed on the CF board 111a. The insulating film 35 is provided between the metal film, which forms the first traces 129 and the second traces 130, and a transparent electrode film, which forms the first touch electrodes 127, the second touch electrodes 128, and the common electrode 123. With the insulating film 35, the portions of the traces 129 and 130 are electrically isolated from the touch electrodes 127 and 128 even through the portions of the traces 129 and 130 are arranged to overlap the touch electrodes 127 and 128. The insulating film 35 is formed in a solid pattern for an about entire front surface of the CF board 111a as a whole. However, the insulating film 35 includes contact holes 36 for connecting portions of the traces 129 and 130 with the corresponding touch electrodes 127 and 128. The contact holes 36 are formed at points where the portions of the traces 129 and 130 overlap the corresponding touch electrodes 127 and 128 and the light blocking layer 122. According to the configuration, even if scatterings of light occur at the points where the traces 129 and 130 are connected with the corresponding touch electrodes 127 and 128, the scattered light is blocked by the light blocking layer 122. This configuration is suitable for reducing uneven brightness.

Figure 20:
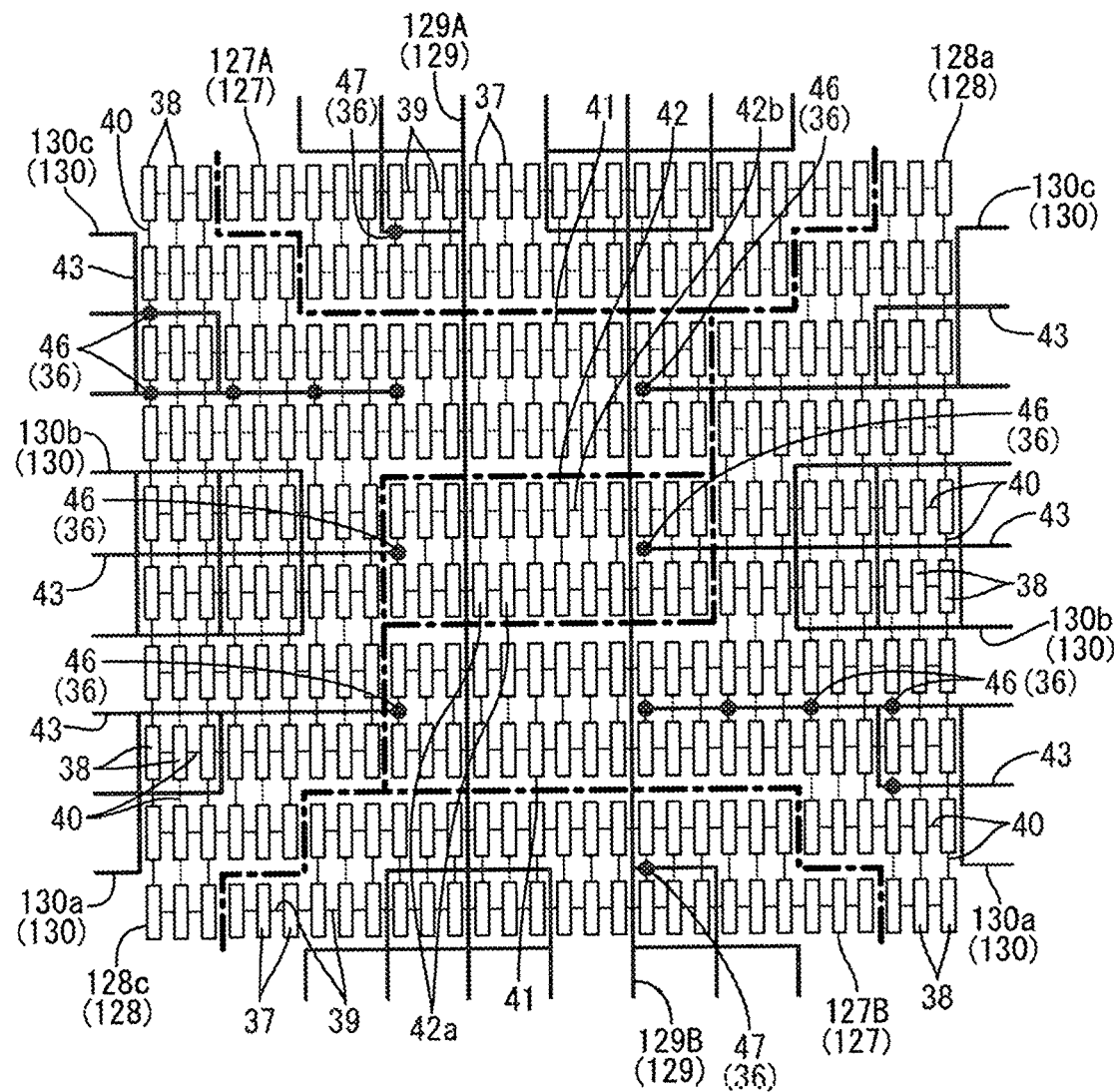
FIG. 20 is a magnified plan view illustrating some of the touch electrodes and portions of some of the traces in FIG. 19.
Figure 21:
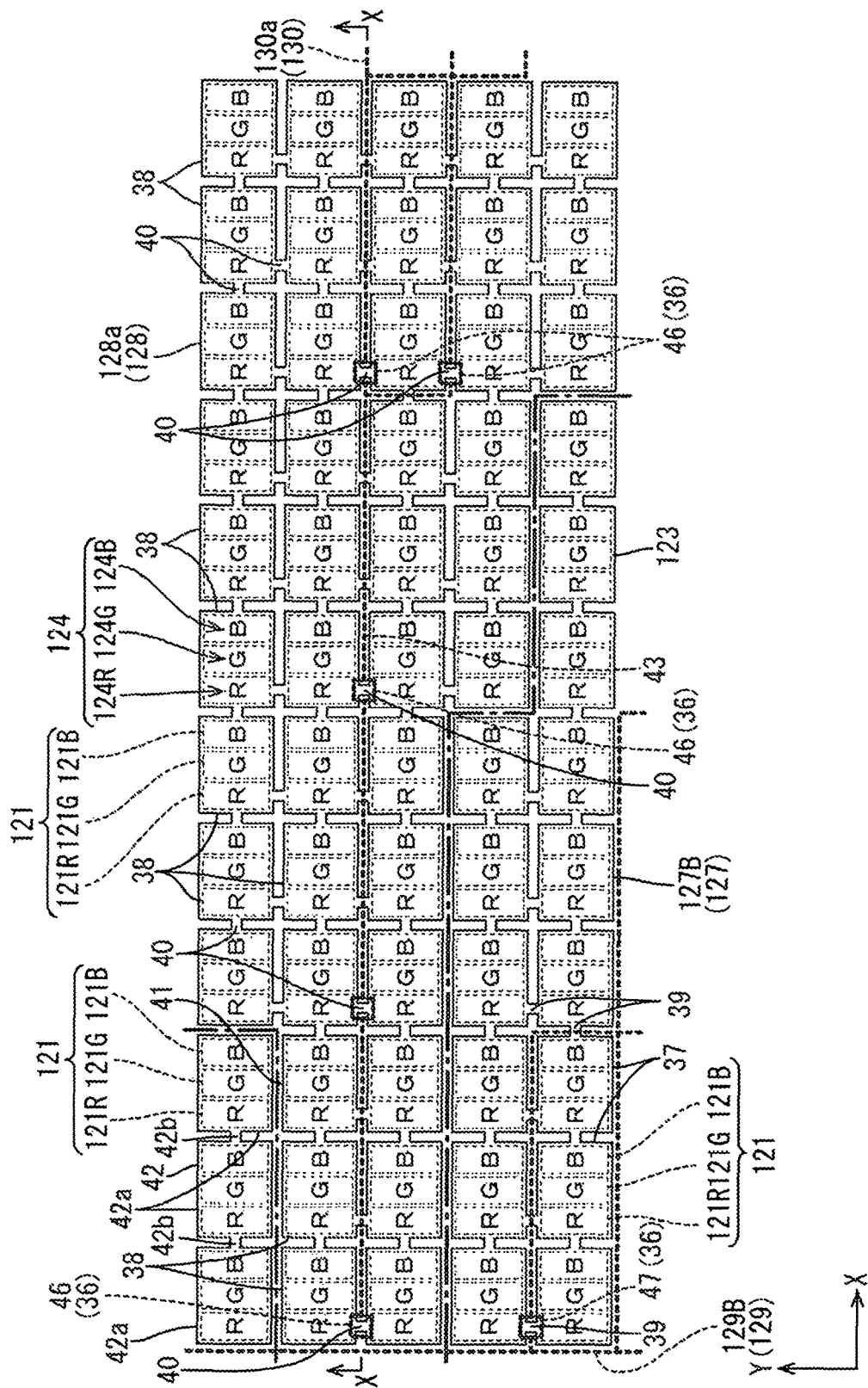
FIG. 21 is a plan view illustrating a separating point between the first touch electrodes in group B and the second touch electrodes in group a and therearound in FIG. 20.
Figure 22:
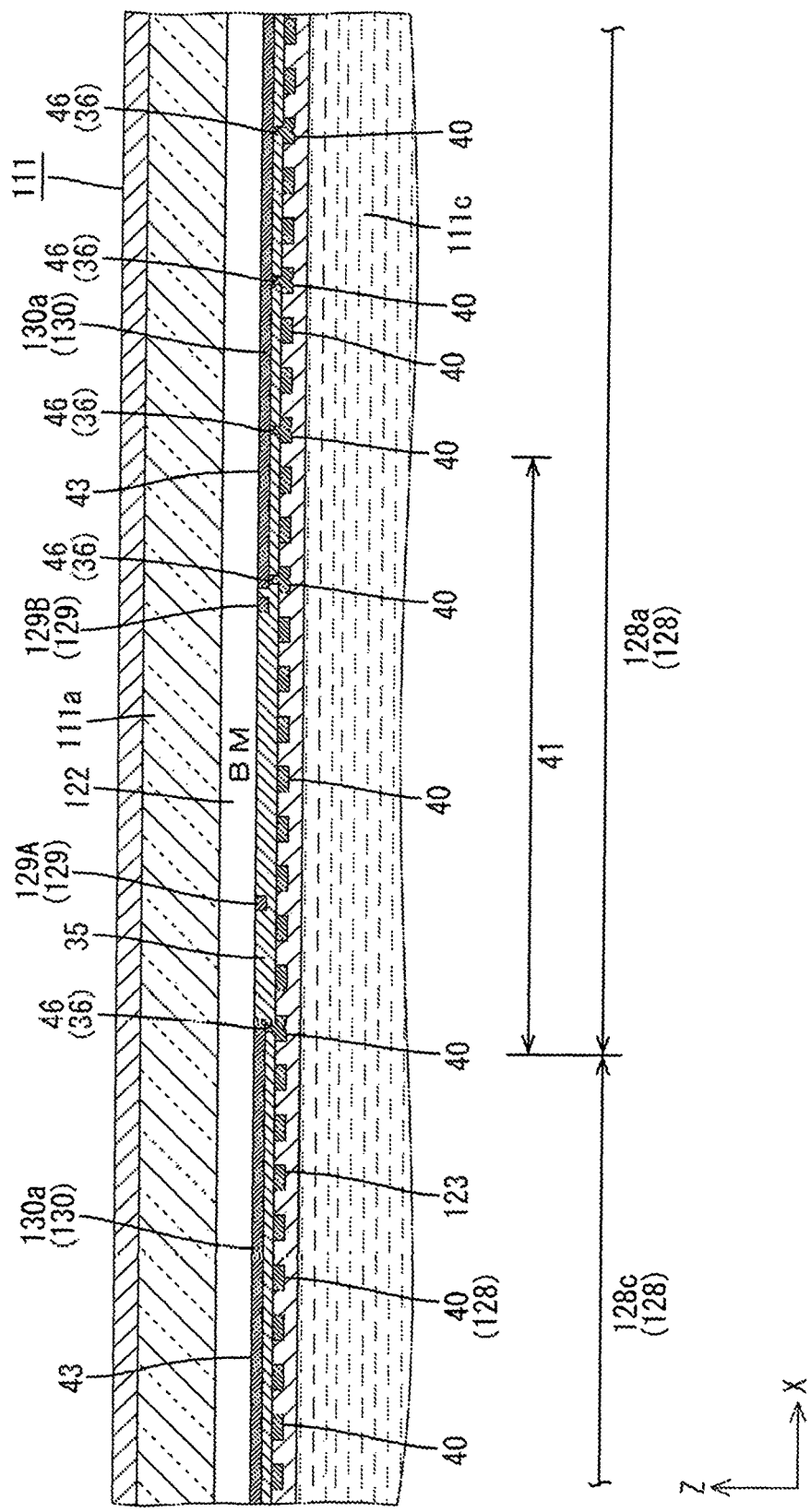
FIG. 22 is a cross-sectional view along line X-X in FIG. 21.

Connections between the touch electrodes 127 and 128 and the traces 129 and 130 will be described. FIG. 19 is a magnified plan view of a portion of the touchscreen pattern 112P illustrated in FIG. 18. FIG. 20 is a magnified plan view of touch electrodes 127 and 128 and portions of the traces 129 and 130. In FIG. 20, dividing lines on the transparent electrode film of the touch electrodes 127 and 128 for patterning are indicated by chain lines and the contact holes 36 are indicated by filled circles. In the following paragraphs, the first touch electrodes 127 (or first segment touch electrodes 37) and the first traces 129 that belong to group A of the first touch electrode groups 133 will be identified with reference symbols including the reference numbers and letter A following the reference numbers and that belong to group B of the first touch electrode groups 133 will be identified with reference symbols including the reference numbers and letter B following the reference numbers. The letters will not be added to the reference numbers when the identification is not needed to describe them in general. Furthermore, the second touch electrodes 128 (or second segment touch electrodes 38) and the second traces 130 that belong to group a of the second touch electrode groups 134 will be identified with reference symbols including the reference numbers and letter a following the reference numbers. The second touch electrodes 128 (or second segment touch electrodes 38) and the second traces 130 that belong to group b of the second touch electrode groups 134 will be identified with reference symbols including the reference numbers and letter b following the reference numbers. The second touch electrodes 128 (or second segment touch electrodes 38) and the second traces 130 that belong to group c of the second touch electrode groups 134 will be identified with reference symbols including the reference numbers and letter c following the reference numbers. The letters will not be added to the reference numbers when the identification is not needed to describe them in general. FIG. 21 is a plan view illustrating separating points between first touch electrodes 127B that belong to group B and second touch electrodes 128a that belong to group a and therearound illustrated in FIG. 20. FIG. 22 is a cross-sectional view along line X-X in FIG. 21.

As illustrated in FIG. 20, the touch electrodes 127 and 128 include the segment touch electrodes 37 and 38 (segment position inputting electrodes) and links 39 and 40 for connecting the adjacent segment touch electrodes 37 and 38. As illustrated in FIG. 17, the touch electrodes 127 and 128 are arranged such that separating points between the adjacent segment touch electrodes 37 and 38 are located between the pixel electrodes 118 and overlapped with the light blocking layer 122. As indicated by the chain lines in FIG. 20, the separating points between the touch electrodes 127 and 128 adjacent to one another with respect to the X-axis direction and the Y-axis direction are located between the adjacent segment touch electrodes 37 and 38 (between the adjacent pixel electrodes 118 overlapping the light blocking layer 122). The links 39 and 40 for connecting the adjacent segment touch electrodes 37 and 38 are arranged between the adjacent pixel electrodes 118 and overlapped with the light blocking layer 122. As illustrated in FIG. 20, the links 39 and 40 have widths that are sufficiently smaller than widths of the segment touch electrodes 37 and 38.

As illustrated in FIG. 20, the first touch electrodes 127 include the first segment touch electrodes 37 (the segment position inputting electrodes) and first links 39 (links). The first segment touch electrodes 37 are two-dimensionally arranged in a matrix along the X-axis direction and the Y-axis direction. The first links 39 connect the adjacent first segment touch electrodes 37. The first touch electrodes 127 are arranged with predefined gaps therebetween with respect to the Y-axis direction. The second touch electrodes 128 include the second segment touch electrodes 38 (the segment position inputting electrodes) and the second links 40 (the links). The second segment touch electrodes 38 are two-dimensionally arranged in a matrix along the X-axis direction and the Y-axis direction. The second links 40 connect the adjacent second segment touch electrodes 38. The second touch electrodes 128 are arranged such that portions of the second touch electrodes 128 are sandwiched between the first touch electrodes 127 adjacent to each other with respect to the Y-axis direction. The portions of the second touch electrodes 128 sandwiched between the first touch electrodes 127 adjacent to each other with respect to the Y-axis direction are electrode-side trace-crossing portions 41 (trace-crossing portions). The electrode-side trace-crossing portions 41 are arranged to cross the first traces 129 with respect to the X-axis direction. The first traces 129 extend along the Y-axis direction. One of the electrode-side trace-crossing portions 41 of each pair of the second touch electrodes 128 adjacent to each other with respect to the X-axis direction is located close to one of the first touch electrode 127 and the other one of the electrode-side trace-crossing portions 41 is located close to the other one of the first touch electrode 127. The electrode-side trace-crossing portions 41 are arranged with a predefined gap therebetween with respect to the Y-axis direction. Floating-island trace-crossing portions 42 are arranged between the electrode-side trace-crossing portions 41 adjacent to each other with respect to the Y-axis direction. The floating-island trace-crossing portions 42 are physically separated from the adjacent touch electrodes 127 and 128 as if they are floating islands. The floating-island trace-crossing portions 42 are made from the transparent electrode film of the touch electrodes 127 and 128. The floating-island trace-crossing portions 42 include segment floating-island trace-crossing portions 42a and links 42b for connecting the adjacent segment floating-island trace-crossing portions 42a. The segment floating-island trace-crossing portions 42a and the links 42b of the floating-island trace-crossing portions 42 are two-dimensionally arranged similarly to the segment touch electrodes 37 and 38 and the links 38 and 40 of the touch electrodes 127 and 128 described earlier.

As illustrated in FIGS. 20 and 21, the traces 129 and 130 are arranged to pass through between the adjacent segment touch electrodes 37 and 38 and between the adjacent segment floating-island trace-crossing portions 42a. In FIG. 21, the traces 129 and 130 are indicated with thin broken lines. The traces 129 and 130 do not overlap the segment touch electrodes 37 and 38 and the segment floating-island trace-crossing portions 42a having larger areas in a plan view. The traces 129 and 130 overlap the links 39, 40, and 42b having smaller areas in the plan view. In comparison to a configuration in which the traces are arranged to overlap the segment touch electrodes 37 and 38 and the segment floating-island trace-crossing portions 42a, parasitic capacitances between the traces 129 and 130 and the touch electrodes 127 and 128 or the floating-island trace-crossing portions 42 are smaller. Therefore, signals transmitted to the traces 129 and 130 are less likely to slow down and thus touching sensitivity is less likely to decrease. The traces 129 and 130 are arranged to pass between the adjacent pixel electrodes 118 and thus not overlap the pixel electrodes 118. As illustrated in FIGS. 17 and 21, the traces 129 and 130 are arranged to overlap the light blocking layer 122. According to the configuration, light rays passing through pixel electrodes 118 are less likely to be blocked by the traces 129 and 130 and thus an aperture ratio increases. As illustrated in FIGS. 20 and 21, the contact holes 36 in the insulating film 35 for connecting the traces 129 and 130 with the touch electrodes 127 and 128 are arranged to overlap specific links 39, 40, and 42b in a plan view. Specifically, the contact holes 36 are arranged between the color portions adjacent to each other in specific color combination (e.g., between the red color portions 121R and 121R in FIG. 21) and to overlap the links 39, 40, and 42b in the plan view. Other than the example in FIG. 21, the contact holes 36 may be arranged between blue color portions 121B and the red color portions 121R adjacent to each other and to overlap the links 39, 40, and 42b in the plan view. In FIG. 21, the contact holes 36 are indicated with thick broken lines. The traces 129 and 130 are connected to the links 39, 40, and 42b of the touch electrodes 127 and 128 and the floating-island trace-crossing portions 42 but not to the segment touch electrodes 37 and 38 and the segment floating-island trace-crossing portions 42a. The traces 129 and 130 are arranged totally not to overlap the touch electrodes 127 and 128 and the floating-island trace-crossing portions 42. Furthermore, the contact holes 36 are arrange between the adjacent pixel electrodes 118 so as not to overlap the pixel electrodes 118. As illustrated in FIG. 22, the contact holes 36 are arranged to overlap the light blocking layer 122. According to the configuration, light rays passing through the pixel electrodes 118 are less likely to reach the connecting points between the traces 129 and 130 and the touch electrodes 127 and 128 and between the traces 129 and 130 and the floating-island trace-crossing portions 42. This configuration is suitable for reducing the uneven brightness.

As illustrated in FIG. 20, the first traces 129 extend along the Y-axis direction without breaks for an entire length thereof. Each first trace 129 includes a portion that crosses the electrode-side trace-crossing portion 41 and the floating-island trace-crossing portion 42 of the corresponding second touch electrode 128. The portion is a single line that linearly extends along the Y-axis direction. Each first trace 129 includes a portion that overlaps the corresponding first touch electrode 127. The portion includes multiple lines that cross one another to form a mesh pattern. According to the configuration, the first traces 129 do not largely overlap the second touch electrodes 128 and the floating-island trace-crossing portions 42 that are not connected to the first traces 129 (overlapping areas are maintained at a minimum). Furthermore, reductions in wiring resistances and redundancy can be achieved. Portions of the portions of the first traces 129 overlapping the first links 39 for connecting the portions of the first segment touch electrodes 37 of the first touch electrodes 127 are electrically connected to the first links 39 via first contact holes 46 of the contact holes 36. First traces 129A of the first traces 129 belonging to group A and first traces 129B of the first traces 129 belonging to group B are parallel to each other and separated with predefined gaps with respect to the X-axis direction. The electrode-side trace-crossing portion 41 and the floating-island trace-crossing portions 42 cross both of two first traces 129A.

As illustrated in FIG. 20, the second traces 130 extend along the X-axis direction with breaks. The second traces 130 include segment second traces 43 arranged to sandwich the first traces 129 therebetween with respect to the X-axis direction. The segment second traces 43 do not overlap the first traces 129 in the plan view but overlap the second touch electrodes 128 (including the electrode-side trace-crossing portions 41) and the floating-island trace-crossing portions 42 in the plan view. Each segment second trace 43 includes a portion that overlap the electrode-side trace-crossing portions 41 and the floating-island trace-crossing portions 42 and portions therearound. A single line that linearly extends along the X-axis direction forms the portions. Other portions of each segment second trace 43 include lines crossing one another and connected to one another to form a mesh pattern. According to the configuration, the second traces 130 do not largely overlap the electrode-side trace-crossing portions 41 to which the second traces 130 are connected, the electrode-side trace-crossing portions 41 to which the second traces 130 are not connected and adjacent to the floating-island trace-crossing portions 42, or the floating-island trace-crossing portions 42 (overlapping areas are maintained at a minimum). Furthermore, reductions in wiring resistances and redundancy can be achieved.

Second traces 130a of the second traces 130 belonging to group a and second traces 130c of the second traces 130 belonging to group c have the following configurations. Two segment second traces 43 adjacent to each other with respect to the X-axis direction, which sandwich the first trace 129. One of the segment second traces 43 is connected to one of ends of the electrode-side trace-crossing portion 41 of the second touch electrode 128 to which the segment second trace 43 is connected. The other one of the segment second traces 43 is connected to a body of the second touch electrode 128 to which the segment second trace 43 is connected and to the other one of the ends of the electrode-side trace-crossing portion 41. Namely, with the second traces 130a and 130c, signals can be transmitted to the second touch electrodes 128a and 128c crossing the first trace 129 using the electrode-side trace-crossing portions 41 of the second touch electrodes 128 to which the second traces 130a and 130c are connected as bypasses of paths. Second contact holes 47 of the contact holes 36 for connecting the segment second traces 43 to the second touch electrodes 128 are arranged at points on the insulating film 35 where the segment second traces 43 overlap the second links 40 of the second touch electrodes 128 to which the segment second traces 43 are connected. The other one of the segment second traces 43 is connected to the body of the second touch electrode 128 at several points. Therefore, high connection reliability is achieved.

Each of second traces 130b of the second traces 130 in group b has the following configuration. As illustrated in FIG. 20, one of two segment second traces 43 adjacent to each other with respect to the X-axis direction and arranged to sandwich the first trace 129 is connected to one of ends of the corresponding floating-island trace-crossing portion 42. The other one of the segment second traces 43 is connected to the other one of ends of the corresponding floating-island trace-crossing portion 42. Namely, the second traces 130b crossing the first traces 129 are configured to transmit signals to the second touch electrodes 128b using the floating-island trace-crossing portions 42 as bypasses in the path. The second contact holes 47 of the contact holes 36 for connecting the segment second traces 43 to the floating-island trace-crossing portions 42 are arranged in the insulating film 35 to overlap the segment second traces 43 and the links 42b of the corresponding floating-island trace-crossing portions 42.

As described above, portions of the transparent electrode film forming the first touch electrodes 127 and the second touch electrodes 128 are used as the bypasses of the path of the second traces 130 that cross the first traces 129. Therefore, flexibility increases in arrangement of the first traces 129 and the second traces 130. The first traces 129 and the second traces 130 can be routed immediately below the corresponding first touch electrodes 127 and the corresponding second touch electrodes 128. This configuration is suitable for reducing the wiring resistances in the path for applying the electrical potentials to the first touch electrodes 127 and the second touch electrodes 128 through the first traces 129 and the second traces 130.

As illustrated in FIG. 21, each of the segment touch electrodes 37 and 38 of the touch electrodes 127 and 128 has an area that covers three color portions 121R, 121B, and 121B of color filters 121 in red (R), green (G), and blue (B) and three pixel electrodes 118 overlapping the color portions 121R, 121B, and 121B. Namely, each of the segment touch electrodes 37 and 38 has an area that covers an R unit pixel 124R, a G unit pixel 124G, and a B unit pixel 124B of a display pixel 124. According to the configuration, the capacitance across the three pixel electrodes 118 including three color unit pixels 124R, 124G and 124B and the common electrode 123 of the segment touch electrodes 37 and 38 remains constant. Therefore, display unevenness is less likely to occur. Each of the segment floating-island trace-crossing portions 42a of the floating-island trace-crossing portions 42 has an area that covers the three color portions 121R, 121G, and 121B and three pixel electrodes 118 of the three unit pixels 124R, 124Q and 124B that overlap the three color portions 121R, 121G, and 121B.

As described above, the liquid crystal display device 110 (the display device having the position detection function) according to this embodiment includes the pixel electrodes, the common electrode 123, the first touch electrodes 127, the second touch electrodes 128, the traces, and the insulating film 35. The pixel electrodes 118 and the common electrode 123 are display electrodes. The first touch electrodes 127 and the second touch electrodes 128 are position inputting electrodes for detecting input positions. The first touch electrodes 127 and the second touch electrodes 128 are formed from the transparent electrode film. The traces include the first traces 129 and the second traces 130. The first traces 129 and the second traces 130 are formed from the metal film. The first traces 129 and the second traces 130 are connected to the first touch electrodes 127 and the second touch electrodes 128 to apply the electrical potentials to the first touch electrodes 127 and the second touch electrodes 128. The first traces 129 extend along the first direction. The second traces 130 extend along the second direction perpendicular to the first direction. The insulating film 35 is arranged between the first touch electrodes 127 and the second touch electrodes 128. The insulating film 35 includes the contact holes 36 formed to overlap the first touch electrodes 127 and the second touch electrodes 128 and at least one of the first traces 129 and the second traces 130.

Although the first touch electrodes 127 and the second touch electrodes 128 are formed from the transparent electrode film, at least one of the first traces 129 and the second traces 130 included in the traces formed from the metal film are connected to the first touch electrodes 127 and the second touch electrodes 128 via the contact holes 36 in the insulating film 35. The insulating film 35 is provided between the transparent electrode film and the metal film. According to the configuration, the wiring resistances in the path for applying the electrical potentials to the first touch electrodes 127 and the second touch electrodes 128 can be maintained low. Because the insulating film 35 is provided between the transparent electrode film and the traces formed from the metal film, high flexibility is achieved in routing of the first traces 129 and the second traces 130 included in the traces. Furthermore, at least one of the first traces 129 and the second traces 130 are properly connected to the corresponding first touch electrodes 127 and the corresponding second touch electrodes 128.

The position inputting electrodes include the first touch electrodes 127 (the first position inputting electrodes) connected to the first traces 129 and the second touch electrodes 128 (the second position inputting electrodes) connected to the second traces 130. The contact holes 36 include the first contact holes 46 and the second contact holes 47. The first contact holes 46 are formed to overlap the first touch electrodes 127 and the first traces 129. The second contact holes 47 are formed to overlap the second touch electrodes 128 and the second traces 130. Because the first traces 129 and the second traces 130 that are perpendicular to each other are connected to the first touch electrodes 127 and the second touch electrodes 128 via the first contact holes 46 and the second contact holes 47, high flexibility is achieved in routing the first traces 129 and the second traces 130. Furthermore, the first traces 129 and the second traces 130 are properly connected to the corresponding first touch electrodes 127 and the corresponding second touch electrodes 128.

The second traces 130 include the segment second traces 43 that sandwich the first traces 129 with respect to the second direction. The first touch electrodes 127 and the second touch electrodes 128 include the electrode-side trace-crossing portions 41 (the trace-crossing portions) arranged to overlap the segment second traces 43, some of which sandwich the first traces 129. The insulating film 35 includes the contact holes 36 formed to overlap the segment second traces 43 and the electrode-side trace-crossing portions 41. The second traces 130 include the segment second traces 43 arranged to sandwich the first traces 129 with respect to the second direction. The segment second traces 43 are connected to the electrode-side trace-crossing portions 41 included in the first touch electrodes 127 and the second touch electrodes 128 via the contact holes 36 in the insulating film 35. The electrode-side trace-crossing portions 41 cross the first traces 129 with respect to the second direction. The second traces 130 are arranged to cross the first traces 129 without short circuit. According to the configuration, the wiring resistances in the path for applying the electrical potentials to the first touch electrodes 127 and the second touch electrodes 128 through the first traces 129 and the second traces 130 formed from the metal film are maintained further lower. Furthermore, this configuration is suitable for increasing the flexibility in arrangement of the traces 129 and 130 and for the first touch electrodes 127 and the second touch electrodes 128 that are complicatedly arranged.

The display electrodes include the pixel electrodes 118 and the common electrode 123 formed from the transparent electrode film and provided with respect to the pixel electrodes 118. The first touch electrodes 127 and the second touch electrodes 128 are formed from the transparent electrode film that forms the common electrode 123. Because the first touch electrodes 127 and the second touch electrodes 128 for detecting the input positions are formed from the transparent film that forms the common electrode 123, the configuration of the liquid display device 110 (or the liquid crystal panel 111) can be simplified. Furthermore, high flexibility is achieved in defining shapes and sizes of the first touch electrodes 127 and the second touch electrodes 128.

The first touch electrodes 127 and the second touch electrodes 128 include the first segment touch electrodes 37 and the second segment touch electrodes 38 (the segment position inputting electrodes) and the first links 39 and the second links 40 (the links). The first links 39 and the second links 40 connect the portions of the first segment touch electrodes 37 and the portions of the second segment touch electrodes 38. The first traces 129 and the second traces 130 are arranged to pass through between the adjacent first segment touch electrodes 37 and the adjacent second segment touch electrodes 38. As described above, the first touch electrodes 127 and the second touch electrodes 128 include the first segment touch electrodes 37, the second segment touch electrodes 38, the first links 39, and the second links 40, and the first traces 129 and the second traces 130 are passed through between the adjacent first segment touch electrodes 37 and the adjacent second segment touch electrodes 38. Therefore, the parasitic capacitances between the first traces 129 and the second traces 130 and the first touch electrodes 127 and the second touch electrodes 128 can be reduced and thus rounding is less likely to occur in electrical potentials (signals) transmitted to the first traces 129 and the second traces 130.

The light blocking layer 122 (the light blocking portion) for blocking light is provided at positions between the pixel electrodes. The separating points of the first segment touch electrodes 37 and the second segment touch electrodes 38 of the first touch electrodes 127 and the second touch electrodes 128 are located between the adjacent pixel electrodes 118. The first traces 129 and the second traces 130 are arranged to overlap the light blocking layer 122. Because the separating points of the first segment touch electrodes 37 and the second segment touch electrodes 38 are located between the adjacent pixel electrodes 118 and the first traces 129 and the second traces 130 passed through between the first segment touch electrodes 37 and the second segment touch electrodes 38 are arranged to overlap the light blocking layer 122, the light rays passing through the pixel electrodes 118 are less likely to be blocked by the first traces 129 and the second traces 130. Therefore, the aperture ratio improves. Because the first traces 129 and the second traces 130 are arranged to overlap the light blocking layer 122, ambient light is less likely to be directly applied to the first traces 129 and the second traces 130 and less likely to be irregularly reflected. The first traces 129 and the second traces 130 are less likely to be directly viewed by the user. Contrast is less likely to decrease under the ambient light and moire is less likely to occur. Therefore, visibility of a displayed image improves.

The separating points of the first segment touch electrodes 37 of the first touch electrodes 127 and the second segment touch electrodes 38 of the second touch electrodes 128 are located between the adjacent pixel electrodes 118. The contact holes 36 of the insulating film 35 are arranged to overlap the first links 39 and the second links 40. In comparison to a configuration in which the contact holes are arranged to overlap the first segment touch electrodes 37 and the second segment touch electrodes 38, it is not required to arrange portions of the first traces 129 and the second traces 130 to overlap the first segment touch electrodes 37 and the second segment touch electrodes 38. Because the separating points of the first segment touch electrodes 37 and the second segment touch electrodes 38 are located between the adjacent pixel electrodes 118, the light rays passing through the pixel electrodes 118 are less likely to reach the connections between the first traces 129 and the first touch electrodes 127 and between the second traces 130 the second touch electrodes 128. Therefore, the display unevenness is less likely to occur.

The color filters 121 including the color portions 121R, 121G and 121B arranged to overlap the pixel electrodes 118 and exhibiting different colors are provided. The contact holes 36 of the insulating film 35 are located between the adjacent color portions 121R and 121R in combinations of the specific color. The color portions 121R, 121G, and 121B are arranged to overlap the pixel electrodes 118. The light blocking layer 122 is arranged between the adjacent color portions 121R, 121G, and 121B and to overlap the contact holes 36. Although most of light rays passing through the contact holes 36 are blocked by the light blocking layer 122, some of the light rays leak to the color portion 121R, 121G, 121B side. This may cause color unevenness. Because the contact holes 36 are located between the adjacent color portions 121R and 121R in combinations of the specific color, even if the light rays leak, the light rays are less likely to be viewed as color unevenness. Furthermore, the contact holes 36 are regularly arranged. Therefore, high workability is achieved in a display inspection.

The color filters 121 including the color portions 121R, 121G, and 121B arranged to overlap the pixel electrodes 118 and exhibiting at least blue, green, and red are provided. The contact holes 36 of the insulating film 35 are arranged adjacent to each other and between the blue color portions 121B and the red color portions 121R. The color portions 121R, 121, and 121B are arranged to overlap the pixel electrodes 118. The light blocking layer 122 is arranged between the adjacent color portions 121R, 121G, and 121B and to overlap the contact holes 36. Although most of light rays passing through the contact holes 36 are blocked by the light blocking layer 122, some of the light rays leak to the color portion 121R, 121G, 121B side. To reduce such a leak, the area in which the light blocking layer 122 is formed may be increased to block the larger number of light rays passing through the contact holes 36. However, the amount of light passing through the color portions 121R, 121Q and 121B may decrease and thus the brightness may decrease. With the contact holes 36 located between the blue color portions 121B and the red color portions 121R, the amount of light passing through the green color portions 121G and most contributing to the brightness is less likely to decrease. Therefore, a decrease in brightness related to the contact holes 36 is less likely to occur.

The first traces 129 and the second traces 130 are formed in the mesh pattern to pass through between the adjacent first segment touch electrodes 37 and the adjacent second segment touch electrodes 38. Because the first traces 129 and the second traces 130 are formed in the mesh pattern, the wiring resistances are reduced.

The color filters 121 and the display pixels 124 are provided. The color filters 121 include the color portions 121R, 121G, and 121B arranged to overlap the pixel electrodes 118 and exhibiting different colors. The display pixels 124 include unit pixels 124R, 124G, and 124B adjacent to one another and exhibiting different colors. The unit pixels 124R, 124G; and 124B include combinations of the pixel electrodes 118 and the color portions 121R, 121G and 121B that overlap the pixel electrodes 118. Each of the first segment touch electrodes 37 and the second segment touch electrodes 38 has the area that covers the pixel electrodes 118 included in the corresponding unit pixels 124R, 124G, and 124B of the corresponding display pixel 124. With the first segment touch electrodes 37 and the second segment touch electrodes 38 each having the areas that cover the pixel electrodes 118 included in the corresponding unit pixels 124R, 124G, and 124B of the corresponding display pixels 124, the capacitances across the pixel electrodes 118 and the common electrode 123 remain stable. Therefore, the display unevenness is less likely to occur.

The display electrodes include the pixel electrodes 118 and the common electrode 123. The common electrode 123 is formed from the transparent electrode film and provided with respect to the pixel electrodes 118. The first touch electrodes 127 and the second touch electrodes 128 are formed from the transparent electrode film that forms the common electrode 123. The first touch electrodes 127 and the second touch electrodes 128 are formed by dividing the transparent electrode film at positions between the adjacent pixel electrodes 118. Because the first touch electrodes 127 and the second touch electrodes 128 are formed from the transparent electrode film that forms the common electrode 123, high flexibility is achieved in defining shapes and sizes of the first touch electrodes 127 and the second touch electrodes 128. Because first touch electrodes 127 and second touch electrodes 128 are formed by dividing the transparent electrode film that forms the common electrode 123 at positions between the adjacent pixel electrodes 118, the overlapping areas between the pixel electrodes 118 and the common electrode 123 are equalized, that is, the capacitances between the touch electrodes 27 and 28 that overlap each other are equalized. Therefore, the display unevenness is less likely to occur.

<Third Embodiment>

A third embodiment will be described with reference to FIGS. 23 to 27. The third embodiment includes first touch electrodes 227 and second touch electrodes 228 belonging to groups different from those of the first embodiment. Configurations, functions, and effects similar to those of the first embodiment will not be described.

Figure 23:
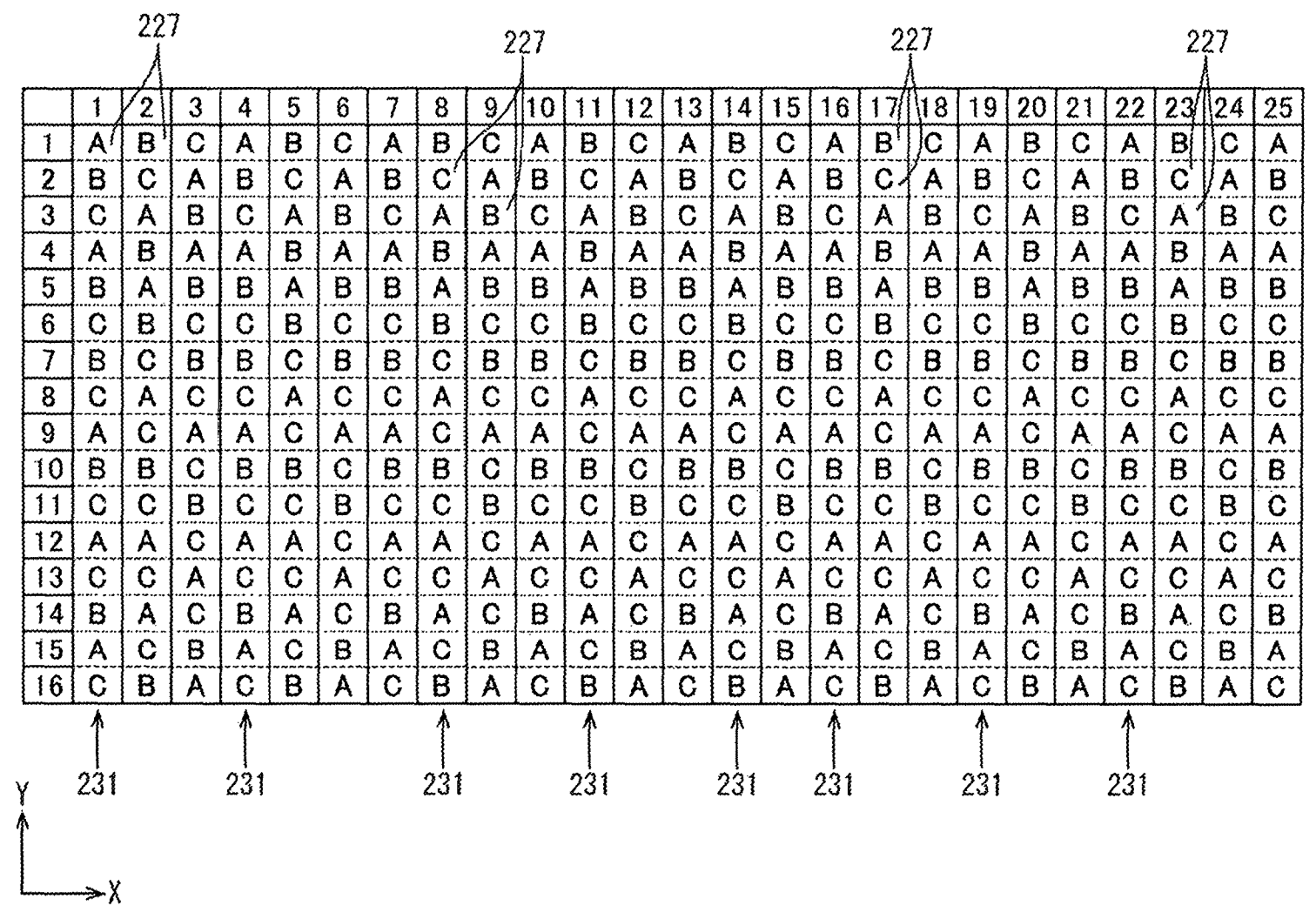
Figure 24:
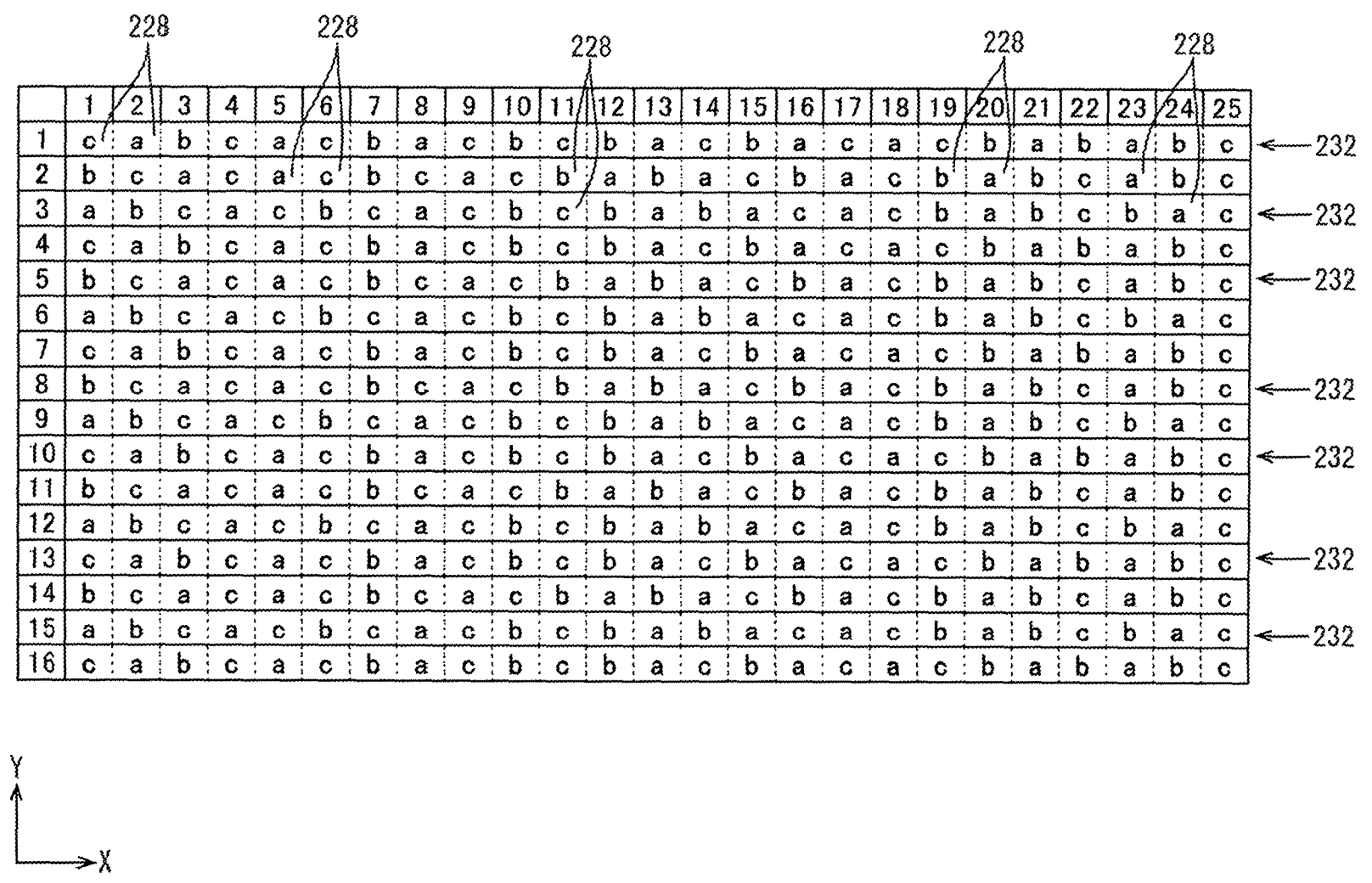

As illustrated in FIGS. 23 and 24, the first touch electrodes 227 and the second touch electrodes 228 according to this embodiment belong to three types of first touch electrode groups and three types of second touch electrode groups, respectively. The number of the first touch electrode groups is larger than a cubic root of the number of the first touch electrodes 227 (16) included in a first touch electrode line 231 (approx. 2.51). The number of the second touch electrode groups is larger than a cubic root of the number of the second touch electrodes 228 (25) included in a second touch electrode line 232 (approx. 2.92). Three types of first touch electrode groups are referred to as group A, group B, and group C. The letters (A to C) following the term group correspond to letters (A to C) in FIG. 23. Three types of second touch electrode groups are referred to as group a, group b, and group c. The letters (a to c) following the term group correspond to letters (a to c) in FIG. 24.

As illustrated in FIG. 23, the first touch electrodes 227 included in the first touch electrode lines 231 are arranged such that a combination of the first touch electrode groups to which three first touch electrodes 227 adjacent to one another with respect to the arrangement direction of the first touch electrode lines 231 (the X-axis direction, the second direction) belong, respectively, is different from a combination of the first touch electrode groups to which another three first touch electrodes 227 adjacent to one another with respect to the arrangement direction of the first touch electrode lines 231 belong, respectively. This is true for all combinations. The number of the combinations of the first touch electrode groups to which three first touch electrodes 227 adjacent to one another with respect to the X-axis direction belong, respectively, is larger than the cubic of the number of the first touch electrode groups in each first touch electrode line 231, namely, larger than the number of the first touch electrodes 227 included in the first touch electrode line 231. The combination of the first touch electrode groups to which the first touch electrode 227 in one first touch electrode line 231 belong and the adjacent first touch electrodes 227 with respect to the X-axis direction belong is different from the combination of the first touch electrode groups to which the first touch electrodes 227 in another first touch electrode line 231 and the adjacent first touch electrodes 227 with respect to the X-axis direction belong. The same combination does not exist and the combinations are all different. Therefore, if capacitances of three first touch electrodes 227 adjacent to one another with respect to the X-axis direction vary in response to a touching operation of the user, it is assumed that capacitances of other first touch electrodes 227 in three first touch electrode lines 231 including the three first touch electrodes 227 adjacent to one another with respect to the X-axis direction do not vary. Similar to the first embodiment, the first touch electrodes 227 included in the first touch electrode lines 231 are arranged such that each first touch electrode 227 and the adjacent first touch electrode 227 with respect to the arrangement direction thereof (the Y-axis direction, the first direction) belongs to the first touch electrode groups different from each other.

As illustrated in FIG. 24, the second touch electrodes 228 included in the second touch electrode lines 232 are arranged such that a combination of the second touch electrode groups to which three second touch electrodes 228 adjacent to one another with respect to the arrangement direction of the second touch electrode lines 232 (the Y-axis direction, the first direction) belong, respectively, is different from a combination of the second touch electrode groups to which another three second touch electrodes 228 adjacent to one another with respect to the arrangement direction of the second touch electrode lines 232 belong, respectively. This is true for all combinations. The number of the combinations of the second touch electrode groups to which three second touch electrodes 228 adjacent to one another with respect to the Y-axis direction belong, respectively, is larger than the cubic of the number of the second touch electrode groups in each second touch electrode line 232, namely, larger than the number of the second touch electrodes 228 included in the second touch electrode line 232. The combination of the second touch electrode groups to which the second touch electrode 228 in one second touch electrode line 232 and the adjacent second touch electrodes 228 with respect to the X-axis direction belong is different from the combination of the second touch electrode groups to which the second touch electrode 228 in another second touch electrode line 232 and the adjacent first touch electrodes 228 with respect to the Y-axis direction belong, respectively. The same combination does not exist and the combinations are all different. Therefore, if capacitances of three second touch electrodes 228 adjacent to one another with respect to the Y-axis direction vary in response to a touching operation of the user, it is assumed that capacitances of other second touch electrodes 228 in three second touch electrode lines 232 including the three second touch electrodes 228 adjacent to one another with respect to the Y-axis direction do not vary. Similar to the first embodiment, the second touch electrodes 228 included in the second touch electrode lines 232 are arranged such that each second touch electrode 228 and the adjacent second touch electrode 228 with respect to the arrangement direction thereof (the X-axis direction, the second direction) belong to the second touch electrode groups different from each other.

Figure 25:
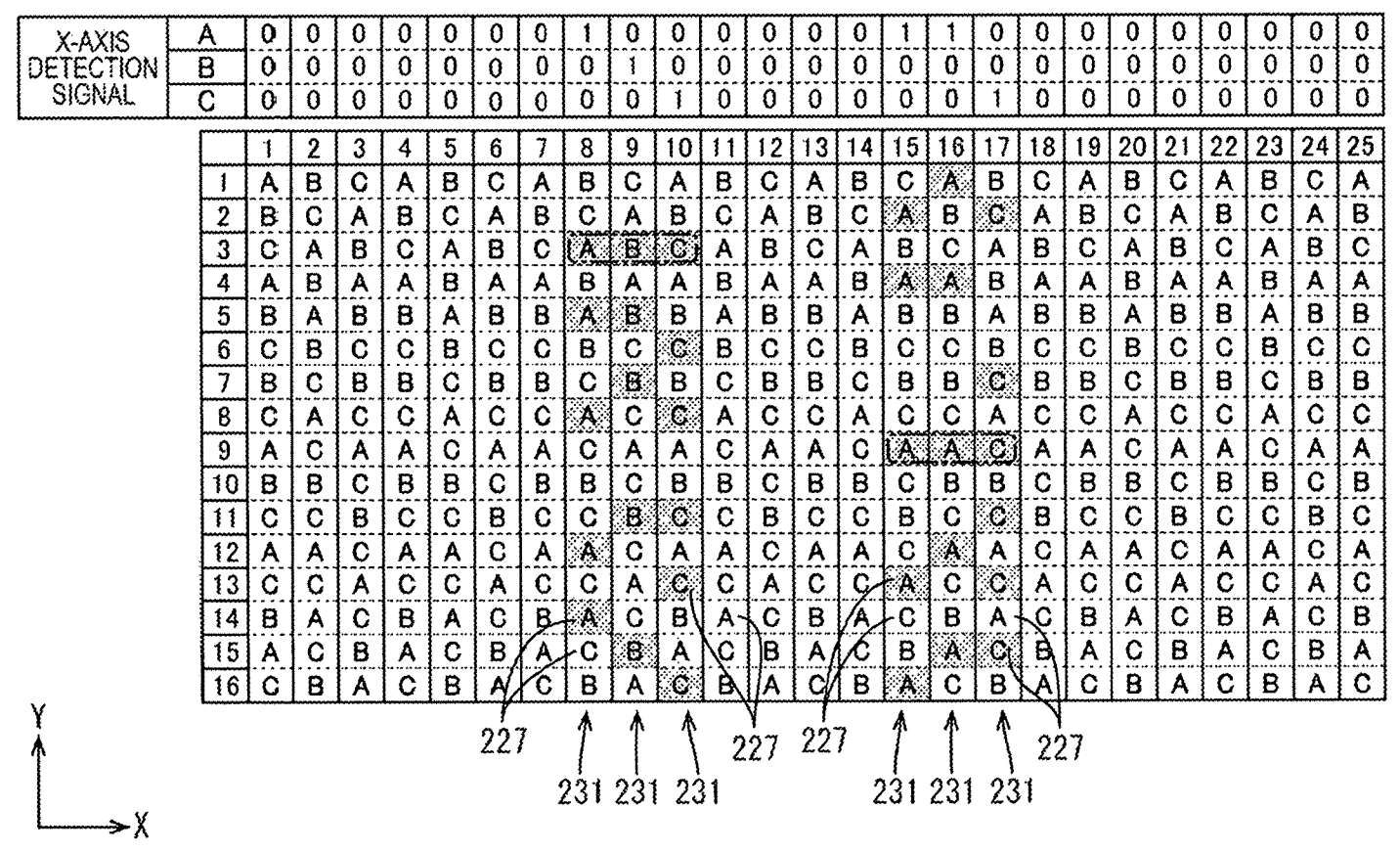

Functions will be described. This embodiment is considered for a situation in which the capacitances every three touch electrodes 227 and 228 adjacent to one another vary according to a touching operation of the user. Assume that the user has touched two points in the planes of the liquid crystal panel and the touchscreen around "position X9Y3" and around "position X16Y9" at about the same time, as illustrated in FIG. 25, the capacitances of the first touch electrodes 227 at "position X9Y3," at "position X8Y3" and "position X10Y3" adjacent to "position X9Y3" with respect to the X-axis direction, at "position X16Y9" and at "position X15Y9" and "position X17Y9" adjacent to "position X16Y9" with respect to the X-axis direction may vary.

The first touch electrode 227 at "position X9Y3" in the first touch electrode line 231 at "position X9" belongs to group B of the first touch electrode groups. All the capacitances of five first touch electrodes 227 in group B are detected with a single first trace to which the five first touch electrodes 227 are connected. The first touch electrode 227 at "position X8Y3" in the first touch electrode line 231 at "position X8" belongs to group A of the first touch electrode groups. All the capacitances of five first touch electrodes 227 in group A are detected with a single first trace to which the five first touch electrodes 227 are connected. The first touch electrode 227 at "position X10Y3" in the first touch electrode line 231 at "position X10" belongs to group C of the first touch electrode groups. All the capacitances of six first touch electrodes 227 in group C are detected with a single first trace to which the six first touch electrodes 227 are connected. Variations in capacitance of only the following combination of three first touch electrodes 227 among the first touch electrodes 227 in the first touch electrode lines 231 at "position X8," "position X9," and "position X10" adjacent to one another with respect to the X-axis direction are detected: a combination of the first touch electrode 227 at "position X8Y3" in the first touch electrode line 231 at "position X8" belonging to group A of the first touch electrode groups, the first touch electrode 227 at "position X9Y3" in the first touch electrode line 231 at "position X9" belonging to group B of the first touch electrode groups, and the first touch electrode 227 at "position X10Y3" in the first touch electrode line 231 at "position X10" belonging to group C of the first touch electrode groups.

The first touch electrode 227 at "position X16Y9" in the first touch electrode line 231 at "position X16" belongs to group A of the first touch electrode groups. All the capacitances of five first touch electrodes 227 in group AB are detected with the first trace to which the five first touch electrodes 227 are connected. The first touch electrode 227 at "position X15Y9" in the first touch electrode line 231 at "position X15" belongs to group A of the first touch electrode groups. All the capacitances of five first touch electrodes 227 in group A are detected with the first trace to which the five first touch electrodes 227 are connected. The first touch electrode 227 at "position X17Y9" in the first touch electrode line 231 at "position X17" belongs to group C of the first touch electrode groups. All the capacitances of five first touch electrodes 227 in group C are detected with the first trace to which the five first touch electrodes 227 are connected. Variations in capacitance of only the following combination of three first touch electrodes 227 among the first touch electrodes 227 in the first touch electrode lines 231 at "position X15," "position X16," and "position X17" adjacent to one another with respect to the X-axis direction are detected: a combination of the first touch electrode 227 at "position X15Y9" in the first touch electrode line 231 at "position X15" belonging to group A of the first touch electrode groups, the first touch electrode 227 at "position X16Y9" in the first touch electrode line 231 at "position X16" belonging to group A of the first touch electrode groups, and the first touch electrode 227 at "position X17Y9" in the first touch electrode line 231 at "position X17" belonging to group C of the first touch electrode groups. In FIG. 25, the first touch electrodes 227, the variations in capacitance of which are detected, are shaded. FIG. 25 further illustrates X-axis detection signals transmitted to three first traces associated with three first touch electrode groups in each first touch electrode line 231. "0" represents that the X-axis detection signal is not detected and "1" represents that the X-axis detection signal is detected.

Figure 26:
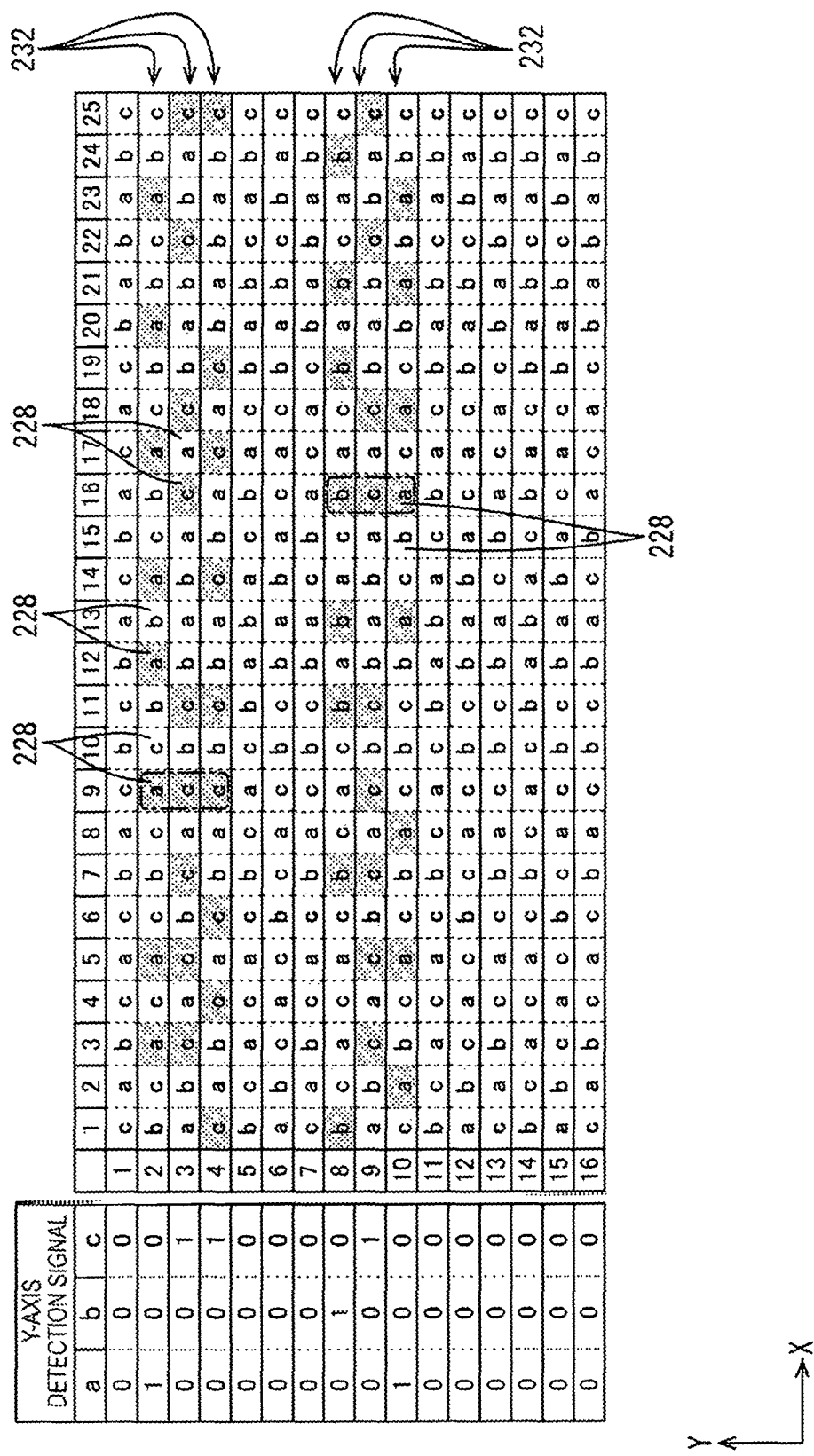
FIG. 26 is a table illustrating a condition that variations in capacitance of three second touch electrodes adjacent to one another in the Y-axis direction in response to a touching operation performed by the user are detected.

Next, the second touch electrodes 228 will be described. As illustrated in FIG. 26, the capacitances of the second electrodes 228 at "position X9Y3," "position X9Y3" and "position X9Y4" adjacent to "position X9Y3" with respect to the Y-axis direction, at "position X16Y9", and at "position X16Y8" and "position X6Y10" adjacent to "position X16Y9" with respect to the Y-axis direction vary. The second touch electrode 228 at "position X9Y3" in the second touch electrode line 232 at "position Y3" belongs to group c of the second touch electrode groups. All the capacitances of nine second touch electrodes 228 in group c are detected with the second trace to which the nine second touch electrodes 228 are connected. The second touch electrode 228 at "position X9Y2" in the second touch electrode line 232 at "position Y2" belongs to group a of the second touch electrode groups. All the capacitances of nine second touch electrodes 228 in group a are detected with the second trace to which the eight second touch electrodes 228 are connected. The second touch electrode 228 at "position X9Y4" in the second touch electrode line 232 at "position Y4" belongs to group c of the second touch electrode groups. All the capacitances of nine second touch electrodes 228 in group c are detected with the second trace to which the nine second touch electrodes 228 are connected. Variations in capacitance of only the following combination of three second touch electrodes 228 among the second touch electrodes 228 in the second touch electrode lines 232 at "position Y2," "position Y3," and "position Y4" adjacent to one another with respect to the Y-axis direction are detected: a combination of the second touch electrode 228 at "position X9Y2" in the second touch electrode line 232 at "position Y2" belonging to group a of the second touch electrode groups, the second touch electrode 228 at "position X9Y4" in the second touch electrode line 232 at "position Y4" belonging to group c of the second touch electrode groups, and the second touch electrode 228 at "position X9Y4" in the second touch electrode line 232 at "position Y4" belonging to group c of the second touch electrode groups.

The second touch electrode 228 at "position X16Y9" in the second touch electrode line 232 at "position Y9" belongs to group c of the second touch electrode groups. All the capacitances of nine second touch electrodes 228 in group c are detected with the second trace to which the nine second touch electrodes 228 are connected. The second touch electrode 228 at "position X16Y8" in the second touch electrode line 232 at "position Y8" belongs to group b of the second touch electrode groups. All the capacitances of eight second touch electrodes 228 in group b are detected with the second trace to which the eight second touch electrodes 228 are connected. The second touch electrode 228 at "position X16Y10" in the second touch electrode line 232 at "position Y10" belongs to group a of the second touch electrode groups. All the capacitances of eight second touch electrodes 228 in group a are detected with the second trace to which the eight second touch electrodes 228 are connected. Variations in capacitance of only the following combination of three second touch electrodes 228 among the second touch electrodes 228 in the second touch electrode lines 232 at "position Y8," "position Y9," and "position Y10" adjacent to one another with respect to the Y-axis direction are detected: a combination of the second touch electrode 228 at "position X13Y8" in the second touch electrode line 232 at "position Y8" belonging to group b of the second touch electrode groups, the second touch electrode 228 at "position X16Y9" in the second touch electrode line 232 at "position Y9" belonging to group c of the second touch electrode groups, and the second touch electrode 228 at "position X16Y10" in the second touch electrode line 232 at "position Y10" belonging to group a of the second touch electrode groups. In FIG. 26, the second touch electrodes 228, the variations in capacitance of which are detected, are shaded. FIG. 26 further illustrates Y-axis detection signals transmitted to five second traces associated with four second touch electrode groups in each second touch electrode line 232. "0" represents that the Y-axis detection signal is not detected and "1" represents that the Y-axis detection signal is detected.

Figure 27:
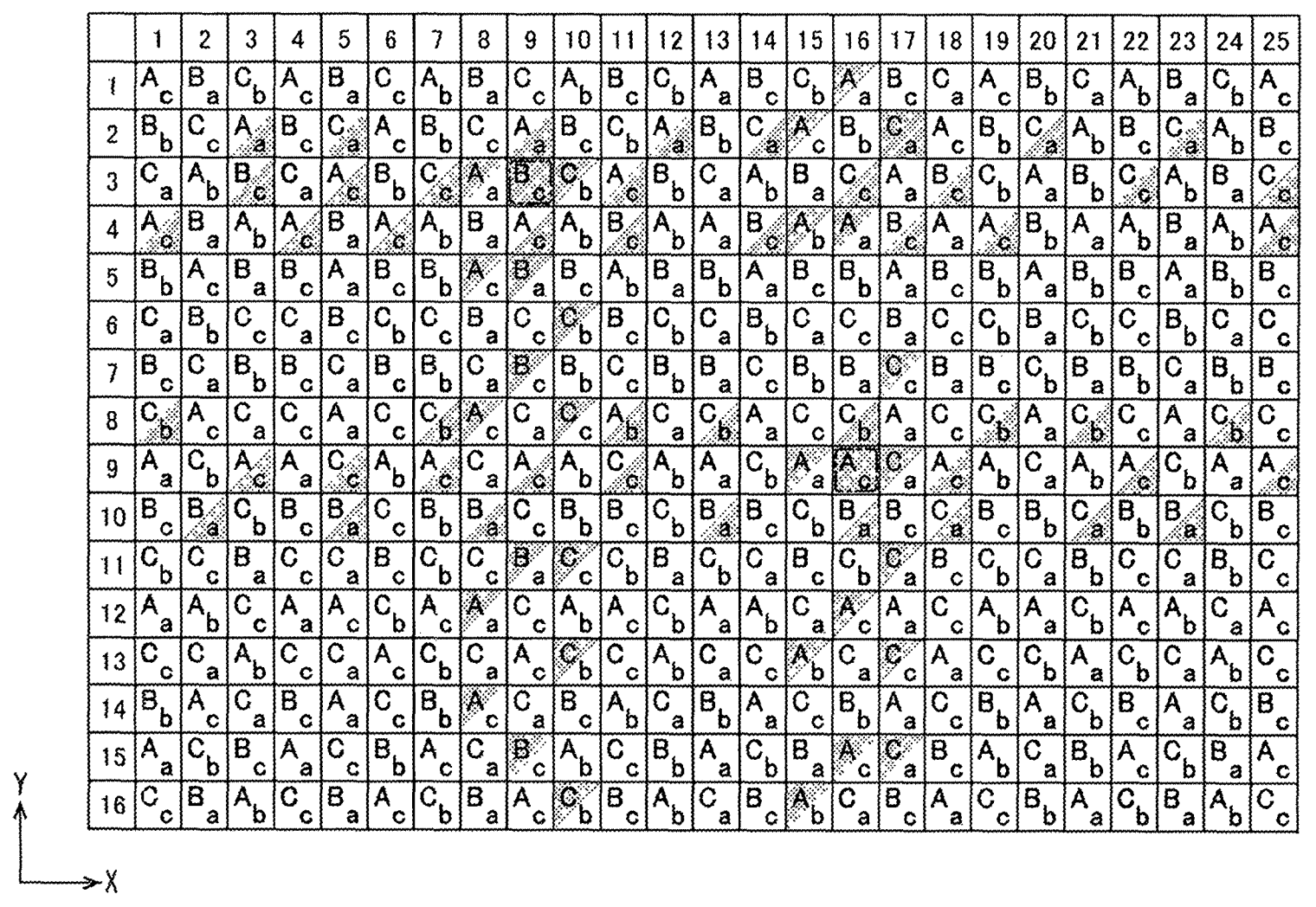

A table created by combining FIGS. 25 and 26 is illustrated in FIG. 27. In FIG. 27, the letters A to D and a to e are placed in the cells in pairs. The first touch electrode 227 and the second touch electrode 228 belonging to the groups represented by the letters in each cell are at the same position (expressed by the same X and Y coordinates). If a variation in capacitance of only one of the first touch electrode 227 and the second touch electrode 228 in the same cell is detected, a triangular area of the cell is shaded. If variations in capacitance of both touch electrodes 227 and 228 are detected, the square area of the cell is shaded. FIG. 27 illustrates that variations in capacitance of both first touch electrode 227 and second touch electrode 228 at the same position are detected at a total of three positions: "position X9Y3;" "position X17Y2;" and "position X16Y9." Two positions out of the three positions are actually touched positions and the other one of the three positions is a ghost position. The capacitances of three first touch electrodes 227 adjacent to one another with respect to the X-axis direction vary at actually touched positions. Whether variations in capacitance of three first touch electrodes 227 adjacent to one another with respect to the X-axis direction and the second touch electrodes 228 adjacent to one another with respect to the Y-axis direction are detected will be examined for the three positions. At "position X17Y2," the variations in capacitance of the first touch electrodes 227 adjacent with respect to the X-axis direction and the second touch electrodes 228 adjacent with respect to the Y-axis direction were not detected. Therefore, it is determined that this position is a ghost position. At "Position X9Y3" and "position X16Y9," the variations in capacitance of the first touch electrodes 227 adjacent with respect to the X-axis direction and the second touch electrodes 228 with respect to the Y-axis direction were detected. Therefore, it is determined that these two positions are the actually touched positions. Through the determinations, the ghost positions are excluded and the actually touched positions are properly detected. In FIG. 27, the actually touched positions are indicated with chain lines.

As described above, among combinations of the first touch electrodes 227 each including at least three first touch electrodes 227 that are adjacent to one another with respect to the second direction in the first touch electrode lines 231 according to this embodiment, the combination of the first touch electrode groups to which the first touch electrodes 227 belong is different from the combination of the first touch electrode groups to which other first touch electrodes 227 belong within an area of at least 20 cm with respect to the first direction. Among combinations of the second touch electrodes 228 each including at least three second touch electrodes 228 that are adjacent to one another with respect to the first direction in the second touch electrode lines 232, the combination of the second touch electrode groups to which the second touch electrodes 228 belong is different from the combination of the second touch electrode groups to which other second touch electrodes 228 belong within an area of at least 20 cm with respect to the second direction. When the user inputs the positions, the capacitances of the first touch electrode 227 at the actual input position and the adjacent first touch electrodes 227 sandwiching the first touch electrode 227 with respect to the second direction vary. Furthermore, the capacitances of the second touch electrode 228 at the actual input position and the adjacent second touch electrodes 228 sandwiching the second touch electrode 228 with respect to the first direction vary. When the user spreads the fingers of one hand, a range within reach of two fingers of the user is about 20 cm or smaller. According to the above configuration, as long as the user input positions with the fingers of one hand, variations in capacitance are detected only in the following two combinations: a combination of the first touch electrode groups in at least three first touch electrode lines 231 adjacent to one another; and a combination of the second touch electrode groups in at least three second touch electrode lines 232 adjacent to one another. Therefore, the ghost positions are further properly excluded and thus the actually touched positions are properly detected.

Among the combinations of the first touch electrodes 227 each including at least three first touch electrodes 227 adjacent to one another with respect to the second direction in the first touch electrode lines 231, the combination of the first touch electrode groups to which the first touch electrodes 227 belong, respectively, is different from the combination of the first touch electrode groups to which other first touch electrodes 227 belong, respectively. Among the combinations of the second touch electrodes 228 each including at least three second touch electrodes 228 adjacent to one another with respect to the first direction in the second touch electrode lines 232, the combination of the second touch electrode groups to which the second touch electrodes 228 belong, respectively, is different from the combination of the second touch electrode groups to which other second touch electrodes 228 belong, respectively. When the user inputs the positions, the capacitances of the first touch electrodes 227 at the actual input position and at least two adjacent first touch electrodes 227 sandwiching the first touch electrode 27 with respect to the second direction vary. Furthermore, the capacitances of the second touch electrodes 228 at the actual input position and at least two adjacent second touch electrodes 228 sandwiching the second touch electrode 228 with respect to the first direction vary. Variations in capacitance are detected only in the following two combinations: a combination of the first touch electrode groups in at least three first touch electrode lines 31 adjacent to one another; and a combination of the second touch electrode groups in at least three second touch electrode lines 232 adjacent to one another. Therefore, the ghost positions are further properly excluded and thus the actually touched positions are properly detected. To make all the combinations of the touch electrode groups different, the number of the first touch electrode groups may be set equal to or larger than the cubic root of the lines of the first touch electrodes 227 arranged along the first direction and the number of the second touch electrode groups may be set equal to or larger than the cubic root of the lines of the second touch electrodes 228 arranged along the second direction. It is suitable for reducing the number of the touch electrode groups and the number of the traces.

<Fourth Embodiment>

Figure 28:
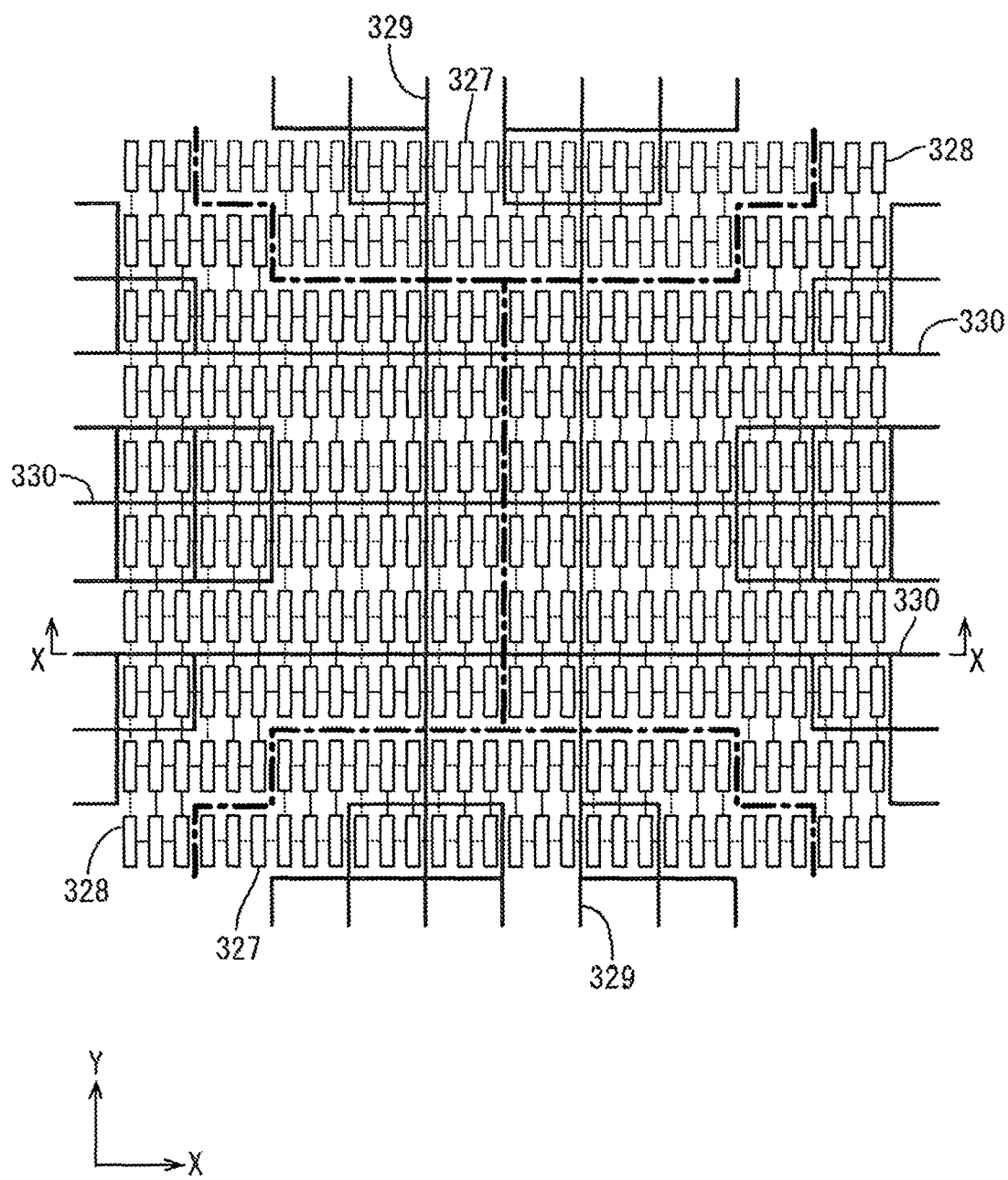
FIG. 28 is a magnified plan view illustrating some of touch electrodes in a touchscreen pattern and portions of some of traces according to a fourth embodiment of the present invention.

A fourth embodiment will be described with reference to FIGS. 28 and 29. The fourth embodiment includes first traces 329 and second traces 330 formed from metal films different from those of the second embodiment. Configurations, functions, and effects similar to those of the second embodiment or the second embodiment will not be described.

Figure 29:
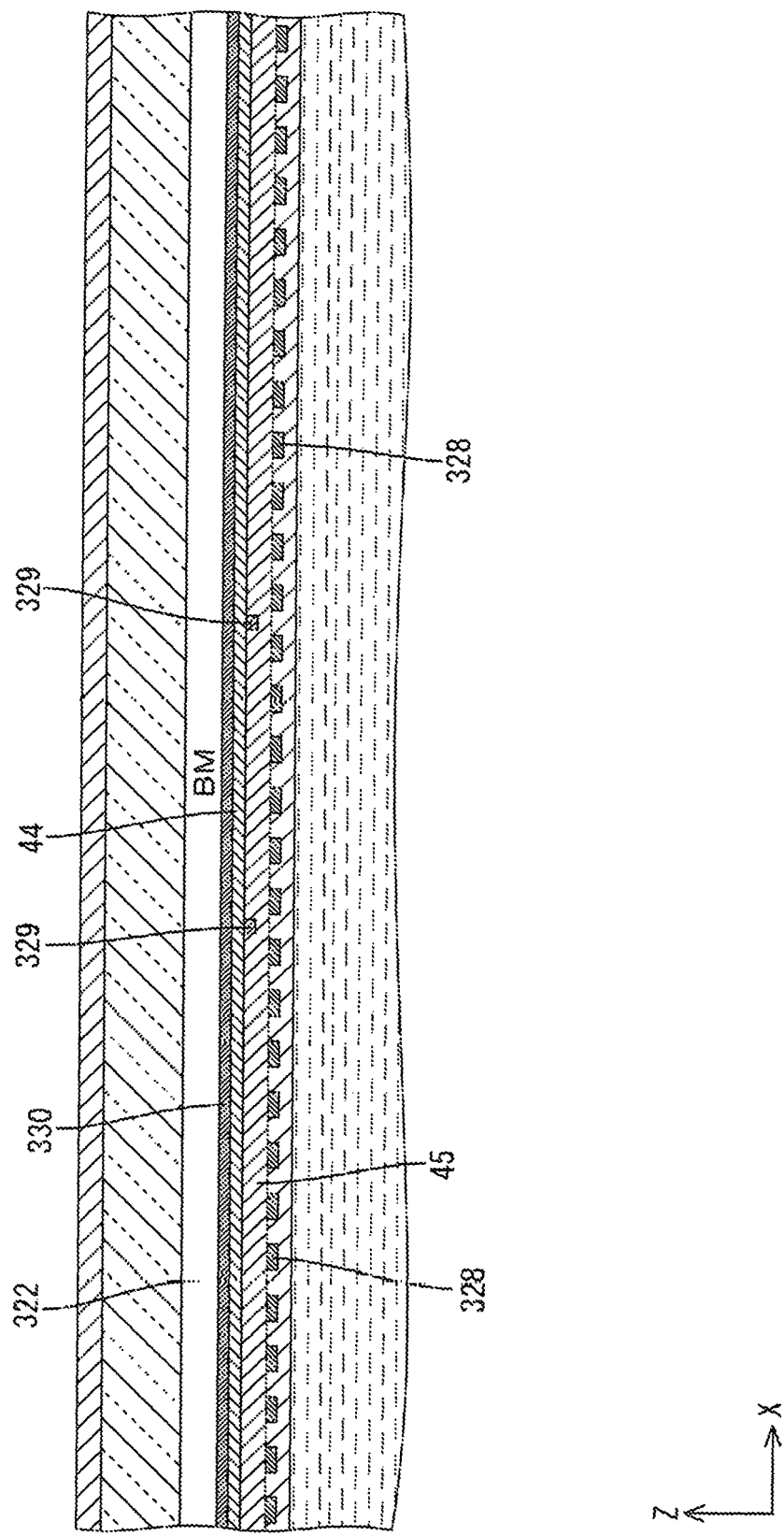
FIG. 29 is a cross-sectional view along line X-X in FIG. 29.

As illustrated in FIG. 29, the first traces 329 and the second traces 330 are formed from the metal films that are different from each other. The metal film that forms the first traces 329 is in an upper layer and the metal film that forms the second traces 330 is in a lower layer. Specifically, the metal film that forms the second traces 330 is layered on a light blocking layer 322 on the upper layer side. A first insulating film 44 is formed in a solid pattern between the metal film that forms the second traces 330 and the metal film that forms the first traces 329. The metal film that forms the first traces 329 is layered on the first insulating film 44 on the upper layer side. A second insulating film 45 is formed in a solid pattern to be layered on the metal film that forms the first traces 329 on the upper layer side. In this embodiment, the first traces 329 and the second traces 330 that cross one another are insulated by the first insulating film 44. Therefore, it is not required to divide the second traces into segment second traces that are described in the second embodiment section. As illustrated in FIG. 28, the second traces 330 in this embodiment extend for entire lengths thereof without breaks along the X-axis direction. Furthermore, a transparent electrode film that forms touch electrodes 327 and 328 is not used for a bypass in a path of the second traces 330. Therefore, it is not necessary to form the contact holes 36 in the first insulating film 44 in this embodiment, which are required in the second embodiment. Furthermore, the transparent electrode film in this embodiment does not require the floating-island trace-crossing portions described in the second embodiment section. Therefore, about an enter area of the transparent electrode film can be used for the touch electrodes 327 and 328.

<Fifth Embodiment>

A fifth embodiment will be described with reference to FIGS. 30 and 31. The fifth embodiment does not include the second touch electrodes and the second traces that are included in the first embodiment. The fifth embodiment includes a touchscreen pattern 412P including first touch electrodes 427 and first traces. Configurations, functions, and effects similar to those of the first embodiment will not be described.

As illustrated in FIG. 30, a touch panel flexible circuit board 426 is connected to only a long edge portion of a touchscreen 412 according to this embodiment. The touch panel flexible circuit board 426 is for transmitting signals to the first touch electrodes 427 and the first traces (not illustrated) of the touchscreen pattern 412P. As illustrated in FIG. 41, the touchscreen pattern 412P include the first touch electrodes 427 and the first traces but not include the second touch electrodes and the second traces that are included in the first embodiment.

As illustrated in FIG. 31, the first touch electrodes 427 included in first touch electrode lines 431 are arranged such that a combination of first touch electrode groups 433 to which the first touch electrodes 427 adjacent to each other with respect to the arrangement direction of the first touch electrode lines 431 (the X-axis direction, the second direction) belong, respectively, is different from a combination of first touch electrode groups 433 to which other first touch electrodes 427 adjacent to each other with respect to the arrangement direction of the first touch electrode lines 431 belong, respectively. All pairs are configured in the same manner. If capacitances of two first touch electrodes 427 adjacent to each other with respect to the X-axis direction vary in response to a touching operation of the user, it is assumed that capacitances of other first touch electrodes 427 in two first touch electrode lines 431 including the first touch electrodes 427 having the varied capacitances do not vary. Therefore, by detecting the variations in capacitance of the first touch electrodes 427 adjacent to each other with respect to the X-axis direction, an X-axis position and a Y-axis position of the touched position are specified. By determining two first touch electrode lines 431 including the detected first touch electrodes 427, the X-axis position is specified. By determining the Y-axis positions of the detected first touch electrodes 427 in the first touch electrode lines 431, the Y-axis position is specified. Even if the user touches two positions at about the same time, the actually touched position can be properly detected by excluding ghost positions similarly to the first embodiment (see FIGS. 14 to 16).

As described above, the touchscreen 412 according to this embodiment includes the first touch electrodes 427 (electrodes), the first touch electrode lines 431 (electrode lines), the first touch electrode groups 433 (electrode groups), and the first traces (traces). The first touch electrode lines 431 include the first touch electrodes 427 arranged along the first direction. The first touch electrode lines 431 are arranged along the second direction perpendicular to the first direction. The first touch electrodes 427 belong to the first touch electrode groups 433. The same number of the first traces as the number of the first touch electrode groups 433 is provided with respect to each first touch electrode line 431. The first traces are connected to the first touch electrodes 427 grouped into the first touch electrode groups 433 for applying electrical potentials to the respective groups of the first touch electrodes 433.

According to the configuration, when the user inputs a position, a capacitance of the first touch electrode 427 at the input position varies. By detecting the variation in the capacitance, the input position with respect to the first direction and the second direction is determined. The first touch electrodes 427 in each first touch electrode line 431 are grouped into the first touch electrode groups 433 each including multiple first touch electrodes 427. If the capacitance of the first touch electrode 427 at the actual input position varies, variations in capacitances of other first touch electrodes 427 in the first touch electrode group 433 to which the first touch electrode 427 having the varied capacitance belongs in the first touch electrode line 431 including the first touch electrode 427 having the varied capacitance are detected. The capacitance of the first touch electrode 427 adjacent to the first touch electrode 427 at the actual input position with respect to the second direction varies. Variations in capacitance of other first touch electrodes 427 belonging to the same first touch electrode group 433 in the first touch electrode line 431 including the first touch electrode 427 adjacent to the first touch electrode 427 at the actual input position with respect to the second direction are detected. Therefore, the first touch electrode 427 at the actual input position is properly detected based on a combination of the first touch electrode groups 433 having the varied capacitances in the adjacent first touch electrode lines 431.

If the user inputs multiple positions at the same time, a ghost position that is not an actual input position may be detected with the known self-capacitance method. As described above, the first touch electrodes 427 in each first touch electrode line 431 are grouped into the first touch electrode groups 433. Furthermore, the electrical potentials are applied to the respective first touch electrode groups 433 via the first traces connected to the first touch electrodes 427. According to the configuration, the actual input position is properly detected. It is not necessary to scan the first touch electrodes 427, which is required in the know mutual-capacitance method. Therefore, the detection can be performed for a longer period and thus high detection sensitivity is achieved.

The number of the first traces that are electrically independent from one another and provided with respect to each first touch electrode line 431 is equal to the number of the first touch electrode groups 433 in the first touch electrode line 431. According to the configuration, the first traces are assigned to the first touch electrode groups 433, respectively, in each first touch electrode line 431. The first traces are connected to the first touch electrodes 427 in the respective first touch electrode groups 433, respectively. In comparison to a configuration in which several first traces are assigned to each first touch electrode group 433 in each first touch electrode line 431, a percentage of the capacitance related to the first touch electrodes 427 in the first touch electrode group 433 in the capacitance related to the first traces is higher. Therefore, further higher detection sensitivity can be achieved.

<Other Embodiments>

The present invention is not limited to the embodiments, which have been described using the foregoing descriptions and the drawings. The following embodiments may be included in the technical scope of the present invention.

(1) A modification of the above embodiments may include one first trace connected to all first touch electrodes in each first touch electrode line to apply a common electrical potential to the first touch electrodes. By detecting the first touch electrode line including the first touch electrode having a varied capacitance, the touch position with respect to the X-axis direction can be specified. The touch position with respect to the Y-axis direction can be specified by detecting a second touch electrode having a varied capacitance.

(2) Contrary to (1), one second trace may be connected to all second touch electrodes in each second touch electrode line to apply a common electrical potential to the second touch electrodes. By detecting the second touch electrode line including the second touch electrode having a varied capacitance, the touch position with respect to the Y-axis direction can be specified. The touch position with respect to the X-axis direction can be specified by detecting the first touch electrode having a varied capacitance.

(3) The first embodiment section describes that the variations in capacitance of four touch electrodes including two touch electrodes adjacent to each other with respect to the X-axis direction and two touch electrodes adjacent to each other with respect to the Y-axis direction. The first embodiment section further describes that the variation in capacitance of two touch electrodes adjacent to each other with respect to the X-axis direction or the Y-axis direction. However, even if variations occur in capacitance of nine touch electrodes including three touch electrodes adjacent to one another with respect to the X-axis direction and of three touch electrodes adjacent to one another with respect to the Y-axis direction or three or more touch electrodes adjacent to one another with respect to the X-axis direction or the Y-axis direction according to touching operations of the user, actually touched positions can still be properly detected by excluding ghost positions.

(4) The third embodiment section describes that the variations in capacitance of three touch electrodes adjacent to one another with respect to the X-axis direction or the Y-axis direction. However, even if variations occur in capacitance of nine touch electrodes including three touch electrodes adjacent to one another with respect to the X-axis direction and of four or more touch electrodes adjacent to one another with respect to the X-axis direction or the Y-axis direction according to touching operations of the user, actually touched positions can still be properly detected by excluding ghost positions.

(5) The number of touch electrode groups in (3) or (4), may be altered to the fourth root of the number of the touch electrodes included in each electrode line or larger for a configuration in which capacitances of four or more touch electrodes adjacent to one another with respect to the X-axis direction or the Y-axis direction vary.

(6) In each of the above embodiments (especially the first and the third embodiments), the number of the touch electrode groups is equal to the square root of the number of the touch electrodes included in each touch electrode line or larger than the cubic root of the number of the touch electrodes included in each touch electrode line. However, the number of the touch electrode groups may be equal to the cubic root of the touch electrodes included in each touch electrode line. Furthermore, the number of the touch electrode groups may be larger than the square root but smaller than the cubic root of the touch electrodes included in each touch electrode line.

(7) In each of the above embodiments (especially the first and the third embodiments), the number of the touch electrode groups is equal to the square root of the number of the touch electrodes included in each touch electrode line or larger than the cubic root of the number of the touch electrodes included in each touch electrode line. However, the number of the touch electrode groups may be smaller than the square root of the touch electrodes included in each touch electrode line. In this case, the combinations of the groups to which the adjacent touch electrodes in the adjacent touch electrode lines belong may include the same combinations. The combination of the touch electrodes may be arranged sufficiently farther from the same combination of the touch electrodes outside an area in which fingers of the user can reach. According to the configuration, even if variations occur in capacitance of the touch electrodes in both combinations, any of the electrodes may be defined as a ghost and excluded with software.

(8) In each of the above embodiments, the number of the touch electrode groups is equal to the number of traces connected to the touch electrodes included in the touch electrode groups. However, the number of the traces connected to the touch electrodes included in the touch electrode groups may be larger than the number of the touch electrode groups. Namely, multiple traces that are electrically independent from one another may be provided with respect to one touch electrode group and connected to the touch electrodes in the touch electrode group to apply a common electrical potential to the touch electrodes. Furthermore, multiple traces may be connected to multiple touch electrodes and electrically connected to one another for redundancy. Connection of traces may be established such that main traces that extend for entire lengths of the traces are connected with traces arranged therebetween to form a ladder pattern. Alternatively, branches may extend from the main traces.

(9) A modification of the first embodiment may include a metal film layered on the transparent electrode film and may not include the insulating film between the metal film and the transparent electrode film. The metal film may be directly connected to the transparent electrode film to reduce the wiring resistance. It is preferable to form the layered metal film a mesh pattern to maintain the aperture ratio.

(10) The first embodiment and the second embodiment may be combined to provide the traces formed from the metal film and included in the touchscreen pattern of the touchscreen. Furthermore, the insulating film and the metal film may be layered in this sequence over the transparent electrode film formed on a touchscreen board.

(11) In each of the second embodiment and the fourth embodiment, the touchscreen pattern is formed on the CF board included in the liquid crystal panel. However, the touchscreen pattern may be formed on the array board. In this case, the transfer pad is not required to transmit signals to the touchscreen pattern.

(12) In the second embodiment, the first traces extend along the Y-axis direction without breaks and the second traces are divided at points in the extending direction thereof (the X-axis direction) into the segment second traces. However, the second traces may extend along the X-axis direction without breaks and the first traces may be divided at points in the extending direction thereof (the Y-axis direction) into segment first traces. In this case, spaces may be provided between the second touch electrodes adjacent to one another with respect to the X-axis direction and the first touch electrodes may include electrode-side trace-crossing portions to cross the second traces. The segment first traces may be connected to the electrode-side trace-crossing portions via the contact holes.

(13) In each of the second embodiment and the fourth embodiment, the positions between the adjacent touch electrodes correspond to the positions between the adjacent pixel electrodes. However, the present invention may be applied to a configuration in which positions between the adjacent touch electrodes do not correspond to positions between the adjacent pixel electrodes.

(14) In each of the second embodiment and the fourth embodiment, the positions between the adjacent segment touch electrodes correspond to the positions between the adjacent pixel electrodes. However, the present invention may be applied to a configuration in which positions between the adjacent segment touch electrodes do not correspond to positions between the adjacent pixel electrodes.

(15) In each of the second embodiment and the fourth embodiment, each segment touch electrode has the area across three pixel electrodes. However, the present invention may be applied to a configuration in which each segment touch electrode may have an area across two pixel electrodes or an area across four or more pixel electrodes. Alternatively, each segment touch electrode may have an area covering a single pixel electrode.

(16) In each of the second embodiment and the fourth embodiment, each segment touch electrode is arranged to cover three unit pixels included in the display pixel. However, the present invention may be applied to a configuration in which each segment touch electrode is arranged to cover three unit pixels included in different display pixels.

(17) In each of the second embodiment and the fourth embodiment, the links that connect the adjacent segment touch electrodes are located between the adjacent pixel electrodes. However, the present invention can be applied to a configuration in which the links are arranged to overlap the pixel electrodes. The contact holes may be arranged to overlap the pixel electrodes. Furthermore, portions of the traces may be arranged to overlap the pixel electrodes.

(18) In the second embodiment, the touchscreen pattern formed inside the liquid crystal panel is similar to the touchscreen pattern of the first embodiment. However, the touchscreen pattern formed inside the liquid crystal panel can be altered as appropriate. In this case, the touchscreen pattern may be a mutual-capacitance touchscreen pattern.

(19) The configurations of the third embodiment may be combined with the configurations of the second embodiment or the fourth embodiment.

(20) The fifth embodiment has the configurations of the first embodiment except for the second touch electrodes and the second traces that are omitted. The touchscreen pattern of the fifth embodiment includes the first touch electrode and the first traces. However, the touchscreen pattern may not include the first touch electrodes and the first traces and may include the second touch electrodes and the second traces.

(21) The configurations of the fifth embodiment may be combined with the configurations of the second embodiment or the fourth embodiment.

(22) In each of the above embodiments, the first traces extend along the Y-axis direction and the second traces extend along the X-axis direction. However, the first traces may extend along the X-axis direction and the second traces may extend along the Y-axis direction.

(23) Other than the above embodiments, a cover panel (a protective panel) may be provided to cover the touchscreen or the liquid crystal panel. The cover panel may be disposed opposite the touchscreen or the liquid crystal panel on the outer side. Preferably, the cover panel is made of material having high impact resistance such as tempered glass.

(24) The substrate of the touchscreen in the first embodiment is made of glass. Other than the glass substrate, a substrate made of synthetic resin may be used. Alternatively, the substrate of the touchscreen may be made of tempered glass.

(25) The touchscreen in the first embodiment has the horizontally-long rectangular shape. However, the touchscreen may have a vertically-long rectangular shape or a square shape.

(26) In the first embodiment, the touchscreen is layered on the liquid crystal panel. However, the touchscreen may be disposed not to overlap the liquid crystal panel in a plan view. For example, the present invention may be applied to a touchpad (a position inputting device) for a notebook personal computer, which is disposed not to overlap a liquid crystal panel.

(27) In each of the above embodiment, the pixel electrodes are formed on the array board of the liquid crystal panel and the common electrode is formed on the CF board. The pixel electrodes and the common electrode are arranged to overlap each other with the liquid crystal layer therebetween (preferably a liquid crystal panel with a VA mode). However, the pixel electrodes and the common electrode may be formed on the array board and an insulating film may be disposed between the pixel electrodes and the common electrode that overlap each other. Such a liquid crystal panel operates preferably in fringe field switching (FFS) mode.

(25) In each of the above embodiments, the color configuration of the color filters of the liquid crystal panel includes three colors: red, green, and blue. However, the present invention may be applied to color filters having configurations including four colors. The color filters may include yellow color portions in addition to the red color portions, the green color portions, and the blue color portions. The color filters may include color portions other than the yellow color portions in addition to red, green, and blue. Alternatively, light transmissive portions that do not have wavelength selecting properties and thus transmit all light rays in the visible wavelength range may be added to red, green, and blue.

(29) Each of the above embodiments illustrates the light transmissive liquid crystal display device including the backlight unit. However, the present invention may be applied to a light reflective liquid crystal display device using ambient light. In this case, the backlight unit is not required. Other than that, the present invention may be applied to a semi light transmissive liquid crystal display device.

(30) Each of the above embodiments includes the TFTs used for the switching components of the liquid crystal display device. However, the present invention may be applied to a liquid crystal display device including switching components other than the TFTs (e.g., thin film diodes (TFDs)). The present invention may be applied to a liquid crystal display device configured to display color images or a liquid crystal display device configured to display black-and-white images.

(31) Each of the above embodiments includes the liquid crystal display device including a liquid crystal panel as a display panel. However, the present invention may be applied to a display device including other types of display panel (e.g., plasma display panel (PDP), organic EL panel, cathode ray tube (CRT)). In this case, the backlight unit is not required.

(32) Each of the above embodiments includes the liquid crystal display device including a liquid crystal panel as a display panel. However, a micro electromechanical systems (MEMS) display panel configured to display images using light from a backlight unit may be used. The MEMS display panel includes fine mechanical shutters two-dimensionally arranged in a matrix. The fine mechanical shutters are included in display pixels. Opening and closing of the mechanical shutters are individually controlled. According to the configuration, an amount of transmitting light from the backlight unit is adjustable for each display pixel and thus images with specified tones can be displayed.

(33) The above embodiments are examples that the present invention is applied to the electronic devices such as notebook personal computers (including tablet personal computers) and desktop personal computers. However, the present invention may be applied to small electronic devices such as smartphones, onboard information terminal (e.g., portable car navigation systems), and portable video game players. Furthermore, the present invention may be applied to large electronic devices such as television devices for displaying broadcasting images and interactive whiteboards.

(34) In the first embodiment, the combination of the first touch electrode groups to which the first touch electrode adjacent to each other with respect to the second direction is different from combinations of all other first touch electrodes. Furthermore, the combination of the second touch electrode groups to which the second touch electrode adjacent to each other with respect to the first direction is different from combinations of all other second touch electrodes. However, some of the combinations the first touch electrode groups to which the first touch electrode adjacent to each other with respect to the second direction may be the same. Furthermore, some of the combinations the second touch electrode groups to which the second touch electrode adjacent to each other with respect to the first direction may be the same. Even in such a case, it is preferable that a distance between the same combinations of the touch electrodes is 20 cm or larger. According to such an arrangement, a ghost can be properly excluded as long as the user input positions with a single hand. The distance between the same combinations can be smaller than 20 cm.

(35) In the second embodiment, the contact holes are arranged between the color portions in specific color, that is, between the red color portions. However, the contact holes may be arranged between the blue color portions or the green color portions. Alternatively, the contact holes may not be arranged between color portions and may be randomly arranged.

(36) In the second embodiment, the contact holes are arranged between the blue color portions and the red color portions. However, the contact holes may be arranged between the blue color portions and the green color portions or between the green color portions and the red color portions.

(37) Each embodiment section describes that exclusion of ghosts using consecutiveness of signals with reference to signals at the adjacent touch electrodes. However, chronological consecutiveness may be used. If the user slides his or her finger from the input position, detected position coordinates continuously change at the actually touched position but signal variations are not chronologically continuous at the ghost position. Using such characteristics, the coordinates of the ghost position can be excluded. Furthermore, the method in which the signals at the adjacent touch electrodes are referred and the method in which the chronological consecutiveness is used described in the above embodiment sections may be used in combination for reducing erroneous detection and improving detection accuracy.

(38) In each of the above embodiment, the pixel electrodes are formed on the array board of the liquid crystal panel and the common electrode is formed on the CF board. The pixel electrodes and the common electrode are arranged to overlap each other with the liquid crystal layer therebetween (preferably a liquid crystal panel with a VA mode). However, a liquid crystal panel including pixel electrodes on an array board without a common electrode may be used. Such a liquid crystal panel operates preferably in in plane switching (IPS) mode. In such a liquid crystal panel that operates in IPS mode, a transparent electrode film is formed on the CF board and touch electrodes are formed from the transparent electrode film. Namely, the touch electrodes do not share the transparent electrode film with the common electrode. The transparent electrode film is provided exclusively for the touch electrodes.

EXPLANATION OF SYMBOLS

10, 110: liquid crystal display device (display device including position inputting function), 11, 111: liquid crystal panel (display panel), 12, 412: touchscreen (position inputting device), 18, 118: pixel electrode (display electrode), 21, 121: color filter, 21R, 21G, 21B, 121R, 121G 121B: color portion, 22, 122: light blocking layer (light blocking portion), 23, 123: common electrode (display electrode), 24, 124: display pixel, 24R, 24G, 24B, 124R, 124G 124B: unit pixel, 27, 127, 227, 327, 427: first touch electrode (first electrode, electrode, position inputting electrode, first position inputting electrode), 28, 128, 228, 328: second touch electrode (second electrode, electrode, position inputting electrode, second position inputting electrode), 29, 129, 329: first trace (trace), 30, 130, 330: second trace (trace), 31, 131, 231, 431: first touch electrode line (first electrode line, electrode line), 32, 132, 232: second touch electrode line (second electrode line, electrode line), 33, 133, 433: first touch electrode group (first electrode group, electrode group), 34, 134: second touch electrode group (second electrode group, electrode group), 35: insulating film, 36: contact hole, 37: first segment touch electrode (segment position inputting electrode), 38: second segment touch electrode (segment position inputting electrode), 39: first link (link), 40: second link (link), 41: electrode-side trace-crossing portion (trace-crossing portion), 43: segment second trace, 46: first contact hole, 47: second contact hole

The invention claimed is:

1. A position inputting device comprising:
a plurality of first electrodes;
a plurality of first electrode lines comprising the plurality of first electrodes arranged along a first direction, the first electrode lines being arranged along a second direction perpendicular to the first direction;
a plurality of first electrode groups each including a plurality of the first electrodes included in the first electrode lines;
a plurality of first traces for connecting the first electrodes belonging to the first electrode groups per first electrode line, each of the first traces being connected to the plurality of the first electrodes belonging to the corresponding first electrode group to apply an electrical potential to the plurality of the first electrodes per first electrode group;
a plurality of second electrodes;
a plurality of second electrode lines including the plurality of second electrodes arranged along the second direction, the plurality of second electrode lines being arranged along the first direction;
a plurality of second electrode groups each including a plurality of the second electrodes included in the second electrode lines;
a plurality of second traces for connecting the second electrodes belonging to the second electrode groups per second electrode line, each of the second traces being connected to the plurality of the second electrodes belonging to the corresponding second electrode group to apply an electrical potential to the plurality of the second electrodes per second electrode group; and
a first pattern including one of the first electrode lines and the first traces each connected to the first electrodes included in one of the first electrode groups, and
a second pattern including one of the second electrode lines and the second traces each connected to the second electrodes included in one of the second electrode groups.

2. The position inputting device according to claim 1, wherein
a number of the first traces electrically independent from one another for connecting the first electrodes included in a signal first electrode line is equal to a number of the first electrode groups, and
a number of the second traces electrically independent from one another for connecting the second electrodes included in a signal second electrode line is equal to a number of the second electrode groups.

3. The position inputting device according to claim 1, wherein
each of the first electrode lines is configured such that the first electrodes adjacent to one another with respect to the first direction belong to the first electrode groups that are different from one another, and
each of the second electrode lines is configured such that the second electrodes adjacent to one another with respect to the second direction belong to the second electrode groups that are different from one another.

4. The position inputting device according to claim 1, wherein the plurality of the first electrode lines are configured that combinations of the first electrode groups to which the first electrodes adjacent to one another with respect to the second direction belong are different from one another within a range of at least 20 cm with respect to the first direction, and the plurality of the second electrode lines are configured that combinations of the second electrode groups to which the second electrodes adjacent to one another with respect to the first direction belong are different from one another within a range of at least 20 cm with respect to the second direction.

5. The position inputting device according to claim 1, wherein the plurality of the first electrode lines are configured that combinations of the first electrode groups to which the first electrodes adjacent to one another with respect to the second direction belong are all different from one another, and the plurality of the second electrode lines are configured that combinations of the second electrode groups to which the second electrodes adjacent to one another with respect to the first direction belong are all different from one another.

6. The position inputting device according to claim 1, wherein the plurality of the first electrode lines are configured that combinations of the first electrode groups are different from one another within a range of at least 20 cm with respect to the first direction, each of the combinations including at least three first electrodes adjacent to one another with respect to the second direction, the plurality of the second electrode lines are configured that combinations of the second electrode groups are different from one another within a range of at least 20 cm with respect to the second direction, each of the combinations including at least three second electrodes adjacent to one another with respect to the first direction.

7. The position inputting device according to claim 1, wherein the plurality of the first electrode lines are configured that combinations of the first electrode groups are all different from one another, each of the combinations including at least three first electrodes adjacent to one another with respect to the second direction, and the plurality of the second electrode lines are configured that combinations of the second electrode groups are all different from one another, each of the combination including at least three second electrodes adjacent to one another with respect to the first direction belong.

8. A display device with a position inputting function comprising at least:

the position inputting device according to claim 1; and a display panel including the position inputting device.

9. The display device with the position inputting function according to claim 8, wherein the display panel comprising:

a display electrode;

the first electrodes and the second electrodes or the electrodes formed from a transparent electrode film;

the first traces and the second traces or the traces formed from a metal film: and an insulating film disposed between the first electrodes and the second electrodes or the electrodes and the first traces and the second traces or the traces, the insulating film including contact holes formed at positions overlapping the first electrodes and the second electrodes or the electrodes and the first traces and the second traces or the traces.

10. A position inputting device comprising:

a plurality of electrodes;

a plurality of electrode lines including the plurality of electrodes arranged along a first direction, the electrode lines being arranged along a second direction perpendicular to the first direction:

a plurality of electrode groups each including a plurality of the electrodes included in the electrode lines;

a plurality of traces for connecting the electrodes belonging to the electrode groups per electrode line, each of the traces being connected to the plurality of the electrodes belonging to the corresponding electrode group to apply an electrical potential to the plurality of the electrodes per electrode group; and a pattern including one of the electrode lines and the traces each connected to the electrodes included in one of the electrode groups.

11. The position inputting device according to claim 10, wherein a number of the traces electrically independent from one another for connecting the electrodes included in a signal electrode line is equal to a number of the electrode groups.

12. A display device with the position inputting function comprising:

a display electrode;

a position inputting electrode formed from a transparent electrode film for detecting an input position;

traces formed from a metal film and connected to the position inputting electrode for applying an electrical potential to the position inputting electrode, the traces including a first trace extending along a first direction and a second trace extending along a second direction perpendicular to the first direction; and an insulating film disposed between the position inputting electrode and the traces, the insulating film including a contact hole formed at a position overlapping at least the position inputting electrode or the first trace and the second trace;

wherein the second trace comprises a plurality of segment second traces sandwiching the first trace with respect to the second direction, the position inputting electrode includes a trace-crossing portion crossing the first trace with respect to the second direction, a portion of the trace-crossing portion is arranged to overlap the plurality of segment second traces sandwiching the first trace, and the insulating film includes the contact hole formed at a position overlapping the plurality of segment second traces and the trace-crossing portion; and wherein the first trace and the second trace are formed from the same metal film.

13. The display device with the position inputting function according to claim 12, wherein the position inputting electrode comprises a first position inputting electrode connected to the first trace and a second position inputting electrode connected to the second trace, and the contact hole comprises a first contact hole formed at a position overlapping the first position inputting electrode and the first trace and a second contact hole formed at a position overlapping the second position inputting electrode and the second trace.

14. The display device with the position inputting function according to claim 12, wherein the display electrode comprises a plurality of pixel electrodes and a common electrode formed from a transparent electrode film and provided with respect to the plurality of pixel electrodes, and the position inputting electrode is formed from the transparent electrode film that forms the common electrode and includes a plurality of position inputting electrodes formed by dividing the transparent electrode film into segments at positions between the adjacent pixel electrodes.

15. The display device with the position inputting function according to claim 12, wherein the display electrode comprises a plurality of pixel electrodes and a common electrode formed from a transparent electrode film and provided with respect to the plurality of pixel electrodes, and the position inputting electrode is formed from the transparent electrode film that forms the common electrode.

16. The display device with the position inputting function according to claim 15, wherein the position inputting electrode comprises a plurality of segment position inputting electrodes and a link for connecting portions of the plurality of segment position inputting electrodes, and the traces are arranged to pass through between the adjacent segment position inputting electrodes.

17. The display device with the position inputting function according to claim 16, wherein a separating point of the plurality of segment position inputting electrodes of the position inputting electrode is located between the adjacent pixel electrodes, and the insulating film is disposed such that the contact hole overlaps the link.

18. The display device with the position inputting function according to claim 16, wherein the traces are formed in a mesh pattern to pass through between the adjacent segment position inputting electrodes.

19. The display device with the position inputting function according to claim 16, further comprising:

a color filter comprising a plurality of color portions arranged to overlap the pixel electrode and exhibiting colors different from one another;

a plurality of unit pixels comprising the pixel electrode and the color portions; and a display pixel comprising the unit pixels adjacent to one another and exhibiting colors different from one another, wherein the segment position inputting electrodes have a size to cover the plurality of pixel electrodes included in the plurality of display unit pixels of the display pixel.

20. The display device with the position inputting function according to claim 16, further comprising a light blocking portion is provided between the plurality of pixel electrodes, wherein a separating point of the plurality of segment position inputting electrodes of the position inputting electrode is located between the adjacent pixel electrodes, and the traces are arranged to overlap the light blocking portion.

21. The display device with the position inputting function according to claim 20, further comprising a color filter comprising a plurality of color portions arranged to overlap the pixel electrodes and exhibiting different colors, wherein the insulating film is disposed such that the contact hole is between the adjacent color portions exhibiting a specific color.

22. The display device with the position inputting function according to claim 20, further comprising a color filter comprising a plurality of color portions arranged to overlap the pixel electrode and exhibiting at least blue, green, and red, respectively, wherein the insulating film is disposed such that the contact hole is between the adjacent color portions exhibiting blue and red, respectively.

* * * * *